US010769607B2

(12) United States Patent
Hewitt et al.

(10) Patent No.: US 10,769,607 B2
(45) Date of Patent: Sep. 8, 2020

(54) UNIVERSAL SYMBOL SYSTEM LANGUAGE-ONE WORLD LANGUAGE

(71) Applicant: JGist International, LLC, Bloomington, MN (US)

(72) Inventors: Gregory Marion Hewitt, Minneapolis, MN (US); Steven James Vervais, Bloomington, MN (US)

(73) Assignee: JGist, Inc., Bloomington, MN (US)

( * ) Notice: Subject to any disclaimer, the term of this patent is extended or adjusted under 35 U.S.C. 154(b) by 1011 days.

(21) Appl. No.: 14/806,322

(22) Filed: Jul. 22, 2015

(65) Prior Publication Data

US 2017/0004470 A1     Jan. 5, 2017

Related U.S. Application Data

(60) Provisional application No. 62/071,969, filed on Oct. 8, 2014.

(51) Int. Cl.
*G06Q 30/02* (2012.01)
*G06Q 20/14* (2012.01)
(Continued)

(52) U.S. Cl.
CPC ......... *G06Q 20/145* (2013.01); *G06F 3/0482* (2013.01); *G06F 3/04817* (2013.01);
(Continued)

(58) Field of Classification Search
CPC ........................... G06Q 20/40; G06Q 30/0643
See application file for complete search history.

(56) References Cited

U.S. PATENT DOCUMENTS

| 8,422,550 B2* | 4/2013 | Li | G06Q 20/12 |
| | | | 375/240.01 |
| 2005/0156873 A1* | 7/2005 | Walter | H04L 51/04 |
| | | | 345/156 |

(Continued)

OTHER PUBLICATIONS

Car, "A Platform Model for Symbol Based Communication Services", 11th International Conference on Telecommunications, Jun. 2011. (Year: 2011).*

(Continued)

*Primary Examiner* — Abhishek Vyas
*Assistant Examiner* — Abdulmajeed Aziz
(74) *Attorney, Agent, or Firm* — Vidas Arrett & Steinkraus P.A.

(57) ABSTRACT

A system for symbolic communication including a communication system, a sender communication device including a processor and a memory, a symbolic communication software module stored in the sender communication device memory, the symbolic communication software module including a database of symbols, with some of the symbols being billable, each billable symbol being associated with a merchant and having a billing rate associated with its use in a message, the symbolic communication software module comprising executable instructions that when executed by the processor cause the processor to allow a user to select symbols to compose a message; send the message to a receiver communication device using a communication system; count and record each symbols used in the message in the symbol server, and bill the merchant for the use of the billable symbol in a message, using the billing rate associated with the billable symbol.

6 Claims, 72 Drawing Sheets

(51) Int. Cl.
*G06F 3/0482* (2013.01)
*G06F 3/0481* (2013.01)
*G06F 3/0484* (2013.01)
*G06F 3/0488* (2013.01)
*G06F 40/157* (2020.01)
*G06F 40/169* (2020.01)

(52) U.S. Cl.
CPC ...... *G06F 3/04842* (2013.01); *G06F 3/04886* (2013.01); *G06F 40/157* (2020.01); *G06F 40/169* (2020.01); *G06Q 30/0239* (2013.01)

(56) References Cited

U.S. PATENT DOCUMENTS

| | | | | |
|---|---|---|---|---|
| 2005/0163379 | A1* | 7/2005 | Zimmermann | G10L 15/26 382/190 |
| 2010/0063876 | A1* | 3/2010 | Godden | G06Q 30/0244 705/14.43 |
| 2010/0125811 | A1* | 5/2010 | Moore | G06F 3/0482 715/846 |
| 2013/0060664 | A1* | 3/2013 | Macrae | G06Q 20/102 705/26.81 |
| 2013/0159431 | A1* | 6/2013 | Berry | H04L 51/08 709/206 |
| 2013/0159919 | A1* | 6/2013 | Leydon | H04W 4/18 715/780 |
| 2013/0307779 | A1* | 11/2013 | Towell | G06F 40/174 345/168 |
| 2014/0279418 | A1* | 9/2014 | Rubinstein | G06Q 10/10 705/39 |
| 2014/0325000 | A1* | 10/2014 | Lorch | H04L 51/063 709/206 |
| 2015/0100537 | A1* | 4/2015 | Grieves | G06N 5/048 706/52 |
| 2015/0160807 | A1* | 6/2015 | Vakharia | G06Q 30/0627 705/26.63 |
| 2016/0259502 | A1* | 9/2016 | Parrott | G06F 3/04817 |
| 2017/0052946 | A1* | 2/2017 | Gu | G06F 40/53 |

OTHER PUBLICATIONS http://baddonkeysocial.com/blog.html, bad donkey social—blog, Aug. 10, 2015.

http://baddonkeysocial.com/tech.html, bad donkey social—tech, Aug. 10, 2015.

http://baddonkeysocial.com/index.html, bad donkey social, Aug. 10, 2015.

http://www.ibmadison.com/In-Business-Madison/November-2012/Image-is-everything-Madison-tech-start-up-adds-visual-spice-to-social-media/index.php, In Business Madison, Nov. 2012, "Image Is Everything: Madison Tech Start Up Adds Visual Spice to Social Media", Aug. 9, 2015.

http://www.jsonline.comlbusiness/tech-start-up-bad-donkey-raises-1-million-b99349644z1-274780751.html, Milwaukee Wisconsin Journal Sentinel, Sep. 11, 2014, Bad Donkey raises $1 million, Aug. 9, 2015.

https://www.linkedin.com/ppulse/what-mobile-marketers-need-know-taylor-kuypers, Aug. 5, 2015, What Mobile Marketers Need to Know, Aug. 10, 2015.

* cited by examiner

JGist™ International
| 1.0 | Symbolary™ Patent Diagram

| 1.6 | SYMBOL SELECTION PROCESS
YOU SELECT YOUR CHOICE

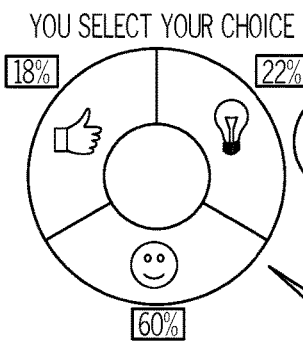
| 18% |   | 22% |
| 60% |

EXAMPLE OF A PHRASE;
"BEST THING SINCE SLICED BREAD"
A GOOD INVENTION OR INNOVATION,
OR A GOOD IDEA OR PLAN

| 1.1 |
SYMBOLARY SELECTION BANK™
KNOWLEDGE ENGINE
CLOUD BASED   JGist™ Language
COMPUTER SERVERS
BILLING SYSTEM
Naturalized Commerce™
JGistBits™

CONSENSUS BY POPULARITY
REPEAT +EMOTION AND SOUND
FOR SELECTION CIRCLE

| 1.2 | STORAGE &
ORGANIZATION

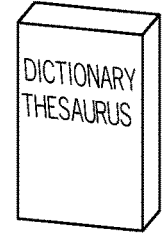
DICTIONARY
THESAURUS

WORDS, PHRASES,
MESSAGES, CATEGORIES,
CLASS STORAGE

| 1.5 | TECHNOLOGY INTERFACE

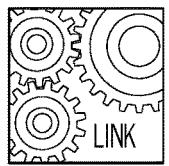
LINK

CELL PHONE SERVICE PROVIDERS
INTERNET SERVICE PROVIDERS

| 1.4 | SYMBOL INTELLIGENCE

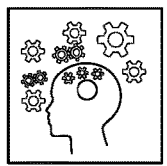

COMMUNICATION FEATURES

| 1.3 | SYMBOL HARVEST PROCESS

5. COMMERCIAL

4. GENIUS

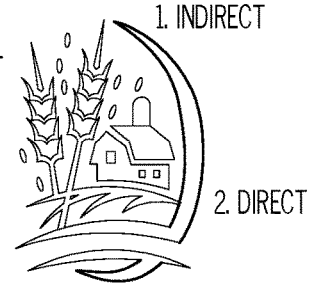

1. INDIRECT
2. DIRECT
3. BLIND

FIG. 3

THE MAGIC...
Customer
Attraction
A STARBUCKS COUPON
OFFERED = VALUE
FIG. 7

WHY SHOULD YOU JGIST?
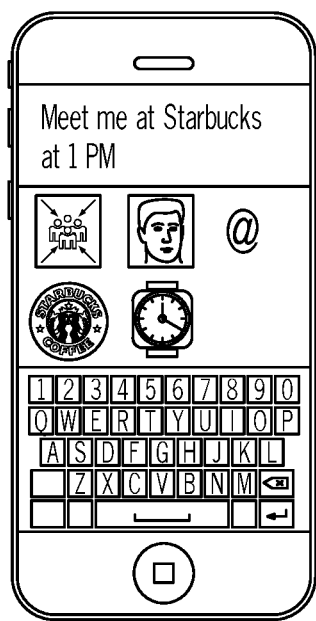
Gist International
"It's a symbol language!"
Graphics expedite
and increase
our level of
communication.
FIG. 8

WHY SHOULD YOU JGIST?
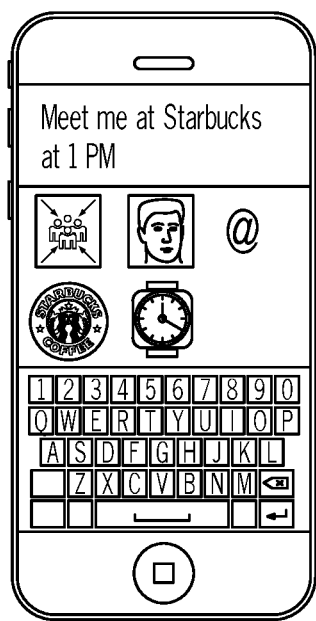
Gist International
"It's a symbol language!"
Visuals are processed 60,000 times faster than text!
FIG. 9

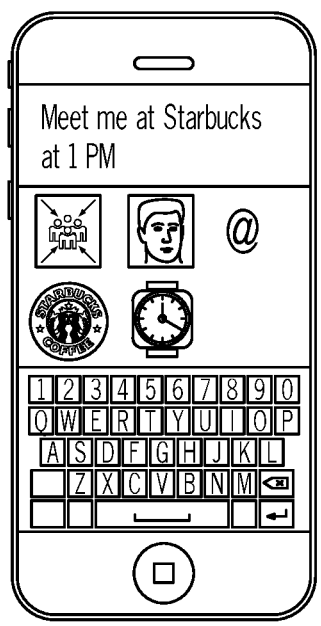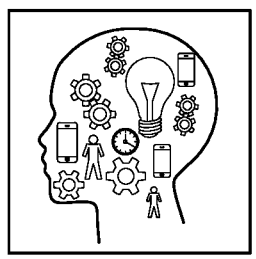
FIG. 10

WHY SHOULD YOU JGIST?
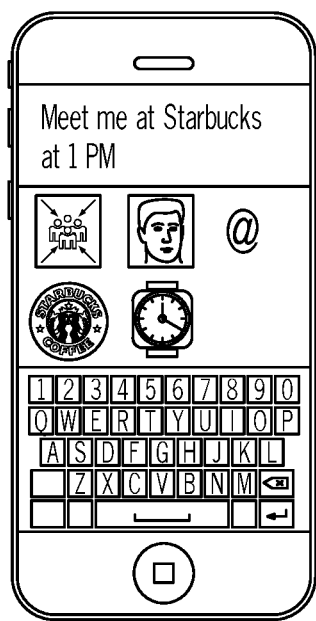
"One World Language"
Communication
* Across Cultures
* Across Languages
* Young & Old
FIG. 11

WHY SHOULD YOU JGIST?
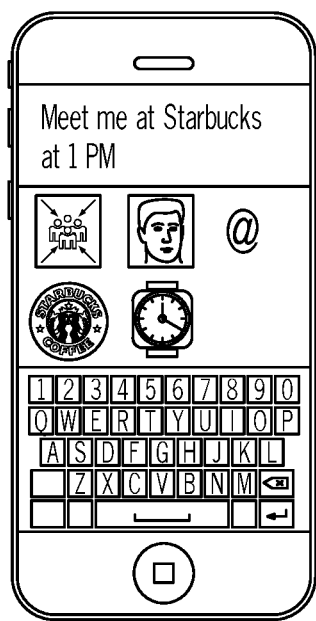
Gist International
"It's a symbol language!"
HOW DOES JGIST
MAKE MONEY?
Naturally    Easily
"Naturalized
Commerce" TM
FIG. 12

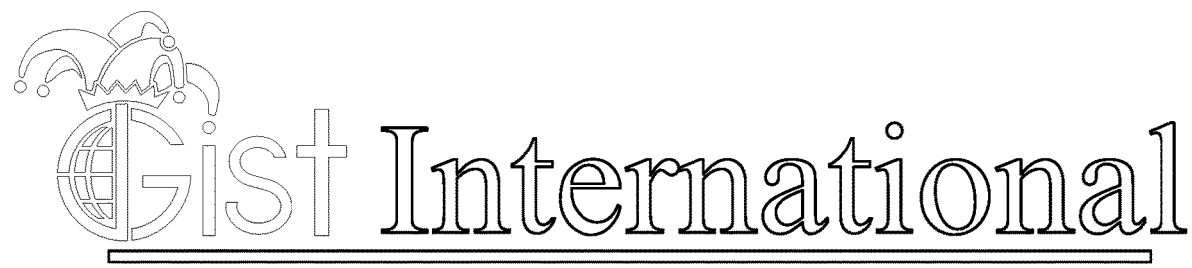
*"It's a symbol language!"*
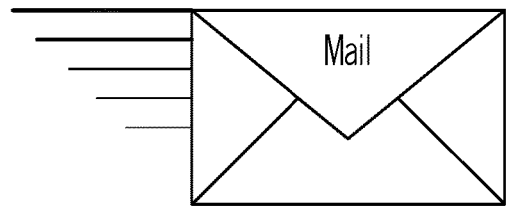
FIG. 66

FIG. 68

| FLIGHTS AIRPORTS STATS PRODUCTS MARKETS COMPANY | MYFLIGHTSTATS |
|---|---|
| (DL) Delta Air Lines 768 Flight Status | CHANGE FLIGHT |

Overview  Departure  Arrival  Event Timeline  Flight Tracker  Position Log  On time performance DL 768 Flight Status ⬟ DELTA
(DL) Delta Air Lines 768
(ATL) Atlanta, GA, US to (PBI) West Palm Beach, FL, US Status:
En-Route – On-Time
Last change to status 1 minute ago DEPARTURE
Scheduled Departure:
1:40 PM – Wed Apr-15-2015
Actual Departure:
1:36 PM – Wed Apr-15-2015
Arrival Gate:
C4

ARRIVAL
Scheduled Arrival:
3:33 PM – Wed Apr-15-2015
Estimated Gate Arrival:
3:22 PM – Wed Apr-15-2015
Baggage Claim:
N/A

FIG. 70

UNIVERSAL SYMBOL SYSTEM LANGUAGE-ONE WORLD LANGUAGE

CROSS-REFERENCE TO RELATED APPLICATIONS

This application claims priority to U.S. Provisional patent application No. 62/071,969 filed Oct. 8, 2014, the entire content of which is hereby incorporated by reference.

FIELD OF THE INVENTION

The invention relates to a communication program using symbols driven with a consensus building symbol system, which can be monetized through the use of symbols which relate to products and services.

BACKGROUND OF THE INVENTION

Communications programs, such as cell phone texting is well known. Emoticons are also well known. However, applicant's invention goes well beyond what is known in providing a communications program using consensus-popularity driven symbols which can be used with cell phones, email, smart TV's, computers, publishing and/or education.

A picture is worth a thousand words and if everybody agrees on what a picture means, it is worth even more, allows communication across languages and can be monetized by using pictures of products and services, as discussed further below.

BRIEF SUMMARY OF THE INVENTION

JGist™ International, LLC (the applicant) is a software development company that has created a universal symbol system, One-World Language that can use any of the 5 human senses, primarily sight and sound. These symbols can be delivered in any form; i.e. 3D, holographic, stereo, streaming media, movies, stationary pictures or images, etc.

JGist™ has developed an Internet technology that links a Symbolary Selection Bank™, knowledge engine with an infinite number of software development applications or APPS. This concept claims the merging of two major components of communication that can operate separately or in combination:

First Claim: The creation of a Universal Symbol System—One World Language, JGist™ through the use of symbols within a consensus popular building symbol system.

Second Claim: A monetization process called Naturalized Commerce™ that uses a product and service "attraction" in its acquisition model.

Through the use of direct or indirect reference to words, phrases or messages, including consumer brands, JGist™ will create the world's first universal language while simultaneously creating an Internet commerce continuum.

BRIEF DESCRIPTION OF THE DRAWINGS

An exemplary embodiment of the invention is explained in greater detail below with reference to the figures.

FIG. 3 is a symbolic diagram showing the Symbolary selection bank.

FIGS. 5-16 are directed to a smartphone example of a JGist message.

FIGS. 66-75 show an email version of JGist.

DETAILED DESCRIPTION OF THE INVENTION

While this invention may be embodied in many forms, there are described in detail herein specific embodiments of the invention. This description is an exemplification of the principles of the invention and is not intended to limit the invention to the particular embodiments illustrated.

Figure 1:
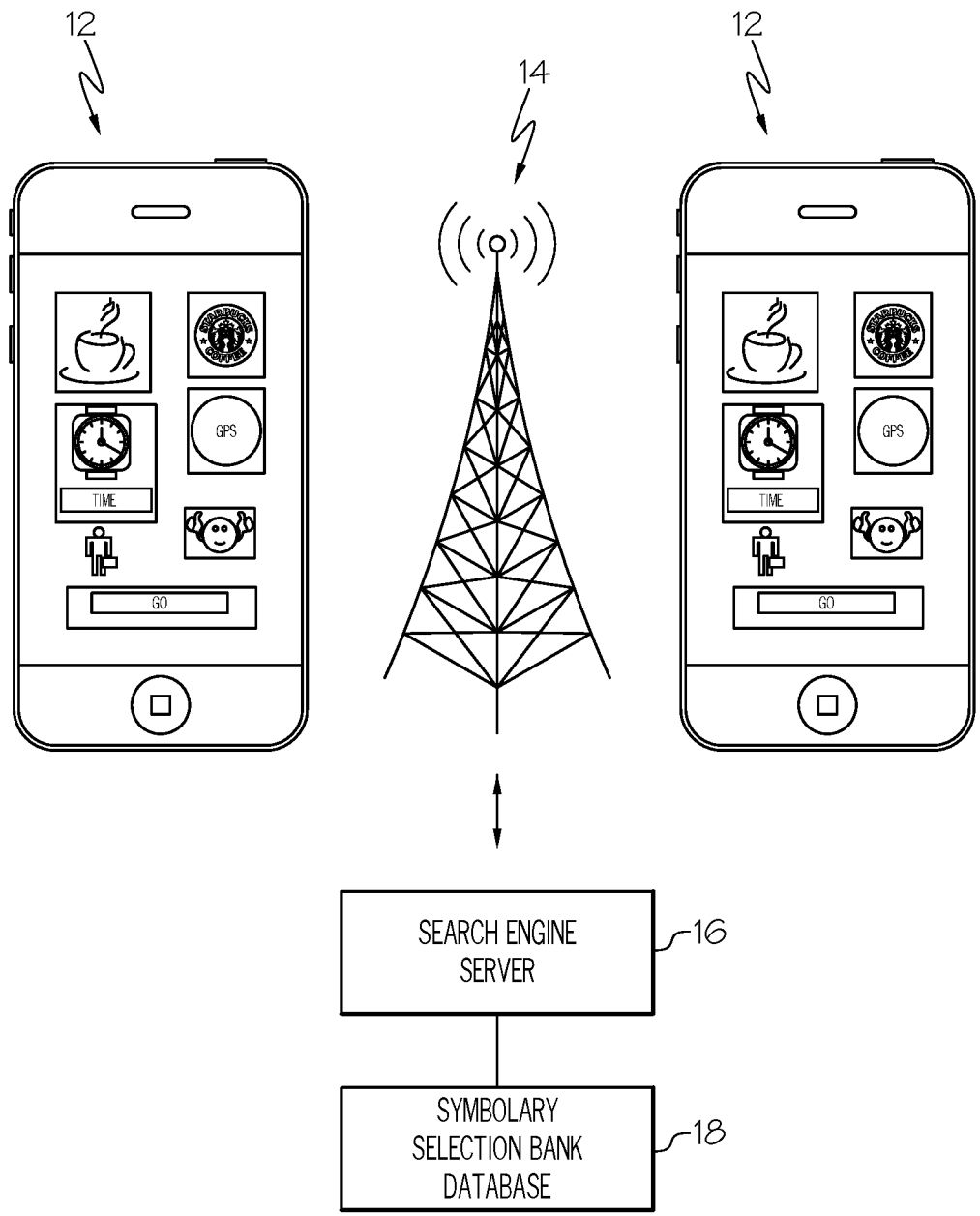
FIG. 1 is a block diagram of the overall system.

Referring to FIG. 1, two standard smartphones 12 running a JGist communication app communicate using the cellular texting system 14 and in particular a graphical enabled texting system, as is well known in the art. A search engine servicer 16 is connected to the cellular system 14 and hosts the Symbolary selection bank database (i.e. symbol thesaurus/dictionary). 18.

SSB 18 contains a row for each symbol which can be used, a category associated with each system, a count of how many times each symbol is used in a JGist message, which allows ranking symbols by how popular they are, a field for whether the symbol has a charge associated with it, the charge and the vendor information.

Figure 2:
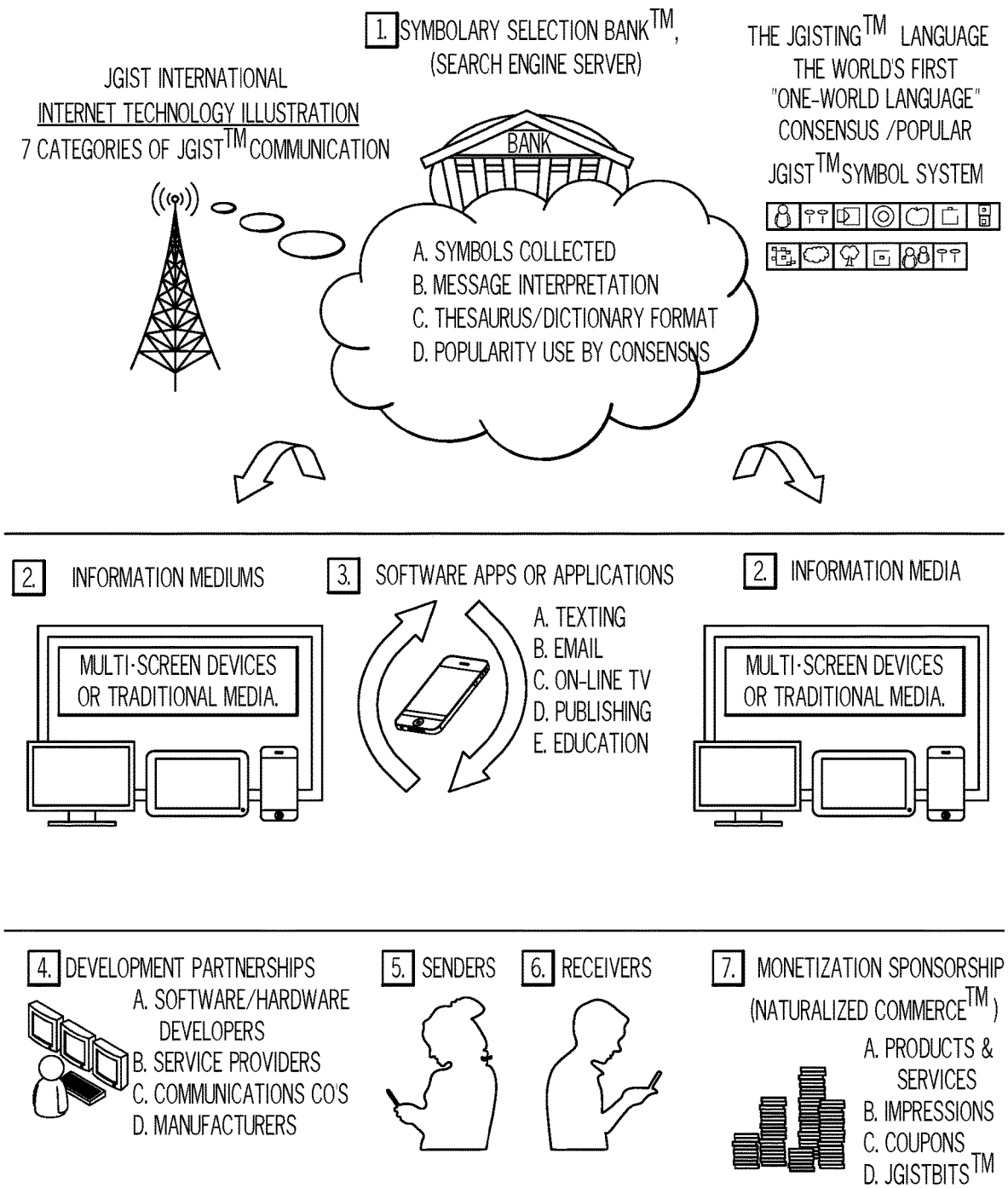
FIG. 2 shows the seven parts of the overall system.

The components of the system are shown in FIG. 2. There are Seven Components of the invention disclosed in this utility patent. These components are outlined in the Internet Technology Illustration (FIG. 2) showing how the components work together.

1. Symbolary Selection Bank™, "Knowledge engine"
2. Information mediums and media. "Multi-screen devices or any traditional communication methods."
3. Software APPS and/or Applications. "Computer systems or portable devices."
4. Development partners. "Embedded software technology."
5. Senders. "Initiators of any message."
6. Receivers. "Recipient or message reader."
7. Monetization sponsorship. "Attraction based acquisition of products or services."

FIG. 3 is directed to the Symbolary selection bank and 1.1-1.6 are discussed in more detail below.

1.1 Symbolary Selection Bank™ SSB Overview

The Symbolary Selection Bank™, (SSB) is a real time, perpetually updated search engine used to build the universal one world language called JGist™ or JGisting™ (A Symbol System). It will accumulate commonly used symbol data worldwide gathering consensus of meaning among users in a continuously updated incoming and outgoing loop. The symbols, primarily visual or sound (and may include the other 3 human senses) are most commonly used by the largest number of users for a particular thought or message. The Symbolary Selection Bank™ will monitor all sponsors, subscriber partners and software application users with their permission. This would then be available to the JGist™ Symbol selector App software being used in multi-screen devices[1] of the sender/receiver to craft and communicate their message.

[1] Any device used with the intent to communicate, view or watch an electronic communication. Any visual communication device via state of the art technology, ie smart phone, laptops, tablets, internet TV, and any future technologies relaying any message or communication. This term also refers to any device with a screen capable of playing video content, such as a smartphone, laptop, tablet, computer and internet TV.

The SSB will create a symbolized One World Language while creating a Naturalized Commerce™ model where products and services will be acquired through consumer attraction rather than promotion using information collected with Internet knowledge engine technology. It will also track symbol usage for product and service partner logos, symbols and coupon offers for effectiveness and billing purposes. The SSB will also create a billing matrix. (100% validatable impressions). This can be a single computer or group of computer servers working together to create a Universal language and Naturalized Commerce™. These components can work together or separately, as they achieve consensus-popularity. Additionally, the SSB will include a JGistBits™ coupon currency supported by a product or service billing system.

Reference: Provisional patent application, Application No. 62/071,969, page 24, sections 1-4, Page 25 sections 1-4 and pages 26-27 sections 1-2 and page 29, 30, 31, 32, page 85.

1.2 SSB™ Storage and Organization

The Symbolary Selection Bank SSB is a symbol system intelligence and an informational storage system (gallery of symbols). The SSB is organized and contained within one or more computer servers (knowledge engine) in an international, geographical and cultural thesaurus/dictionary/encyclopedia format. The SSB will contain consensus-popular symbols that represent words, phrases or messages in any/all of the 5 human senses primarily sight and sound. These symbols will create A Symbol System that will be organized by class and category of meaning for efficient access and retrieval of symbol choice.

Reference: Provisional patent application, Application No. 62/071,969, pages 24, 25, 26, 27 section 2 and pages 29-32.

1.3 SSB™ Symbols Harvest Process

The Symbolary Selection Bank SSB harvesting process will incorporate a vast number of methods to populate and archive any and all symbols. Included in the SSB Symbol System will be symbols in any of the five human senses that will be harvested either directly, indirectly, blind, social genius, or through commercial methods. Additionally, JGist™ will have symbols introduced by language experts or companies for input and collaboration. Additionally symbols will be created through internal proprietary development. Other methods of populating the SSB could include user generated suggestions, Gamification or other creative sources.

Populating the Symbolary Selection Bank, (SSB) (Five Identified Methods.)

1. The First Method: Indirect Symbol Harvesting

Initially, the SSB will be populated with symbols collected from the Internet around the world. These will be Symbols associated with words, phrases and messages that already exist on the Internet. JGist™ will continually and on an ongoing basis search the Internet for symbols, signs or pictures of any words, phrases or messages and information that connotes any of the five human senses seeking more clarification of meaning. It should be noted that JGist™ will operate on a legal grounding so as to gather data that can be reused.

2. The Second Method: Direct Symbol Harvesting

The direct method will provide JGist™ website visitors with a series of questions or technology selection protocols that will allow visitors to submit or interpret symbolized data that can be stored in the data base, SSB.

3. The Third Method: The "Blind" Method

This method describes data mining for the "Symbolary™" whereby through the development of games and educational learning processes that will allow JGist™ will collect symbols from individuals who solve riddles, puzzles and participate in Internet games. Gamers for example, will be required to select symbols, signs or pictures to advance in achieving game goals.

4. The Fourth Method: Genius League of Experts

"League of Geniuses" experts in the social sciences will evaluate, create and utilize their talents and skills to both refine and validate the symbolized information. This will include the fields of semiotics, psychology, sociology, noetics, anthropology or art, as well as graphic art and business marketing. In essence, all educational and business fields of study.

5. The Fifth Method: Commercial

JGist™ will invite the participation of all commercial sources that want to bring their branding to the world through signification technology. Additionally, there will be other data mining methods and techniques developed where every available form of medium and media of communication will be brought to bear on the gathering of symbolized data and the branding of products and services.

1.4 Symbol Intelligence

The methods or ways symbols are refined or processed by the central intelligence SSB knowledge engine "brain". This gallery of symbols pushes and pulls symbol information to the world and manipulates/shapes and manages symbol content intelligence.

This JGisting ingenuity component can best be described as symbol meaning enhancement by adding intuitive interpretation of consensus-popularity of meaning which will include some abstract (envisioned or imagined) symbol meanings and may even include elements of computer generated artificial intelligence.

Some examples might be; personality profiling, timing, Naturalized Marketing™, universally accepted One World Language symbols or interpretive support by the SSB based upon user demand for interpretive guide. ("The Jister")

Reference: Provisional patent application, Application No. 62/071,969, pages 21 b, 22, 23a and b, 24, 28 and 58-66.

1.5 Technology Interfacing

Technology Interfacing refers to the melding or technological embedding of the JGist™ technology with the world through existing or evolving smart phone, Internet, TV or static electronic devices such as eBooks. We are referring to how symbolized information is embedded or linked into or how it interfaces with all other communication technologies. By embedding, the JGist™ symbol language makes this new technology user friendly and compatible with virtually all communications media or medium directly or indirectly including traditional media and electronic versions of printed material such as newspapers etc.

1.6 Symbol Selection Process

The symbol selection process begins at the senders' personal multi-screen device. A dynamic series of symbol selection wheels (or other selection configurations) will prompt senders to add or convert their words phrases or messages into symbols. These symbol selection wheels will allow for better contexting of messages, including emotion via color and sound (or other human senses). The selection of the highest consensus-popular symbols will be included in their messages, or will allow for the sender to use their personal preference and to convert any product or service that is mentioned directly or indirectly into their brand of choice. (With permission of the sender/receiver).

The SSB will monitor all sender/receiver symbol activity for the creation of the one world language JGist™ and the naturalized commerce model. The symbol selection process will provide both senders and receivers, sponsors and development partners a better method of communication and feedback loop throughout the world.

Reference: Provisional patent application, Application No. 62/071,969, pages 40-44.

Additional Components of JGist™ International Technology

Referring again to FIG. 2, reference numerals 2-7 are discussed in more detail below.

2. Information Mediums and Media

Multi-screen electronic devices or any traditional communications methods

Examples of:

| Electronic | Traditional |
|---|---|
| Smart phones | pay phones |
| Computers (desk and laptop) | newspapers/periodicals |
| Tablets | magazines |
| Smart TV's | non-smart TV's |
| E Books | Books (paper) |
| Courtesy washroom ads | Hand-outs |
| Hotel lobbies and malls | |

3. Software APPS/Applications

JGist™ software will offer to users APPS or applications to be used with their electronic device to send and receive JGisted messages. In some cases, the software will come with the software already loaded into the device at the factory or downloaded before being delivered to the user from the service provider, Cellular or Internet.

4. Development Partners

The SSB search engine/tracking software is an "embedded technology" This embedded software will often be licensed for use by exclusive or semi-exclusive partners. This technology will be developed by development partners to the specifications and use criteria of JGist™ International, LLC.

5. Senders

Senders are simply defined as users who are sending a JGisted communication on any multi-screen device.

6. Receivers

Receivers are defined as users who are receiving a JGisted communication on any multi-screen device.

7. Naturalized Commerce™—Monetizing JGist™

Reference Provisional patent application, Application No. 62/071,969, page 85

Figure 4:
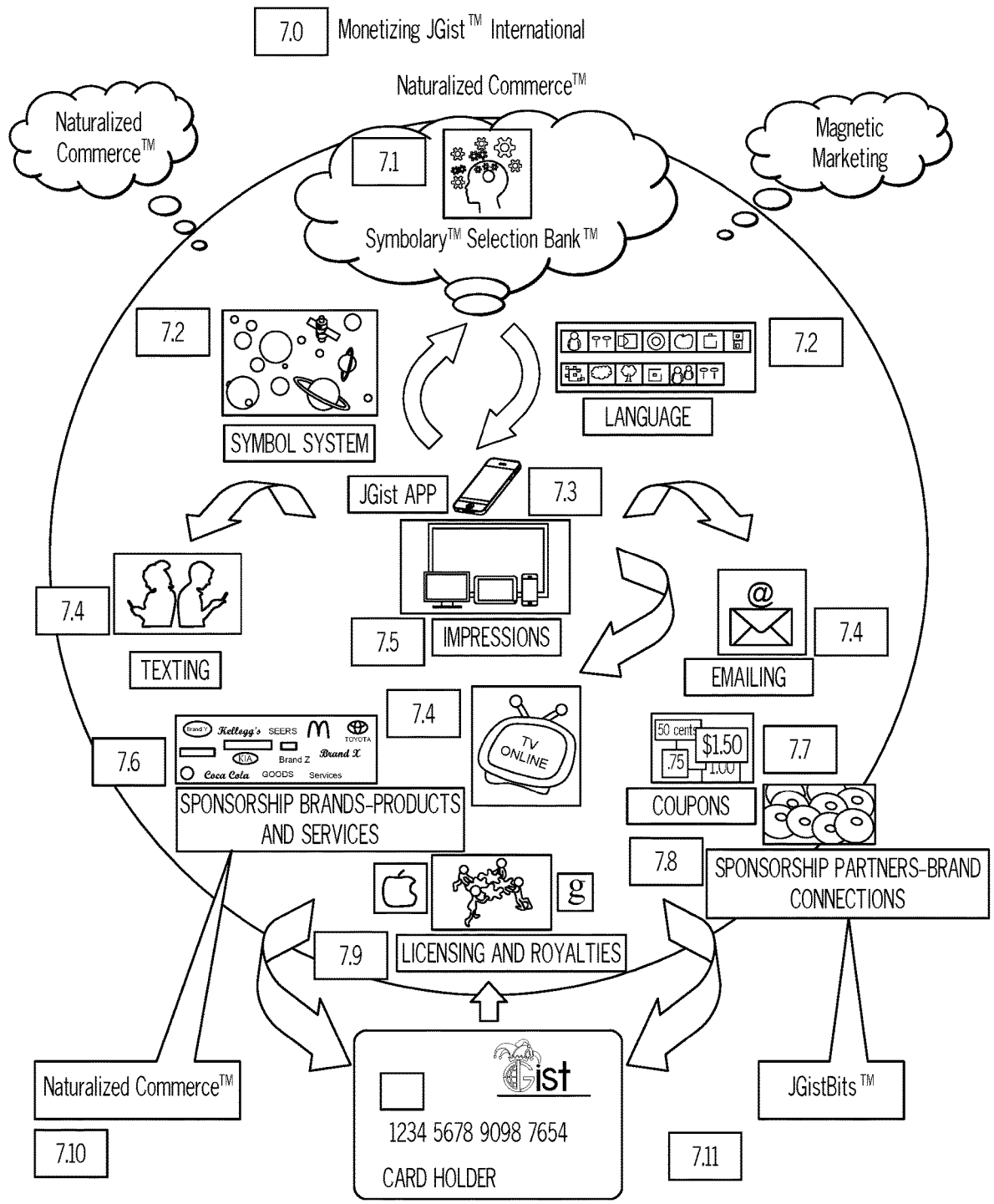
FIG. 4 is a symbolic diagram showing the monetization portion of the invention communication program.

FIG. 4 shows a symbolic view of the components of the monetizing of JGist, and 7.7-7.11 are discussed in more detail below.

7.1 Naturalized Commerce™—Monetizing JGist™ Overview

JGist™ will make possible an entirely new concept and method of "Naturalized Commerce™". Naturalized commerce will be based on attraction rather than traditional promotion in order to assist consumers in their acquisition of products and services. This method will create a whole new form of currency, "Coupon Currency, called JGistBits™"

Whenever a user is actually looking for a product or service, the advertising company will instantly connect with that user creating an acquisition opportunity that makes them an offer to use their products or services in real time with an incentive coupon. This keeps the customer in control of the buying process, while minimizing, reducing or eliminating data overload. This will create value added loyalty, a very powerful and cost effective way of getting people what they want, when they want it, while increasing profitability of companies naturally.

The Symbolary Selection Bank™ SSB, will employ the concept/method of Naturalized Commerce™ to identify and contract with product and service sponsors throughout the world. JGist™ International will track brand impressions, through clicks by users, electronically delivered coupons, and coupon redemption which will include a billing process for product and service sponsors. This Naturalized Commerce™ model will affectively assist consumers in the acquisition of products and services while reducing consumer chaos and unwanted solicitation. The ultimate result of this process will be an exponential money machine that will generate a higher level of proficiency in sponsorship advertising and consumer savings.

7.2 Symbol System Language—JGist™

The international symbols system language, "JGist™", will be become literally a "conveyor belt", communication method that will allow consumers to access their products and services as desired, not pushed at them through promotion. It will be habitual, (the normal course of Jgisting), for JGist™ users to mention products and services directly or indirectly in the normal course of their communications, as they use and create the world's first truly one world language.

7.3 JGist™ APPS and Applications

Naturalized Commerce will be embedded in every JGist™ App or application, and can be implemented on any multi-screen device.

Each device, no matter what manufacturer or source of origin, will have a JGist™ App or application software specifically available to be used for each device. The software will be designed to the specifications of JGist™ International which will include compatibility with JGist™ SSB.

The software will allow for the independent selection of product and service brands or the placement of the mentioned brands naturally within messages through a symbolary selection wheel or any other selection process.

7.4 Communication Methods

There are three primary communication methods that will contain naturalized commerce; they are texting, emailing and on-line TV. Additional naturalized commerce communication will include publishing and broadcasting, education, gaming entertainment, business and government.

7.5 Validation of Consumer Impressions

An impression is defined as an "A. R. V. L." (ARVL) Audience, Reader, Viewer, Listener validation. In other words, consumer impressions are defined as anytime someone engages with words, phrases or messages where sponsors are transmitting brands of products and services for brand recognition.

An impression (in the context of online advertising) is when an ad is fetched from its source, and is countable. Clicking or not is not taken into account. Each time an ad is fetched it is counted as one impression. Source (From Wikipedia, the free encyclopedia.)

7.6 Sponsorship Brands—Products and Services

To JGist™ brand a product or service to a prospective audience, a company will contract with JGist™ to display their brand (logo) for promotional purposes. This will include any use of visual images, sound, or other human senses in the communication of their company's products or service.

7.7 Coupons—Consumer Incentives (Magnetic Marketing)

Coupons are a means of attraction for customers to acquire products or services. This contrasts with traditional advertising in that a JGist™ coupon is offered when the consumer is looking for that particular product or service versus a company attempting to promote/push product and services via pop-up cookies, banners or other unsolicited advertisement. This Jgisting coupon system will be activated when an A R V L mentions directly or indirectly a product or service within their message based upon Attraction not promotion. When this occurs JGist™ program users will have the opportunity to include a brand in their message and to receive a coupon from the brand sponsor.

This includes both an A R V L s acceptance of a mentioned brand or their preference of products and/or services. It should be noted that an A R V L can "tickle" TICKLE (Transfer Information Causing a Knowledge Learning, Experience. In other words, people can transfer their coupon value to friends, family or others around the world.

7.8 Sponsorship Partners—Brand Connections

Brands that have compatible or complimentary products or services are connected using the JGist™ Naturalized Commerce™ System for companion or complimentary offers. An example might be a donut retailer and a coffee shop.

7.9 Licensing and Royalties

The JGist™ concept and software development can and will most often be licensed to a licensee under contract to write the SSB and APP or device software, using JGist™ specifications. They will then operate and maintain the software and hardware to run the program in a given geography for a given period of time. As there can only be one partner at a time for the SSB (only One World language will be allowed), they will agree to offer their SSB JGist™ system to other service providers under a sub-license agreement. In addition, they will also agree to solicit and sponsor product and service providers with the JGist™ system for the life of our agreement.

Royalties based upon total performance results and ad revenue of users and sponsors of the JGist™ system will be paid directly to JGist™ as a percentage of actual results. In addition, since the SSB will have the tracking and billing feature built in, they will be responsible for collecting revenue and sharing the collection of same with JGist™ through audit verifications.

7.10 Naturalized Commerce™—Magnetic Marketing

Naturalized Commerce™—Magnetic Marketing is an attraction based product and service acquisition model.

Example: If a person is texting, emailing or watching on-line TV (or other means of assimilating words messages or phrases), and it contains a product or service, they will be prompted to sponsor the JGisText, creating a "magnetic relationship" (discount-coupon incentive). This will both attract and retain the customer's purchase and future loyalty.

7.11 JGistBits™—Coupon Currency

The Naturalized Commerce™ model contains a coupon currency JGistBits™ loyalty card program. Each JGist™ software user will be issued a JGistBits loyalty card.

When a JGist™ system user responds to a product or service provider to claim their coupon offer, the card will be swiped at the cash register card reader. The card reader will first validate they are at the merchant for validation purposes. The user/consumer will automatically receive a credit on their JGistBits card account of a percentage of their discount received for their actual purchase. The credit is redeemable at any JGist™ participating merchant in the form of merchandise or services and payable by the JGistBits card service provider directly to the retailer. Additionally, JGistBits can be transferred to other JGistBits card carriers by going on-line and swapping or gifting the JGistBits to others. The JGistBits program will in essence build the World's first "Coupon Currency".

JGist™ will receive a flat 2% fee on all transactions made through the use of the JGistBits card.

Figure 5:
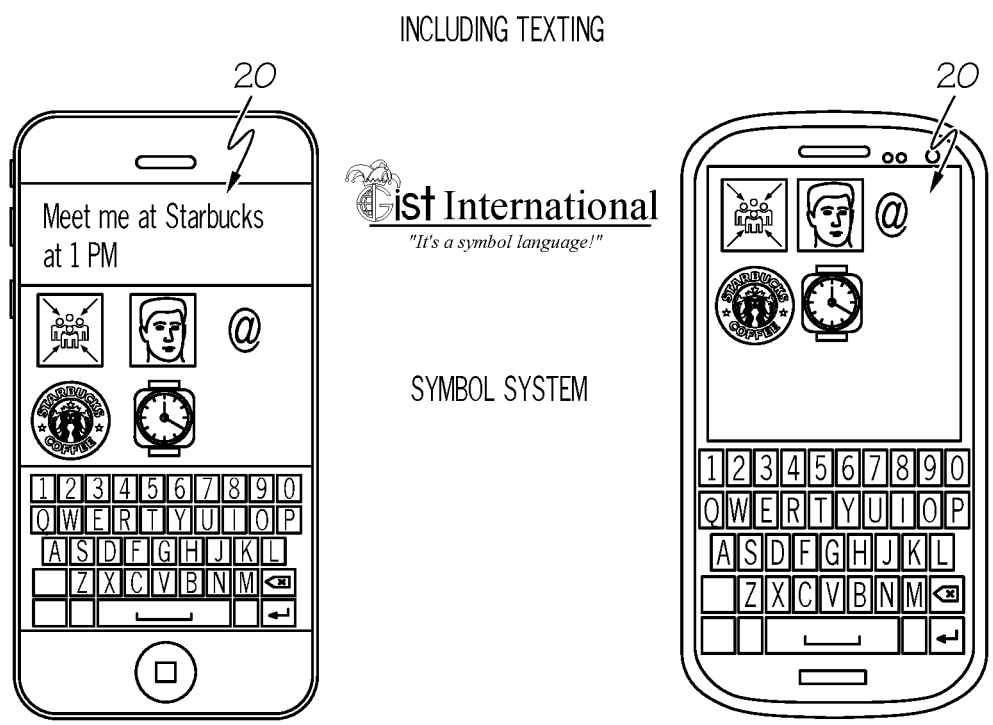
Figure 6:
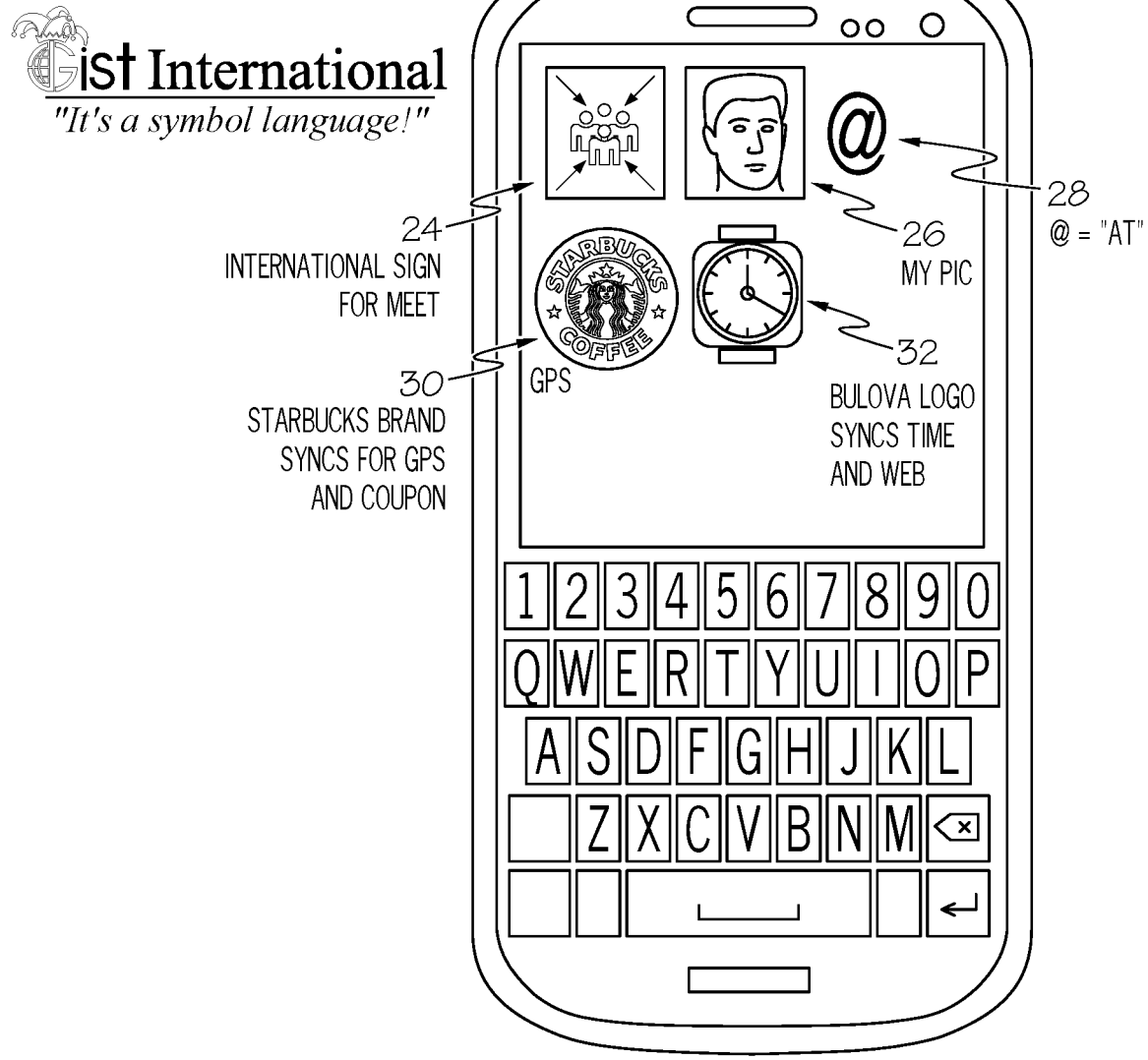
Figure 13:
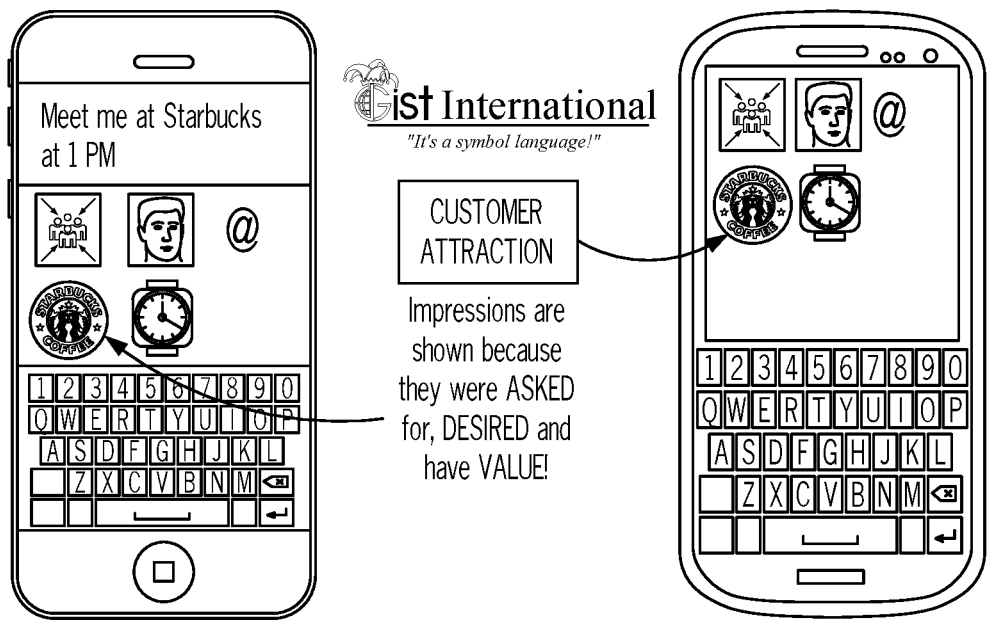
Figure 14:
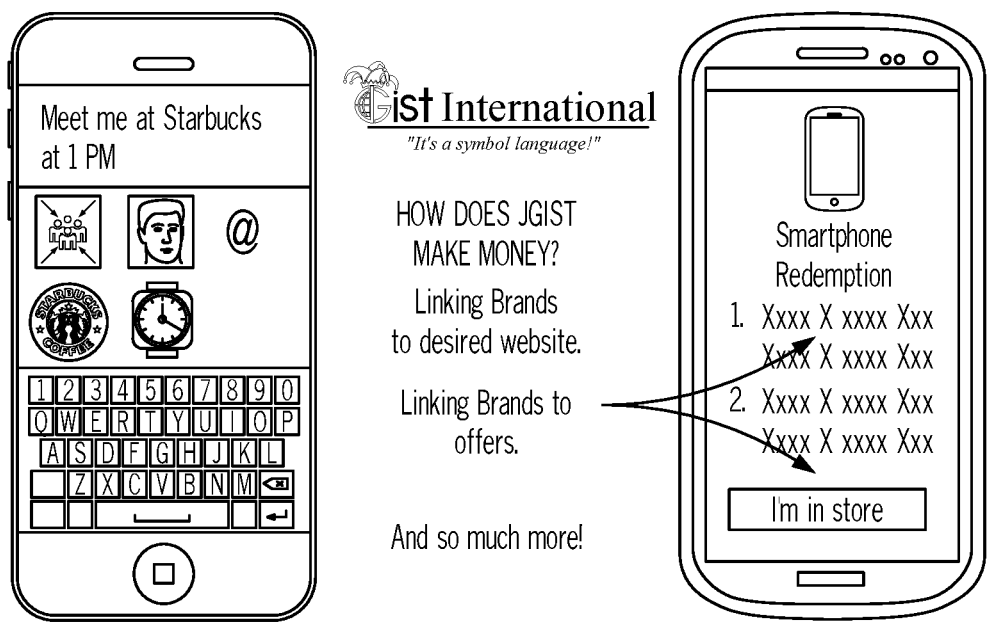
Figure 15:
Figure 16:
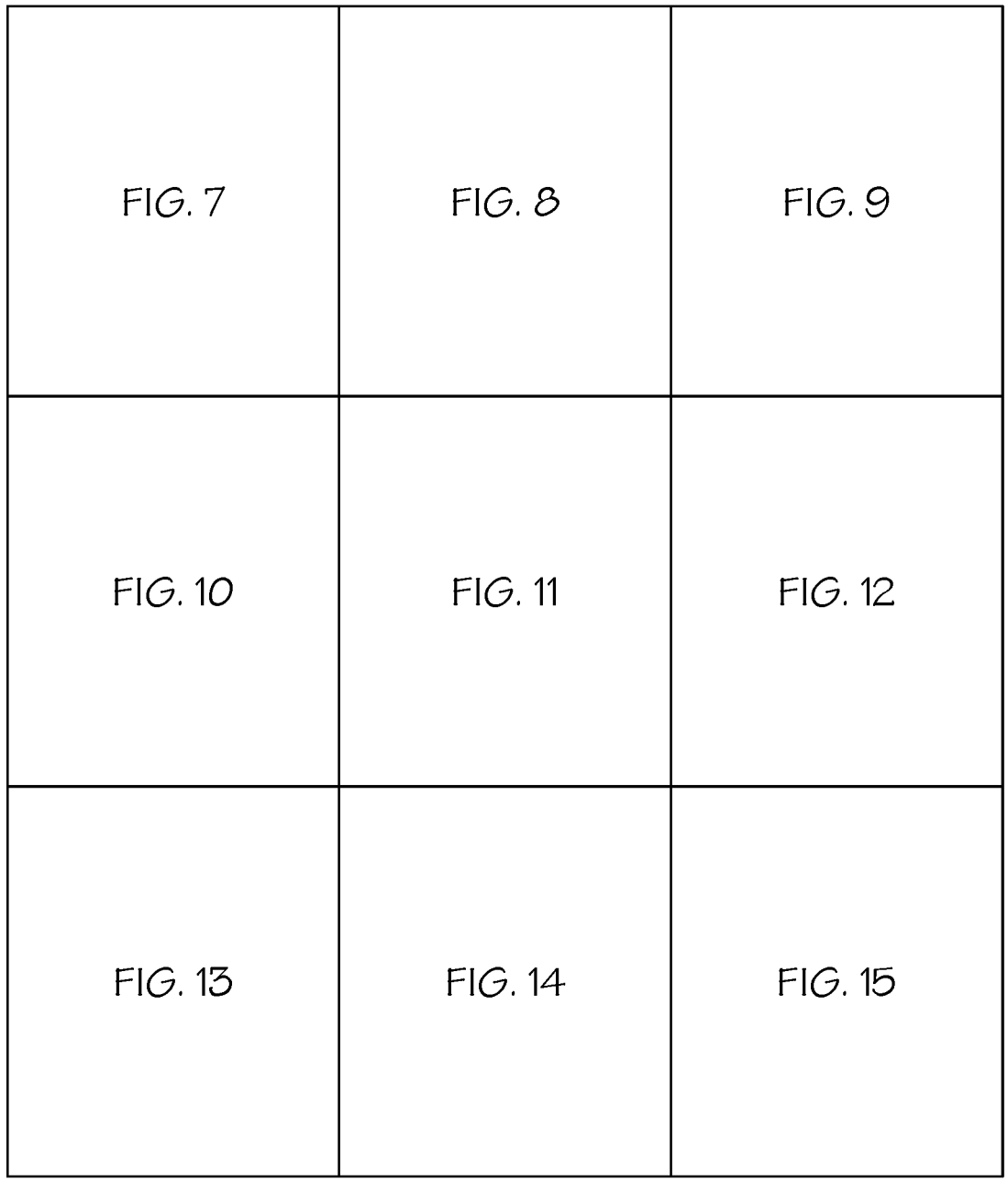
Figure 17:
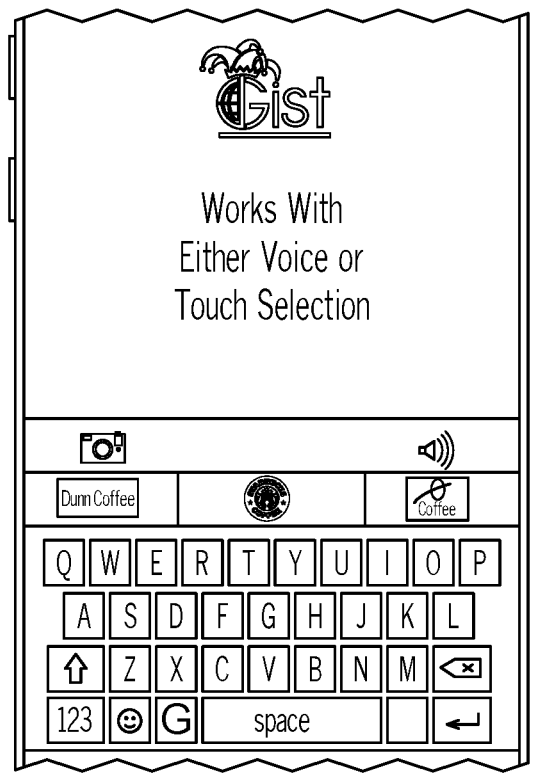
FIGS. 17-45 show composition of a JGist message in more detail.
Figure 18:
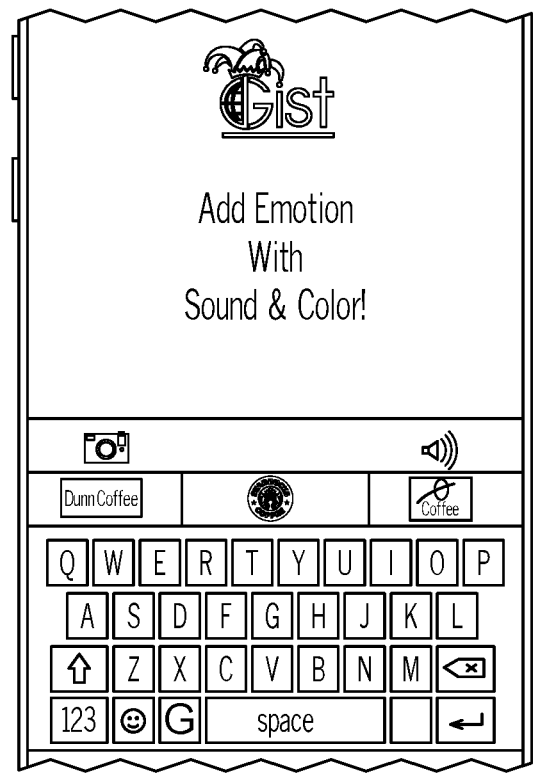
Figure 19:
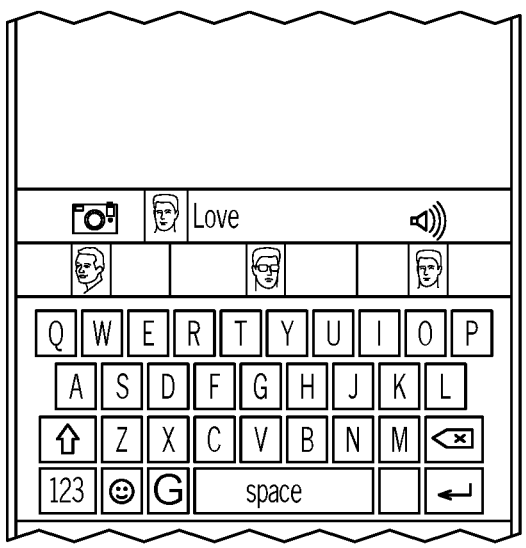
Figure 20:
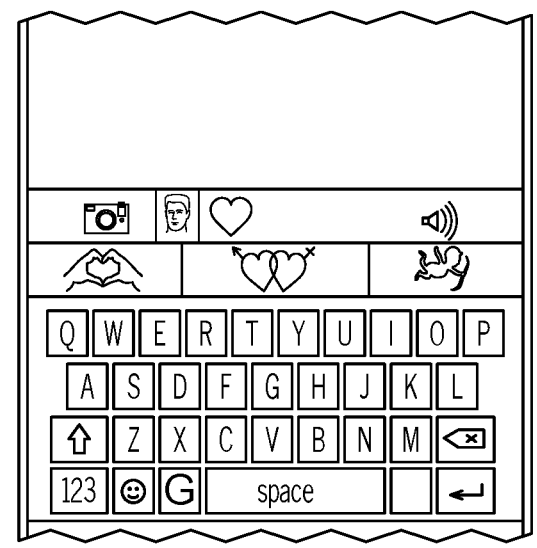
Figure 21:
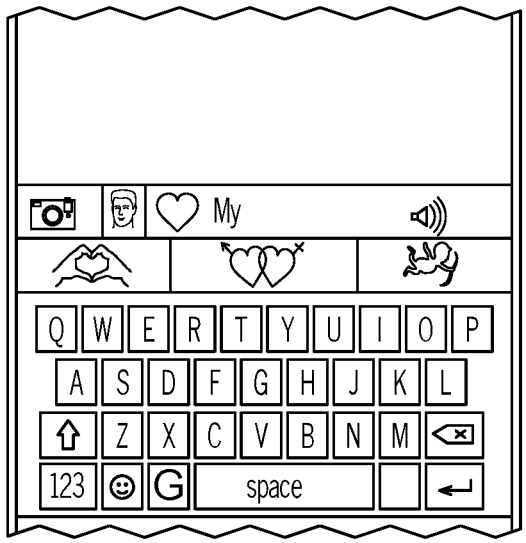
Figure 22:
Figure 23:
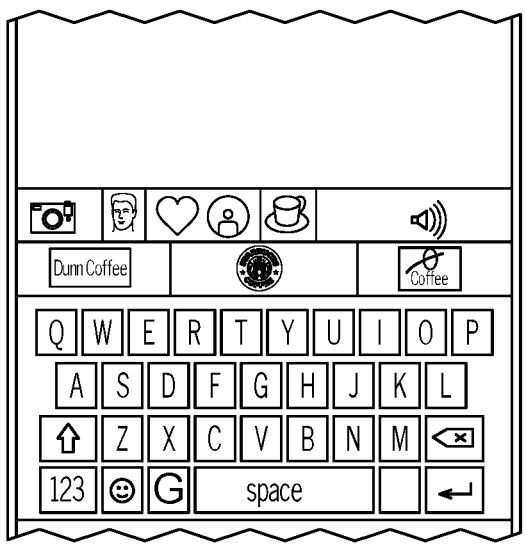
Figure 24:
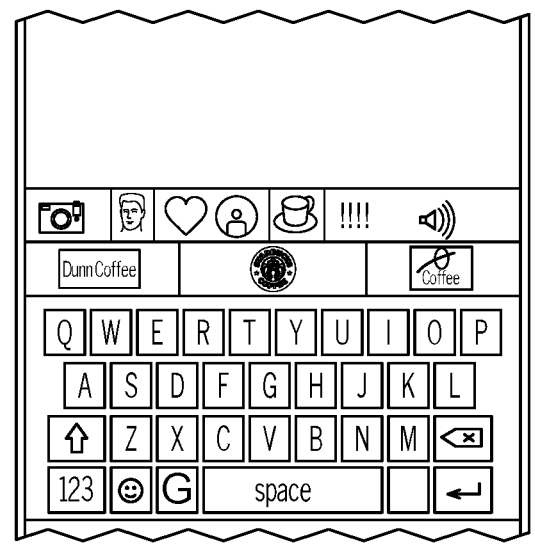
Figure 25:
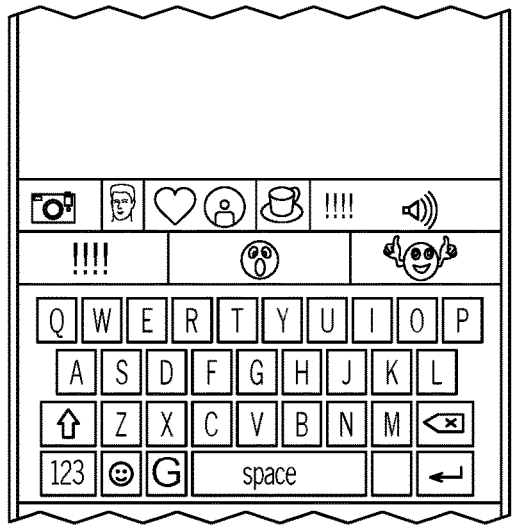
Figure 26:
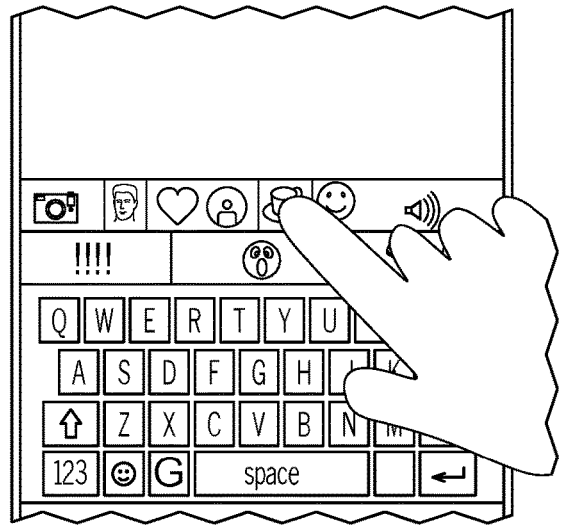
Figure 27:
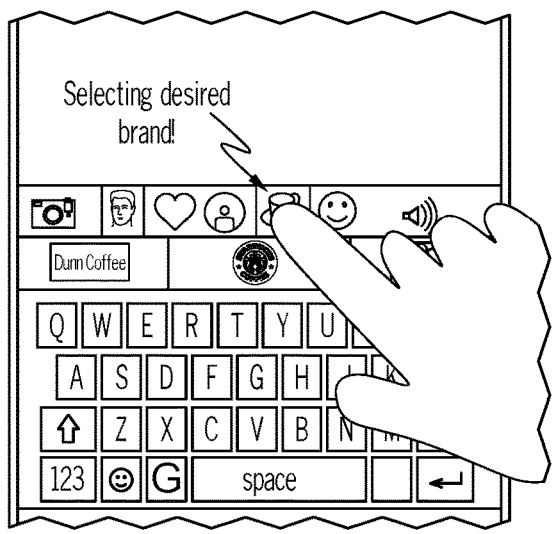
Figure 28:
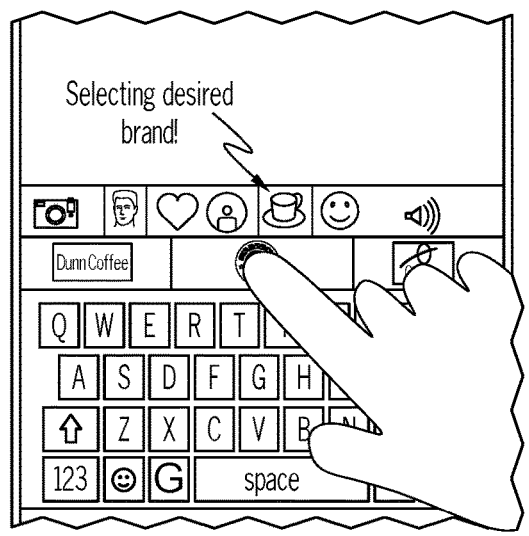
Figure 29:
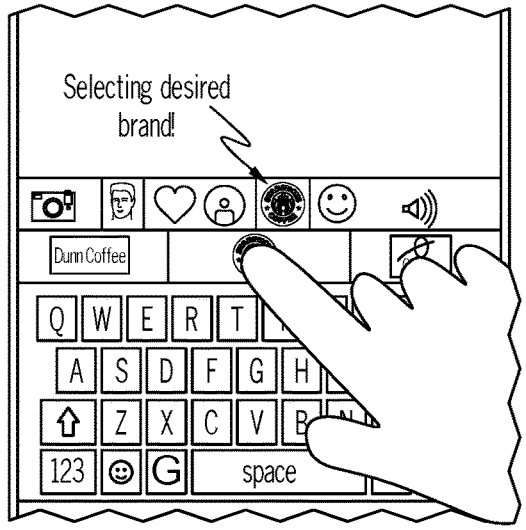
Figure 30:
Figure 31:
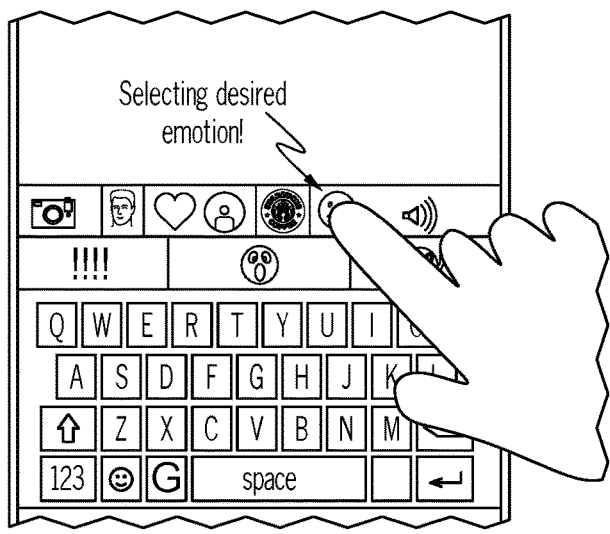
Figure 32:
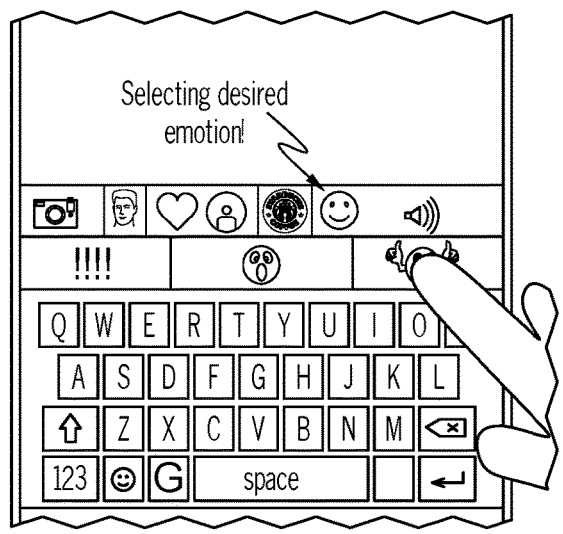
Figure 33:
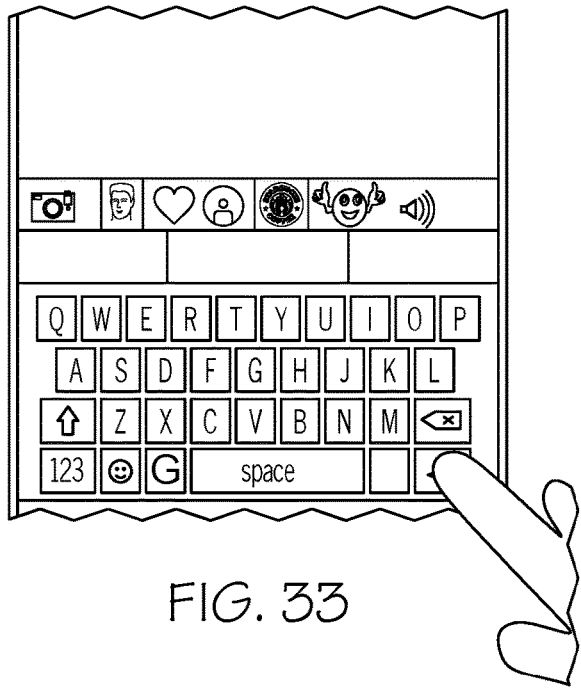
Figure 34:
Figure 35:
Figure 36:
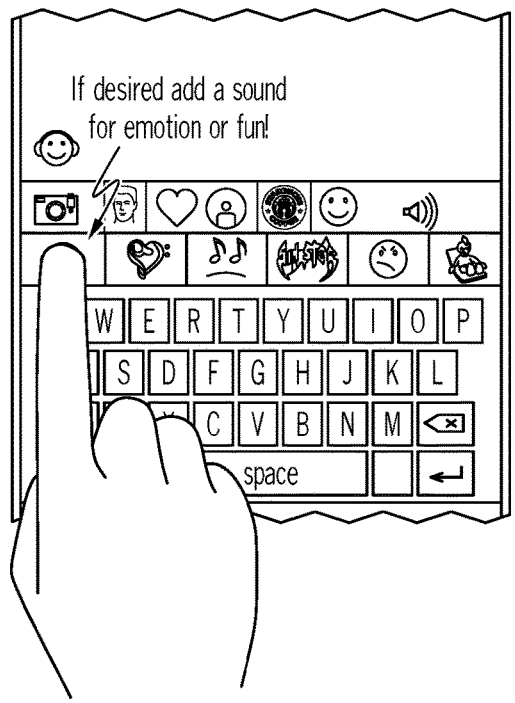
Figure 37:
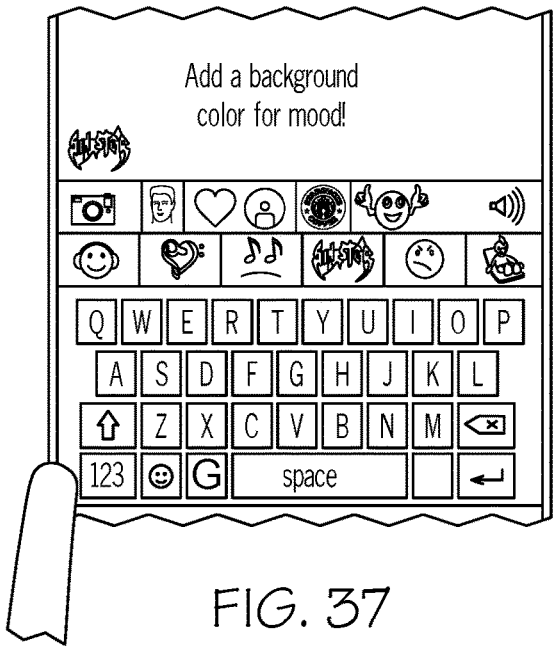
Figure 38:
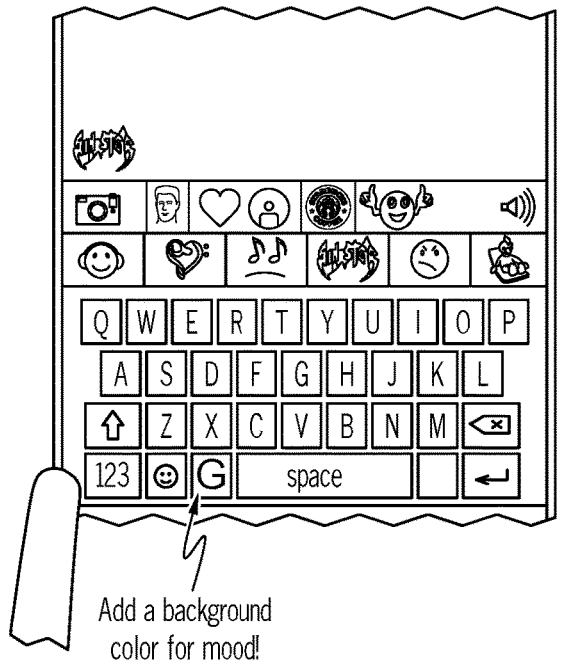
Figure 39:
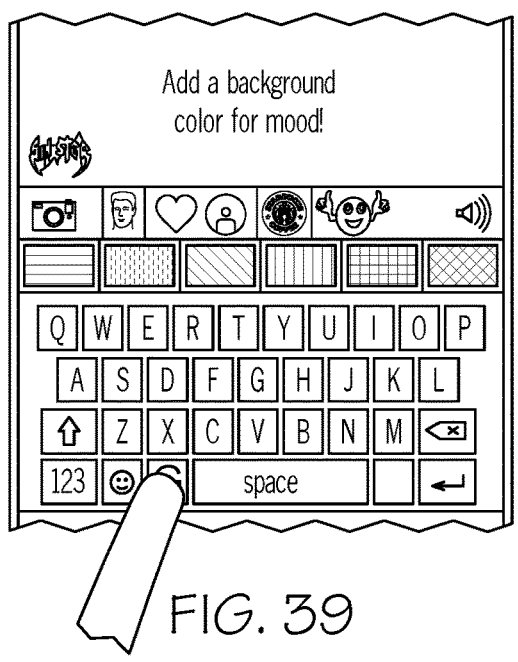
Figure 40:
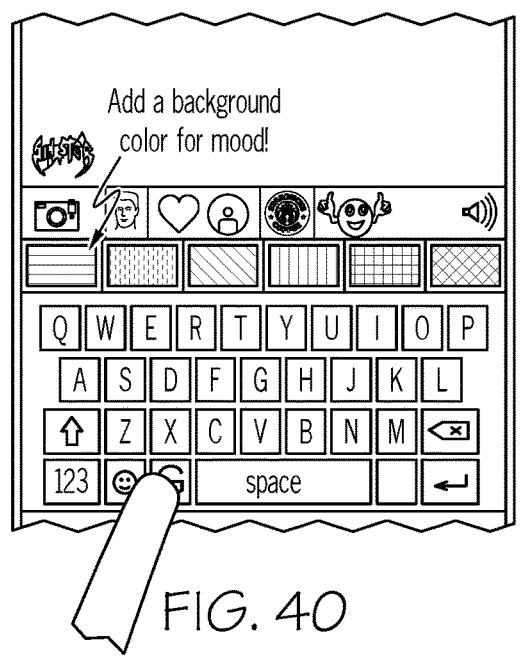
Figure 41:
Figure 42:
Figure 43:
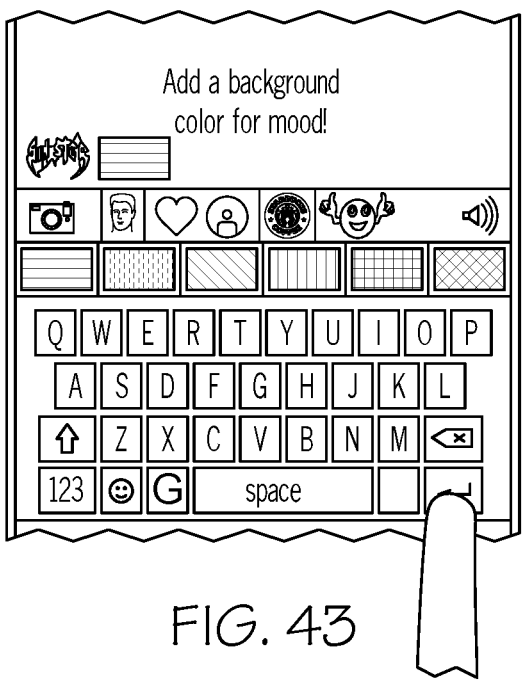

Referring now to FIGS. 5-16, a texting example of a JGist message is described. Each smartphone (both the sender and the receiver) has a JGist application installed (as is well know in the art). In FIG. 5, a message "Meet me at Starbucks at 1 PM", shown at 20, is translated into symbols, shown at 22. In FIG. 6, the symbol for "meet" is shown at 24, a picture icon which would be provided for each user is shown at 26, the "@- or AT" icon is shown at 28, a Starbucks icon for a particular Starbucks located at particular GPS coordinates is shown at 30 (which allows Starbucks to send both the sender and receiver a coupon once the message is sent, if they wish to). Finally, the time icon, which could be selected to show 1:00 PM, could be selected to show a Bulova watch at 32 (which would allow Bulova to send a coupon to the sender and receiver if they wished). If either the sender or receiver touches the Starbucks icon 30, they are taken to the information of FIG. 7.

Figure 44:
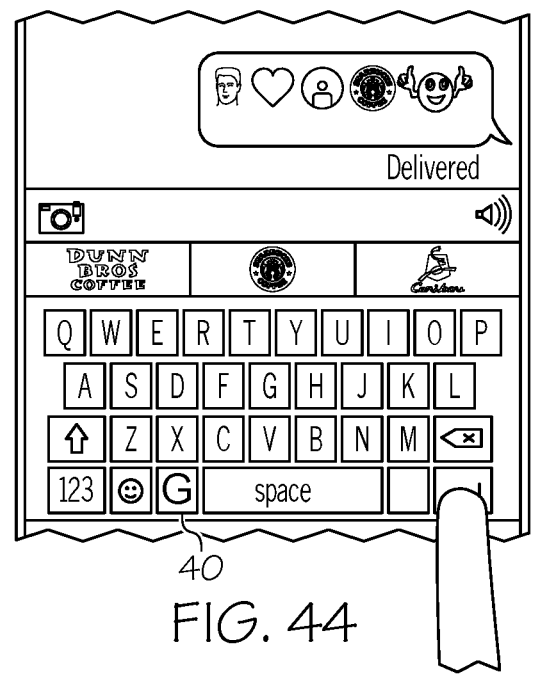
Figure 45:
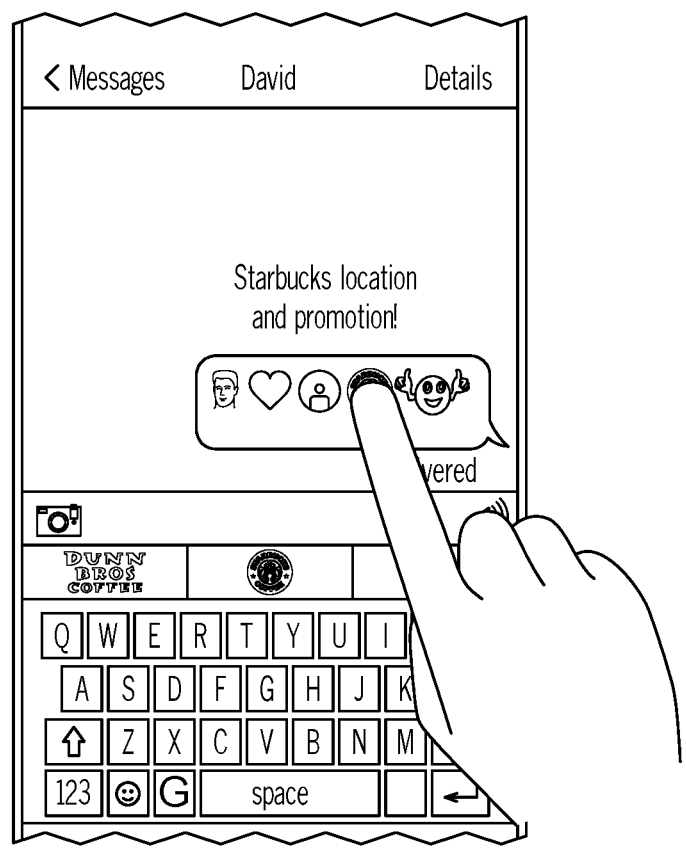

Referring now to FIGS. 17-45, a step by step guide of how to compose a JGist message using the JGist application is shown. In FIG. 44, the symbolic message "I love my Starbucks coffee" is shown delivered and FIG. 45 shows that if either the sender or receiver touches the starbucks icon, they will be taken to a screen showing the starbucks location and any coupon which may be offered at that particular starbucks at that particular time.

Figure 46:
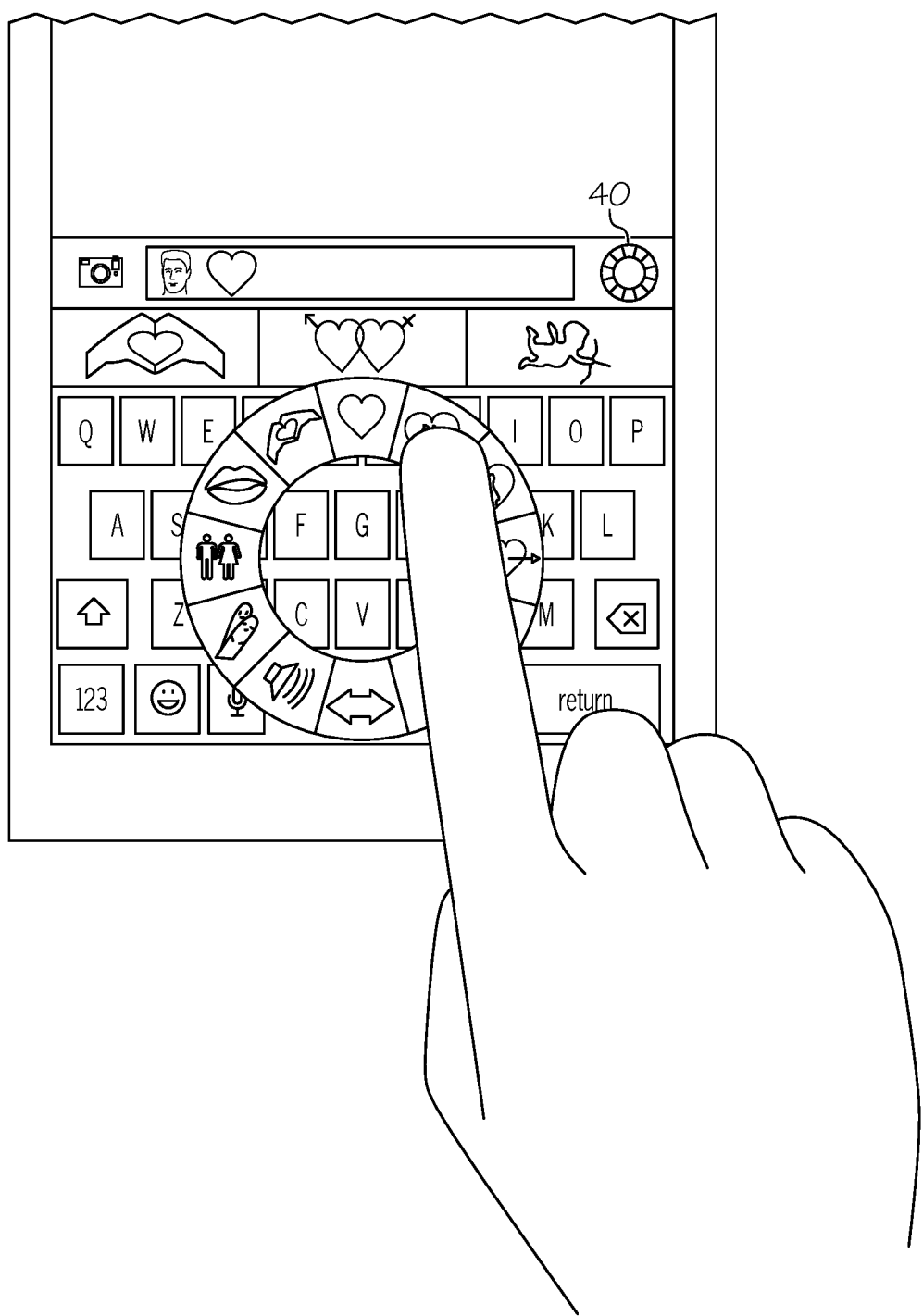
FIGS. 46-65 show the JGist symbolary selection wheel in more detail.
Figure 47:
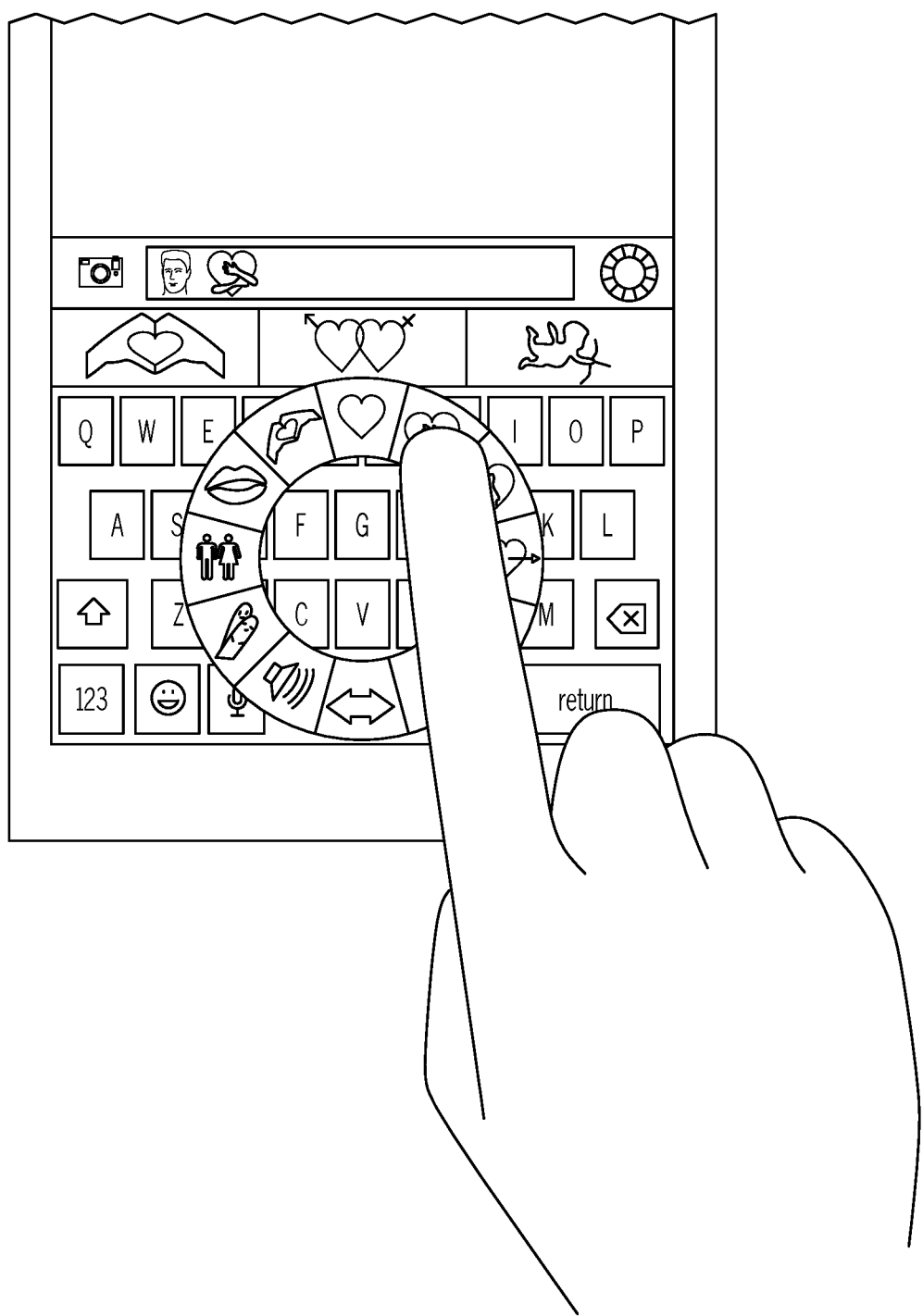
Figure 48:
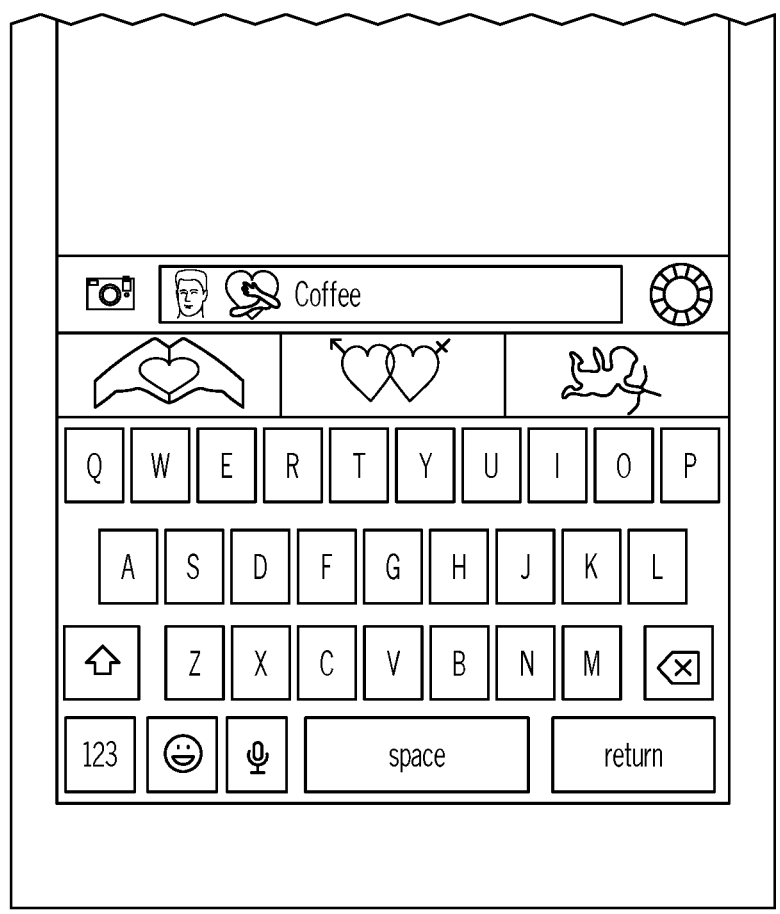
Figure 49:
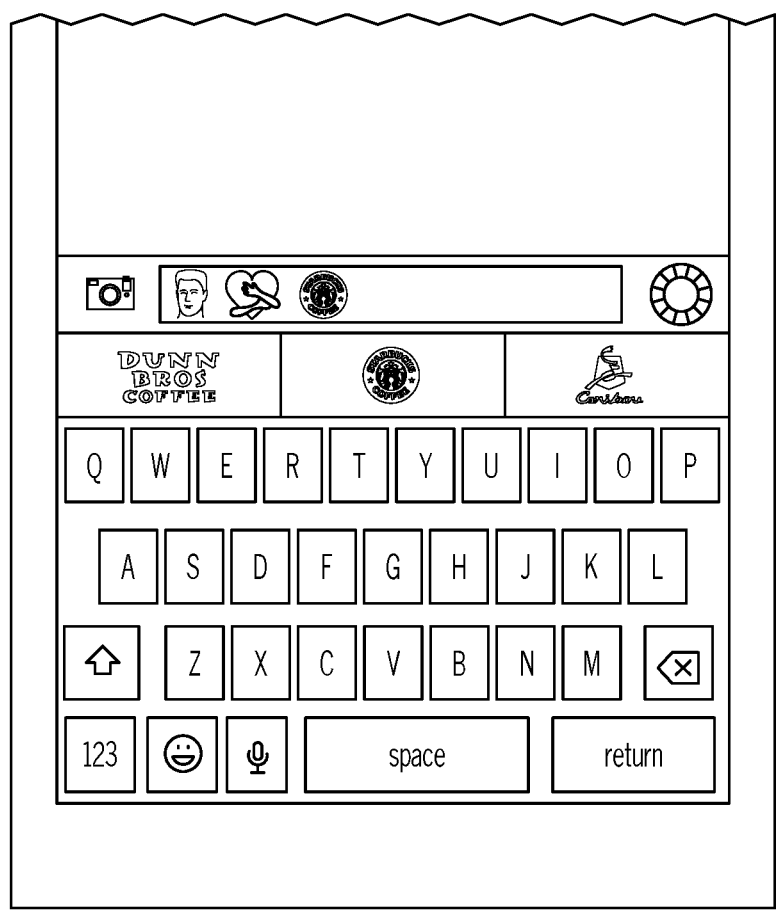
Figure 50:
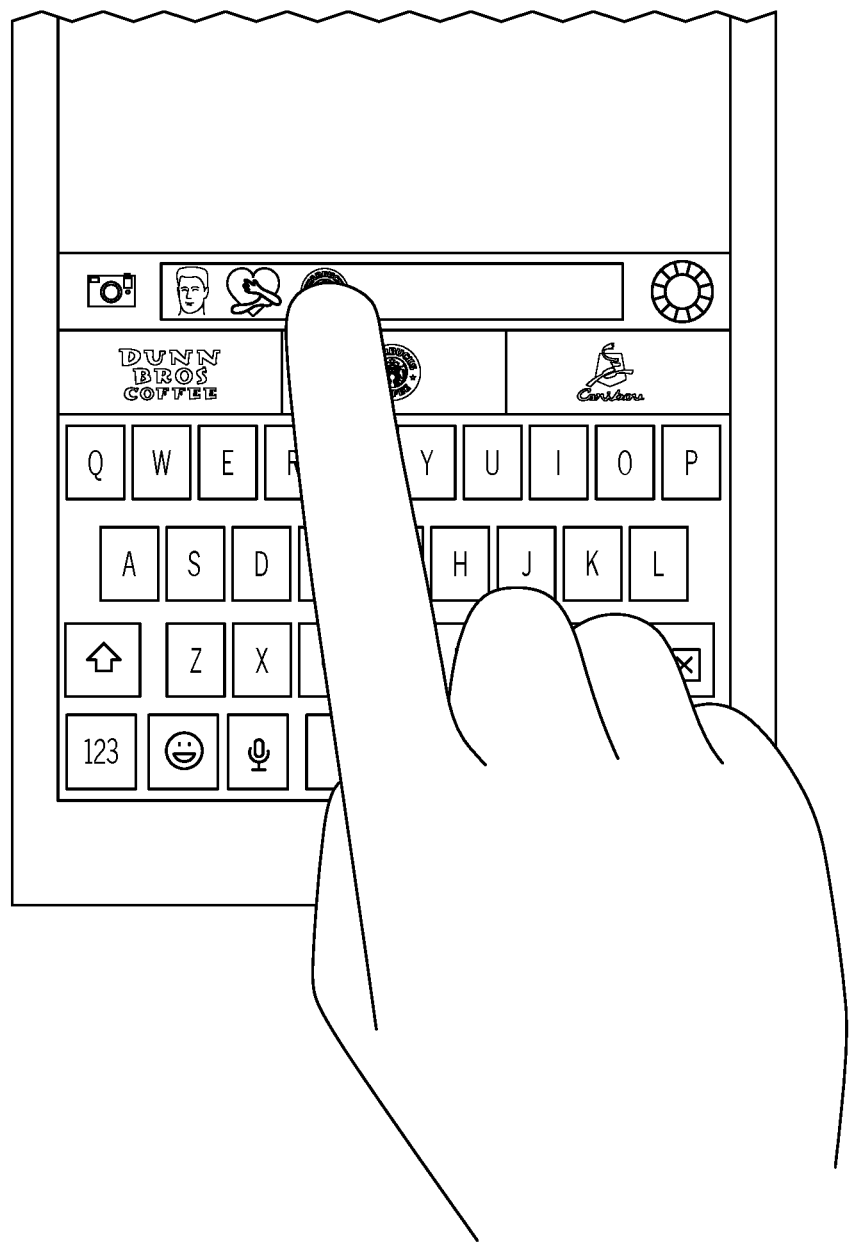
Figure 51:
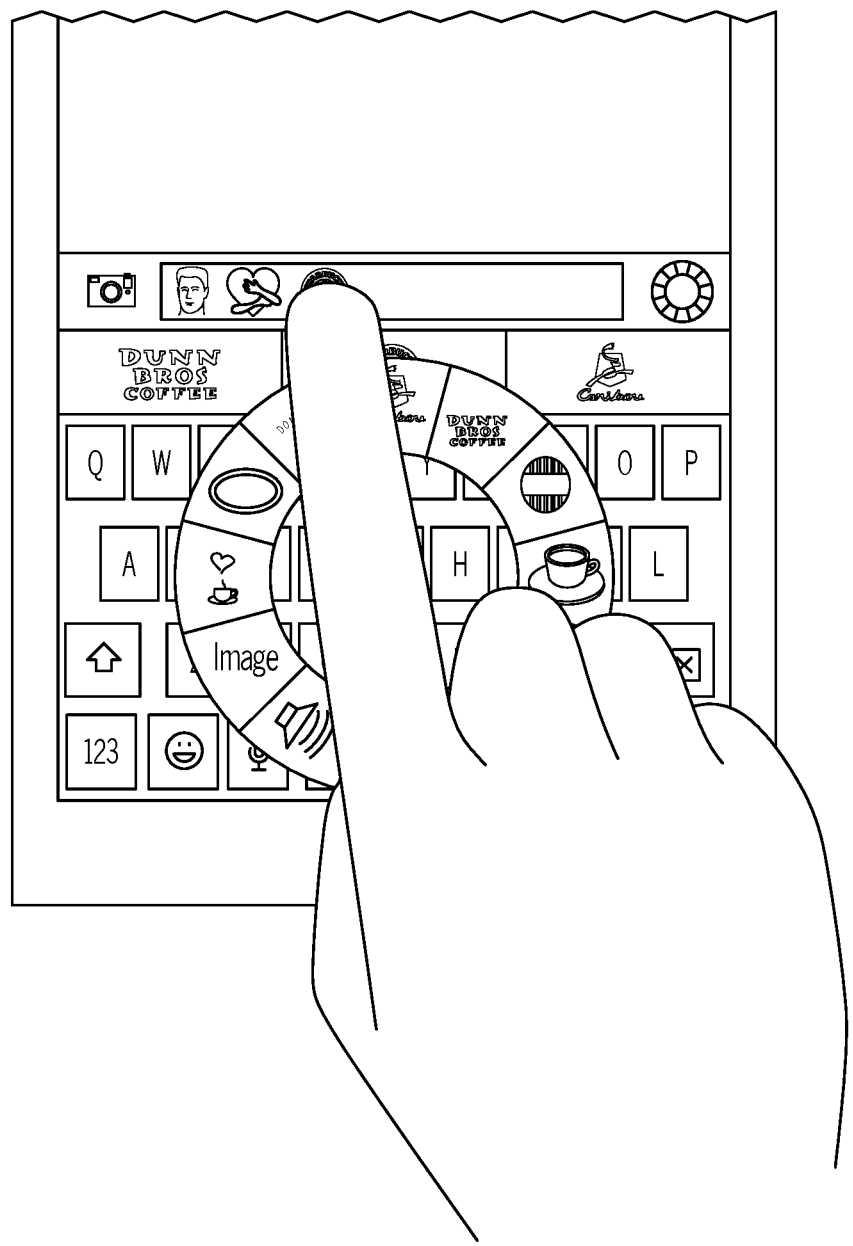
Figure 52:
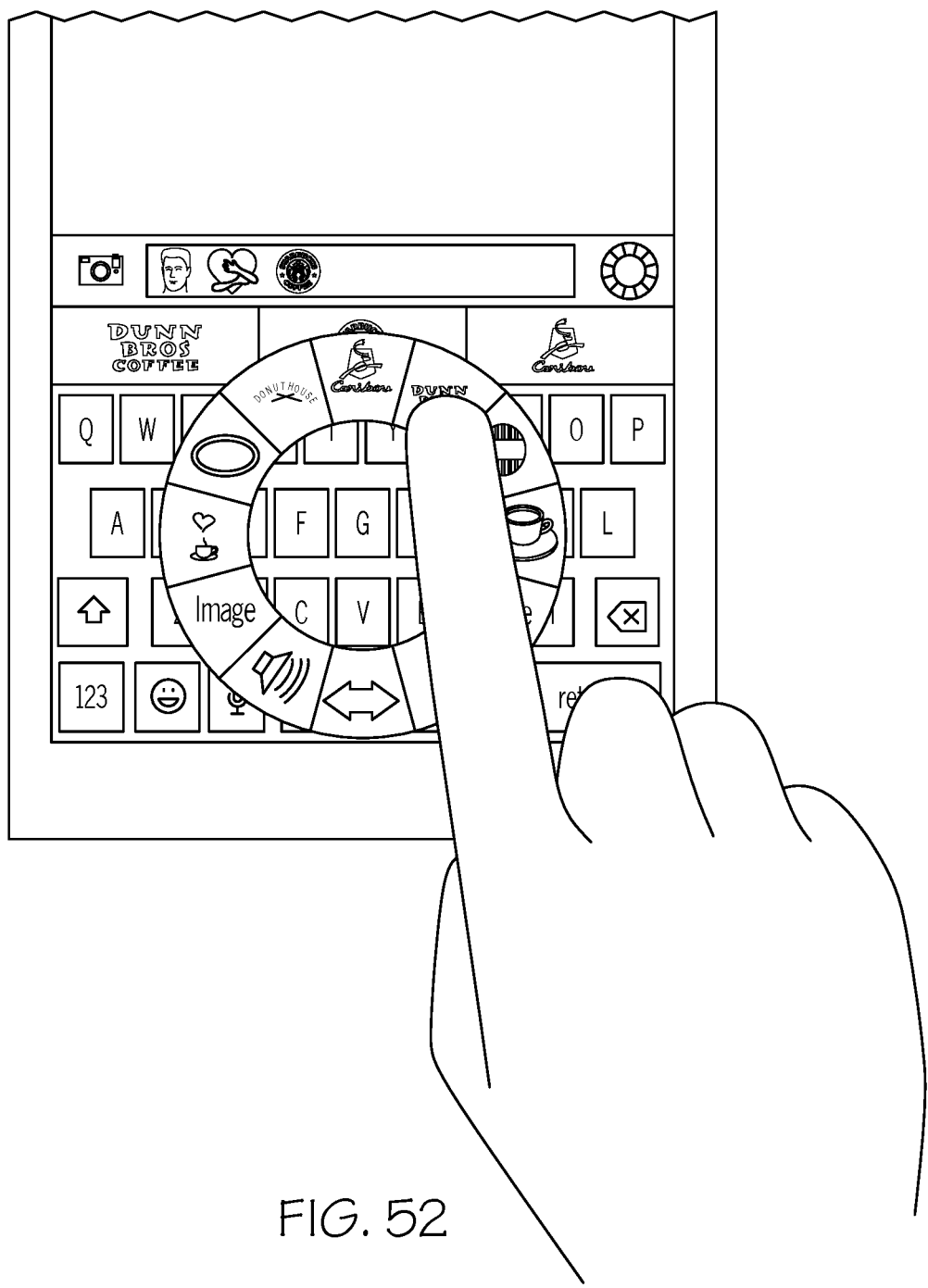
Figure 53:
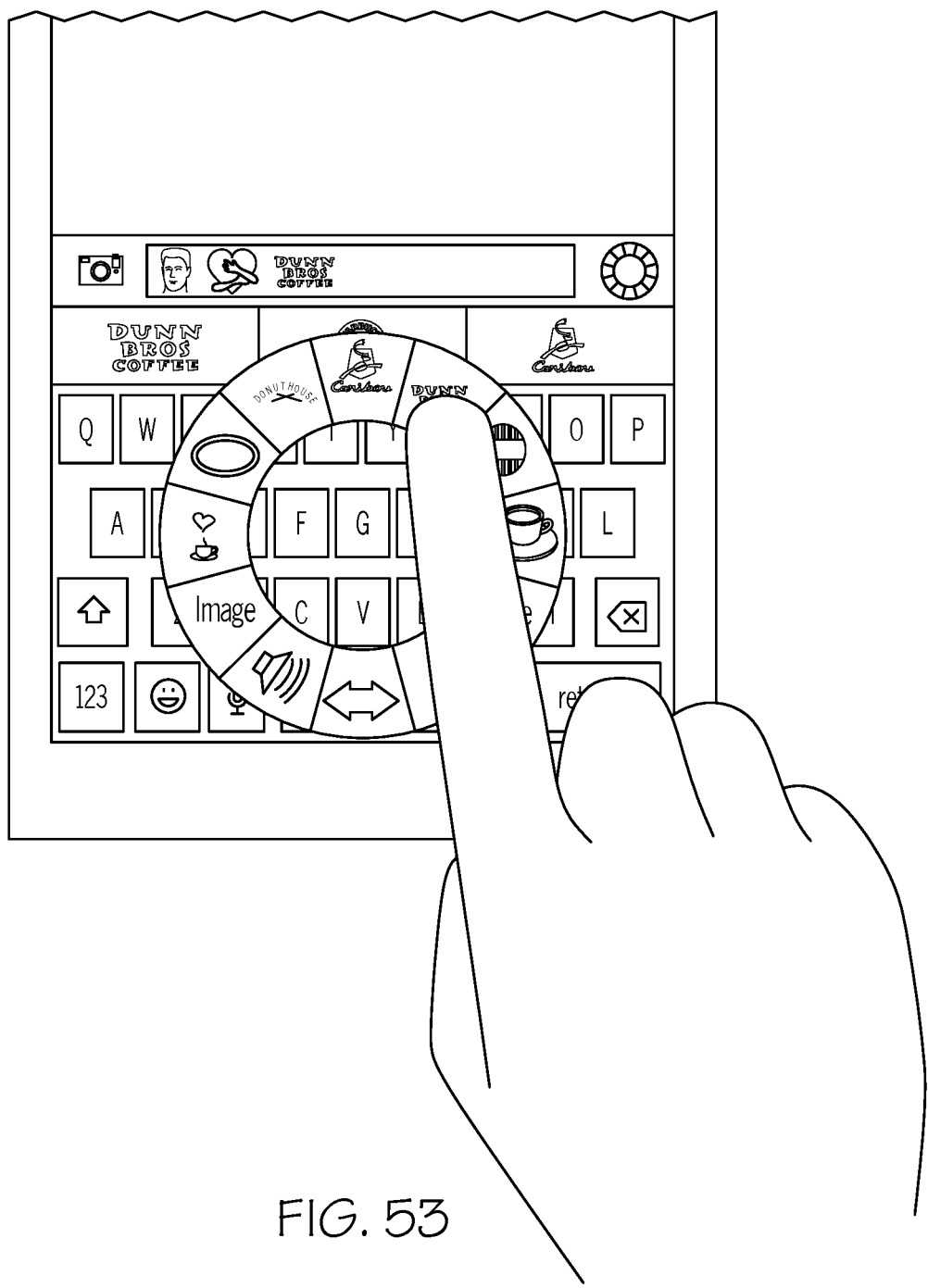

Referring now to FIGS. 46-65, the JGist symbolary selection wheel is described in more detail. The JGist Symbolary Selection wheel is used to create the consensus-popular use of symbols. This is the primary function of this wheel, (This is at the heart of creating the universal symbols system language). Other forms of selection processes can be used to replace of the symbolary selection wheel. The JGist wheel appears when the user selects the JGist icon (shown in FIG. 44 at reference numeral 40 or icon 40 in FIG. 46). The wheel organizes the symbols by subject matter, so for example, if the word coffee is typed (as in FIG. 48, and the wheel activated as in FIG. 51, a variety of coffee symbols are made available.

Figure 54:
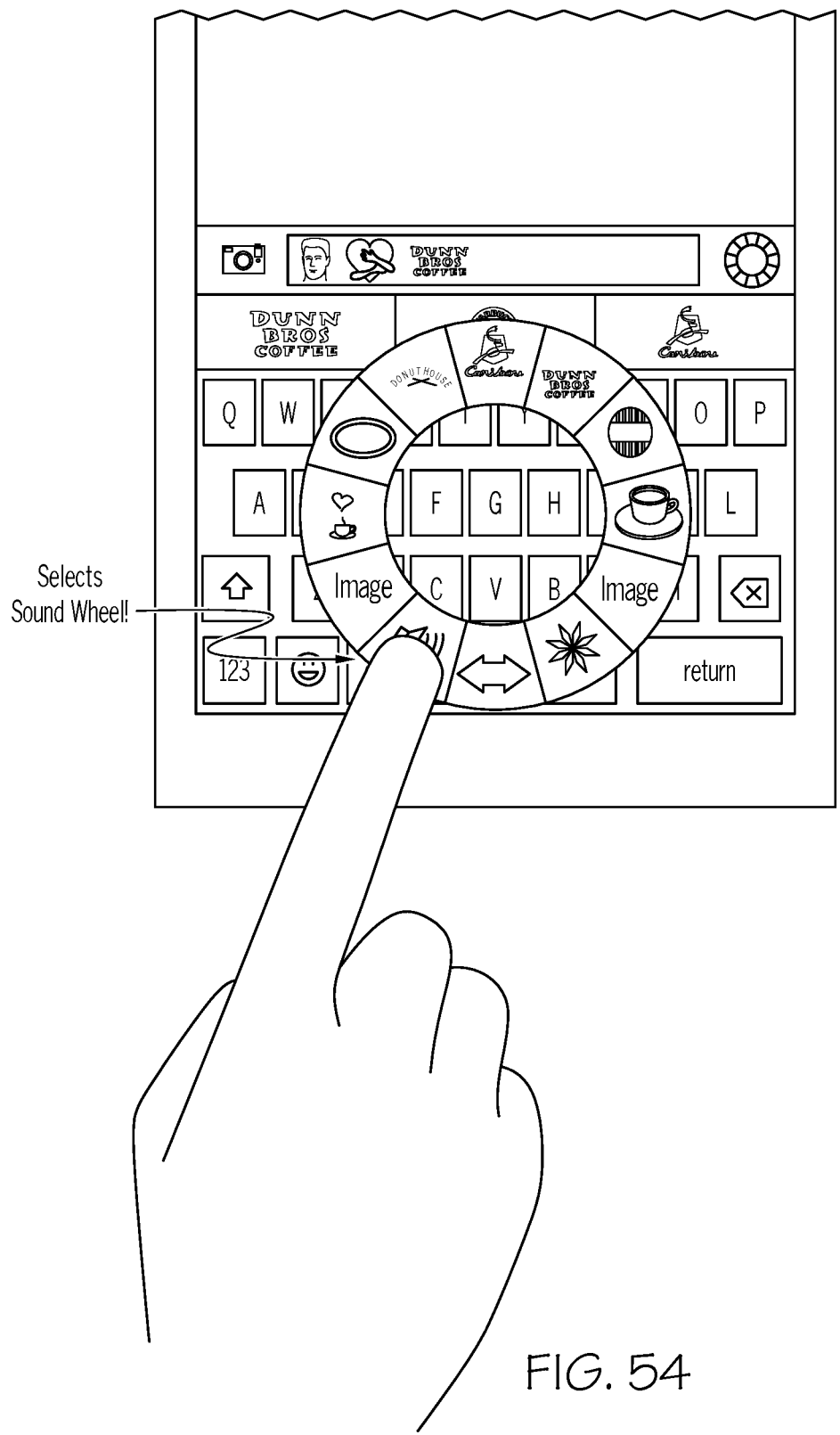
Figure 55:
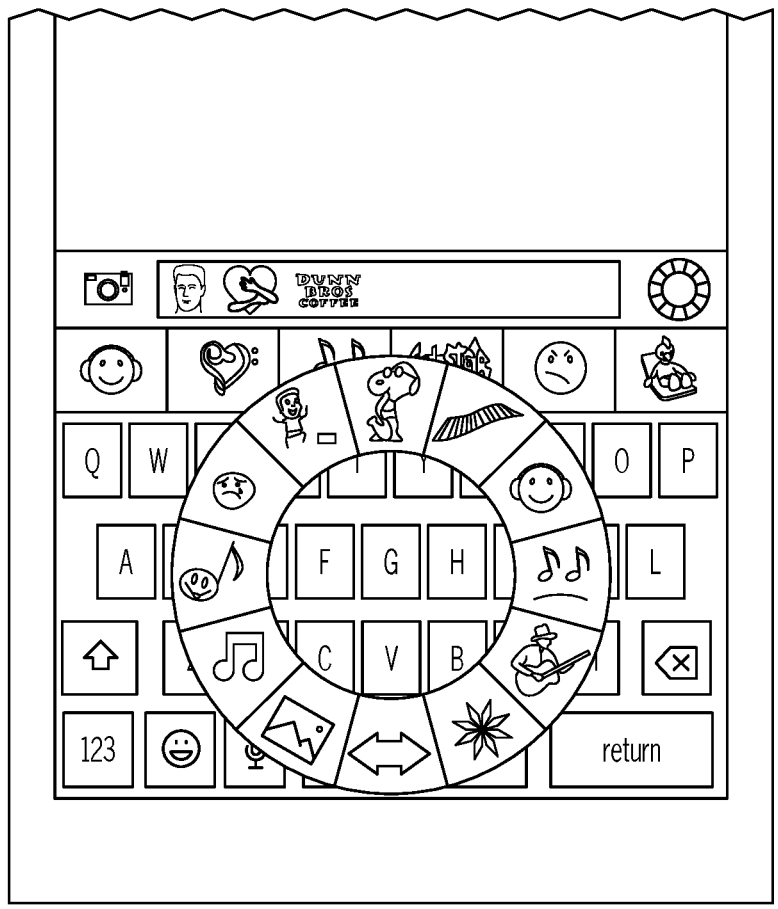
Figure 56:
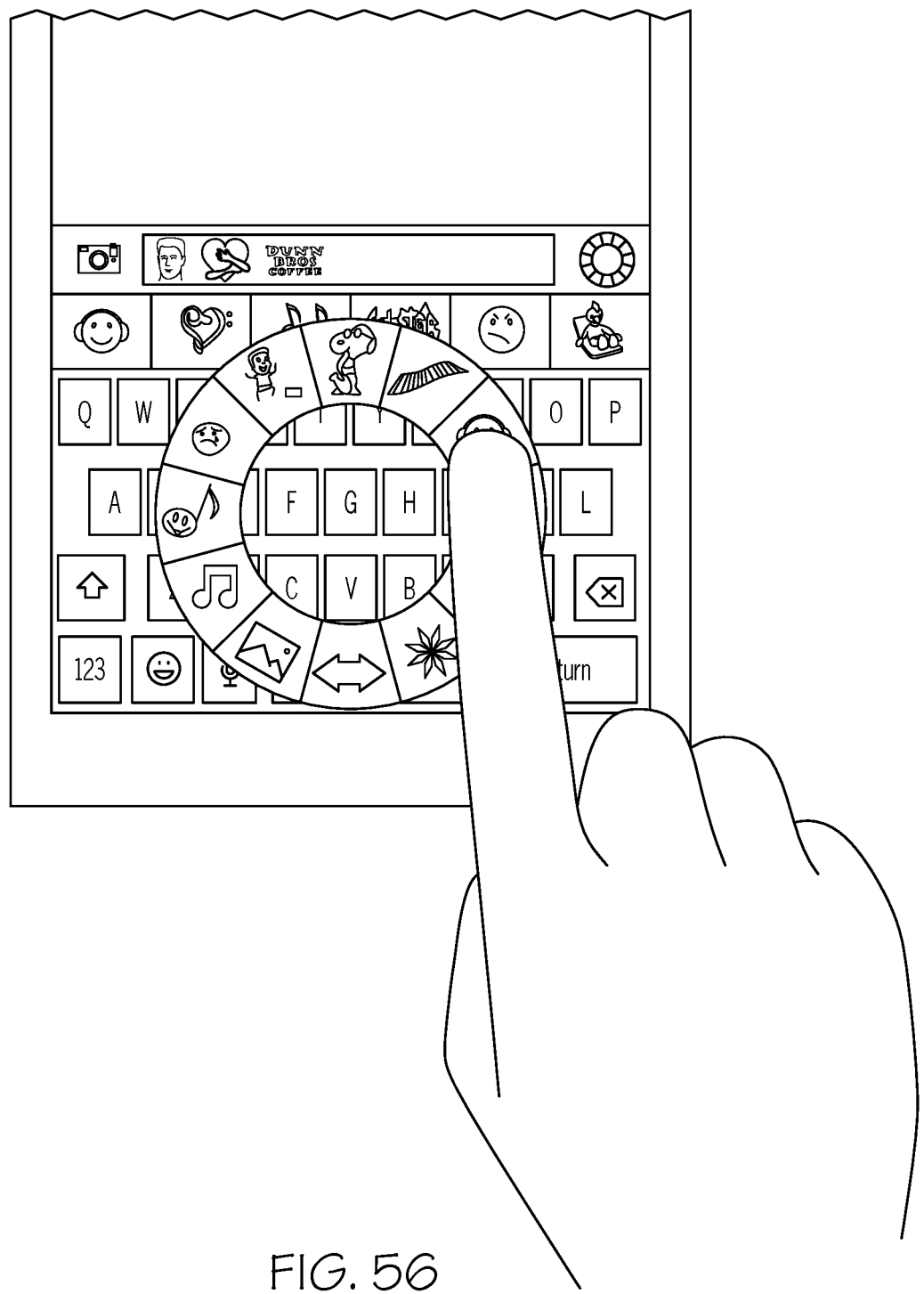
Figure 57:
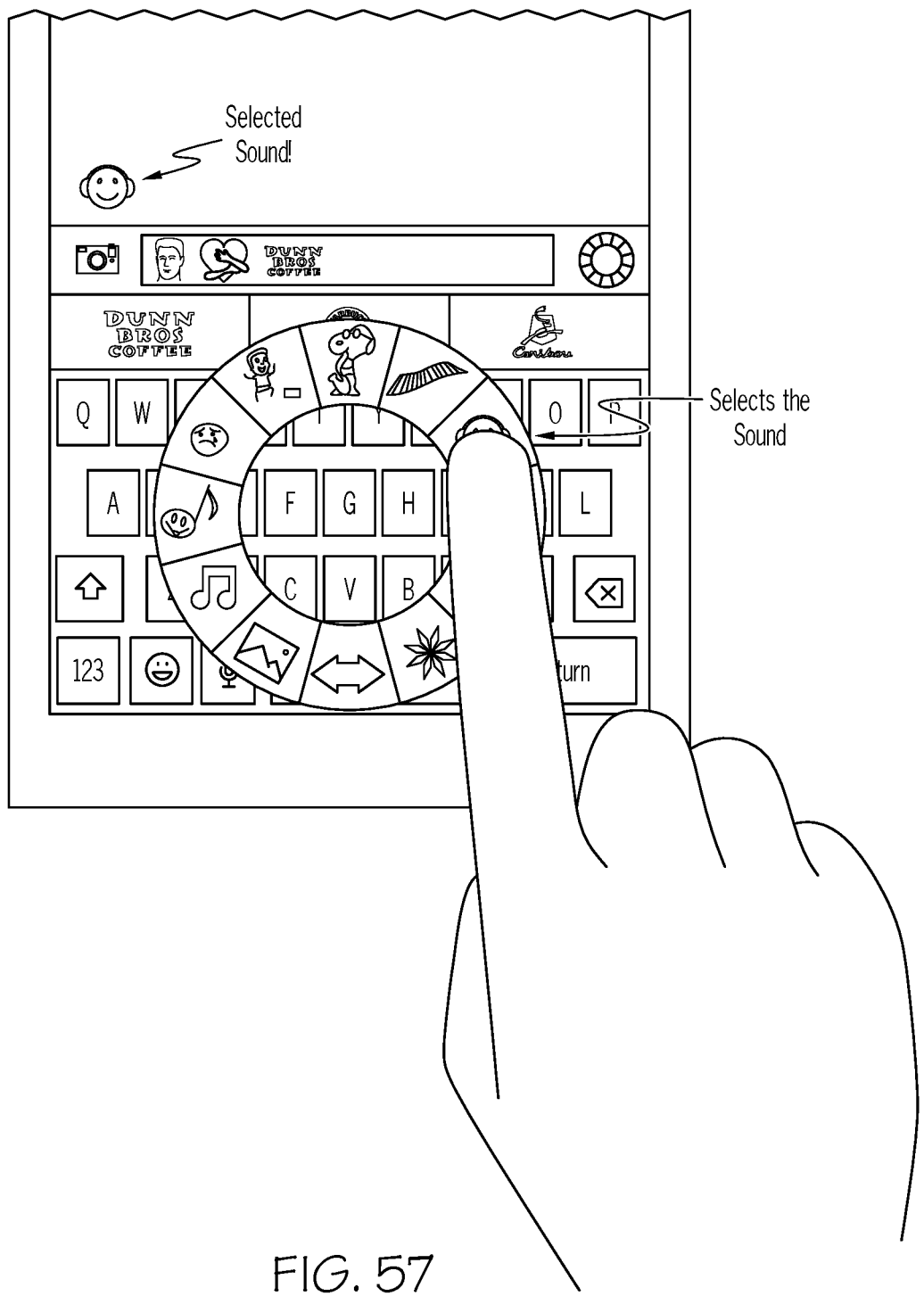
Figure 58:
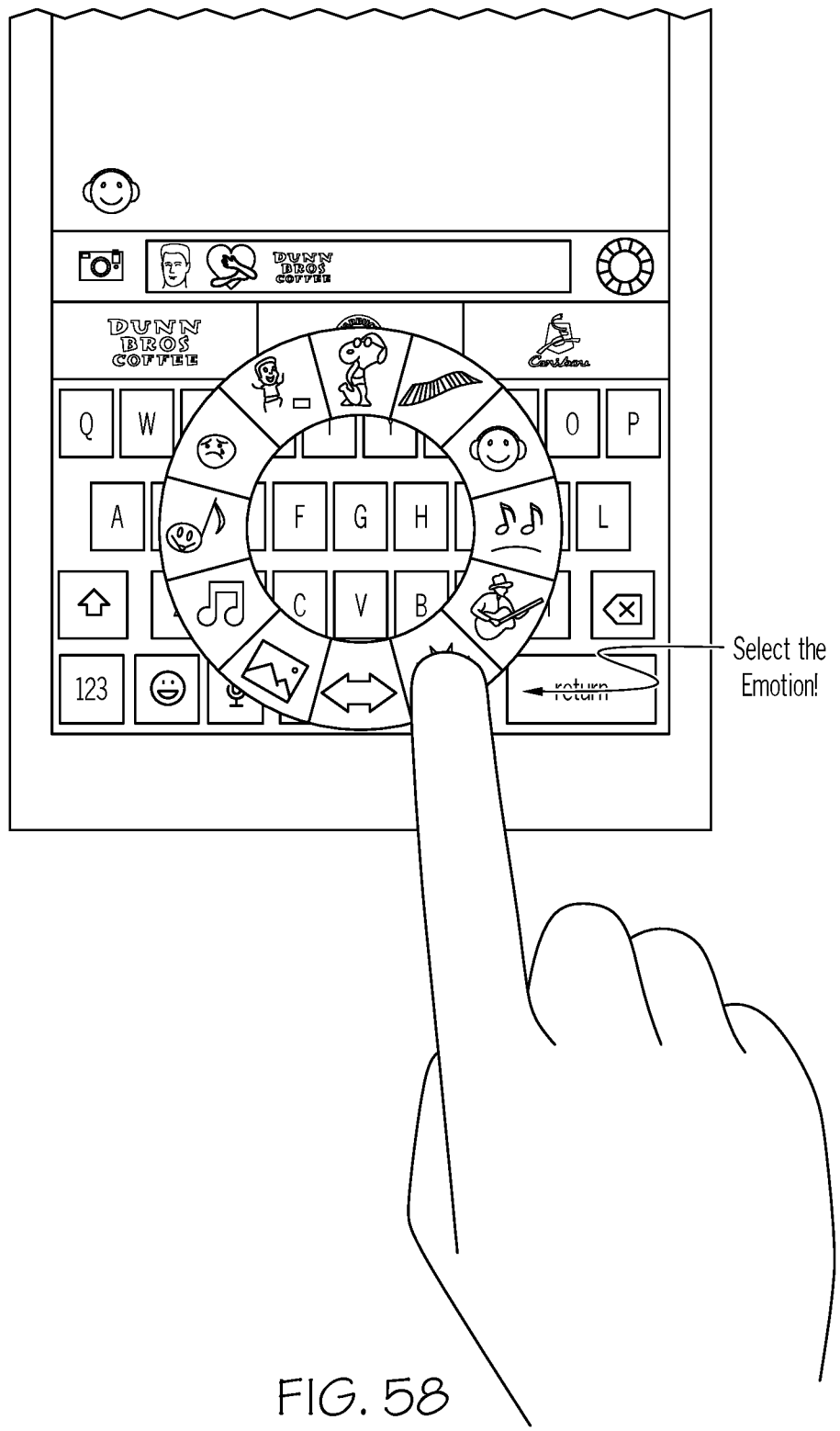
Figure 59:
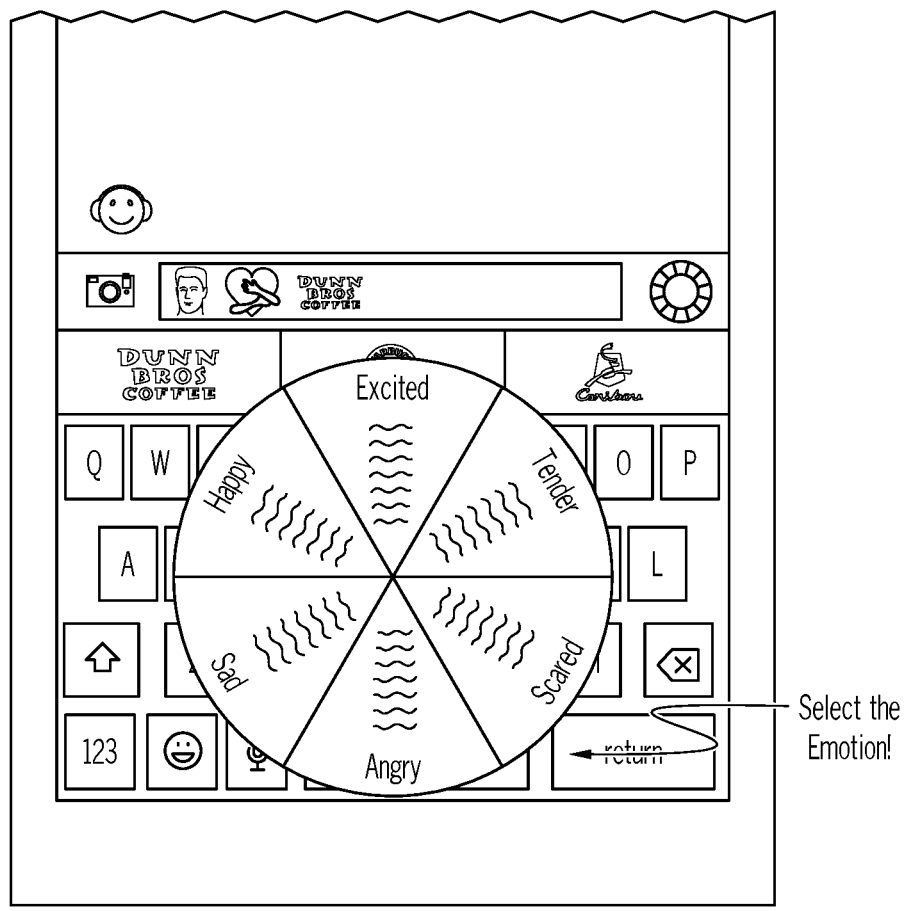
Figure 60:
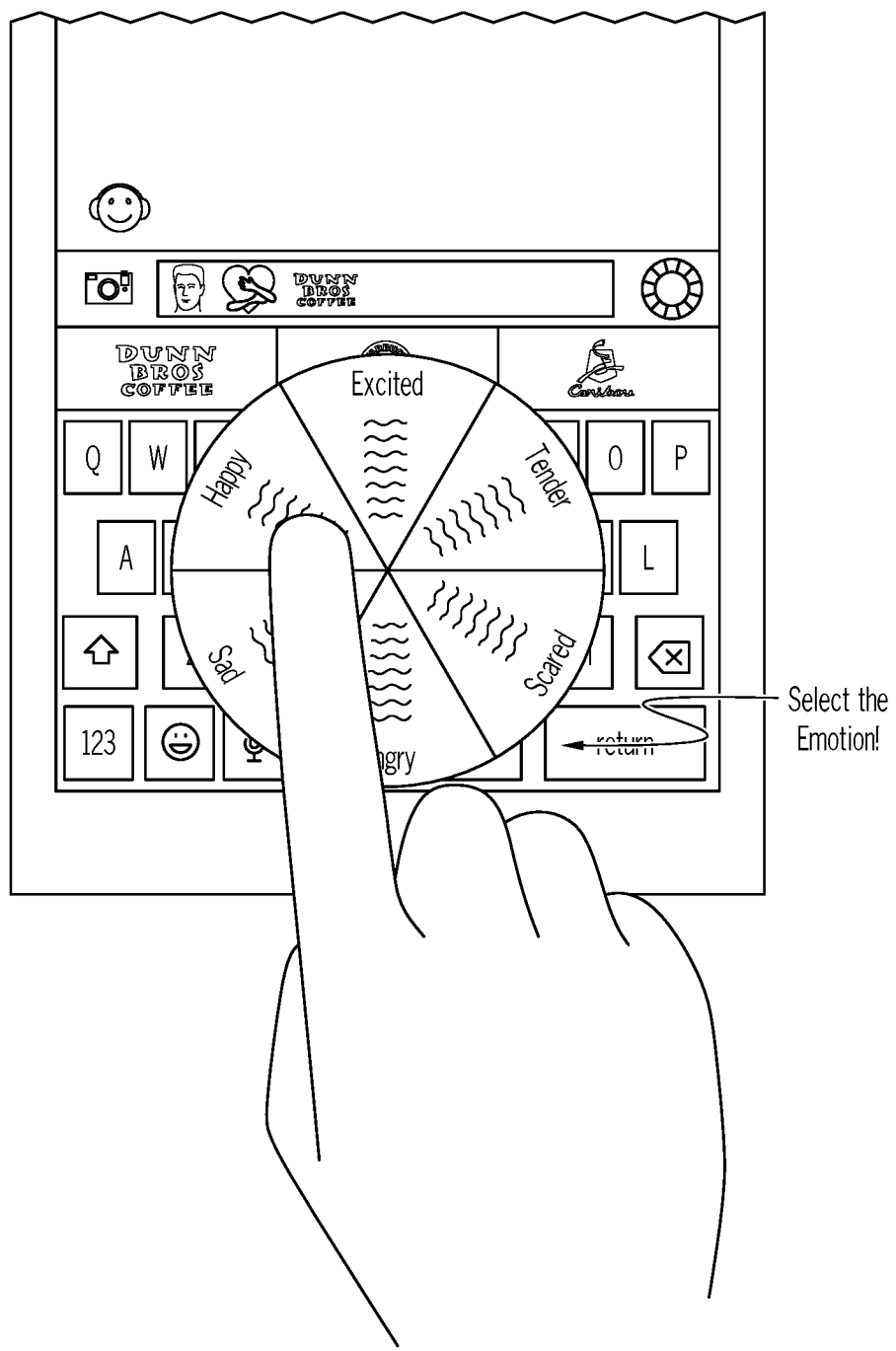
Figure 61:
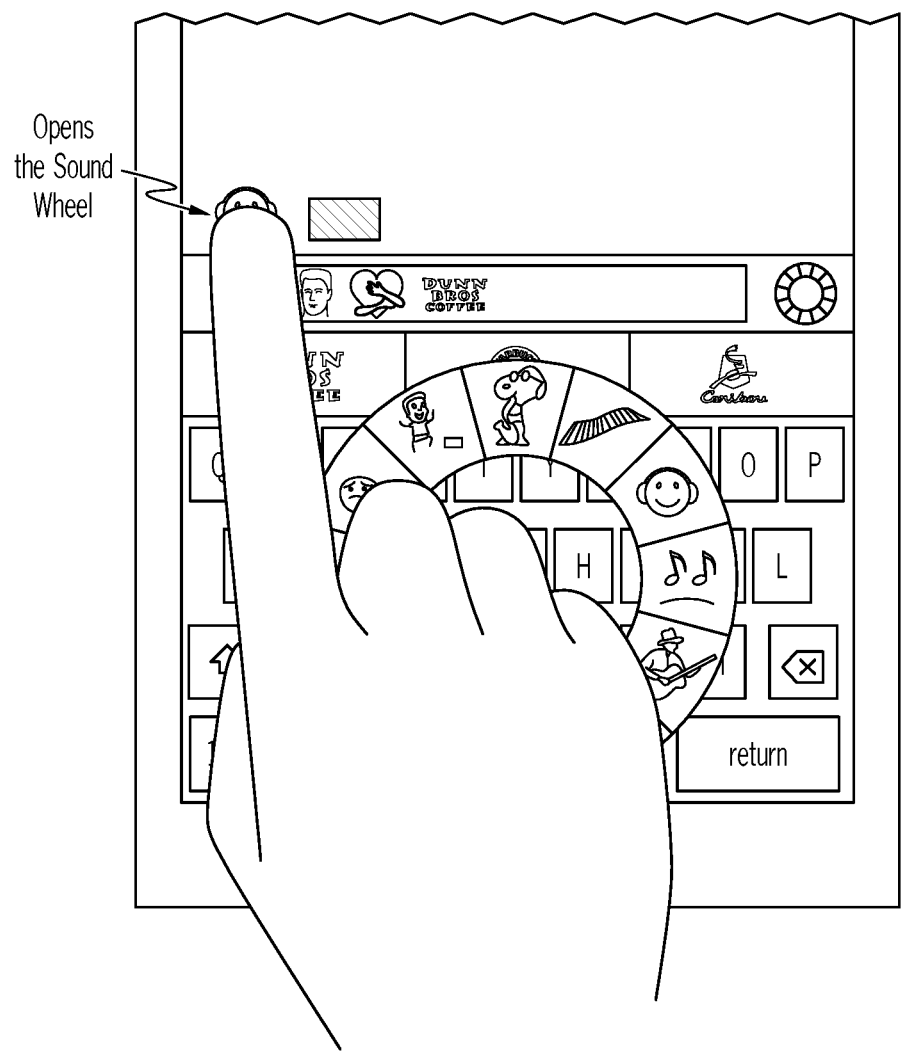
Figure 62:
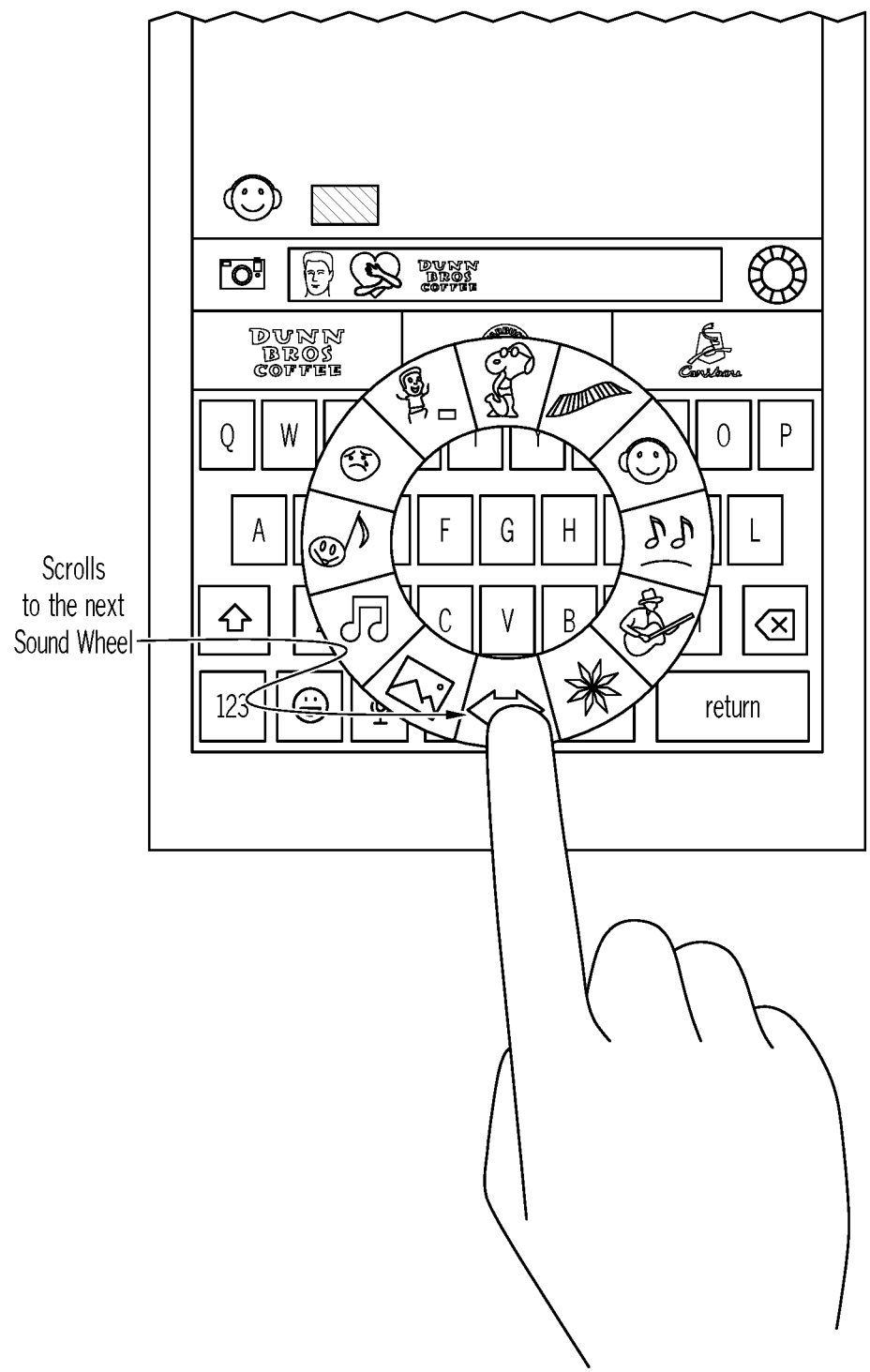
Figure 63:
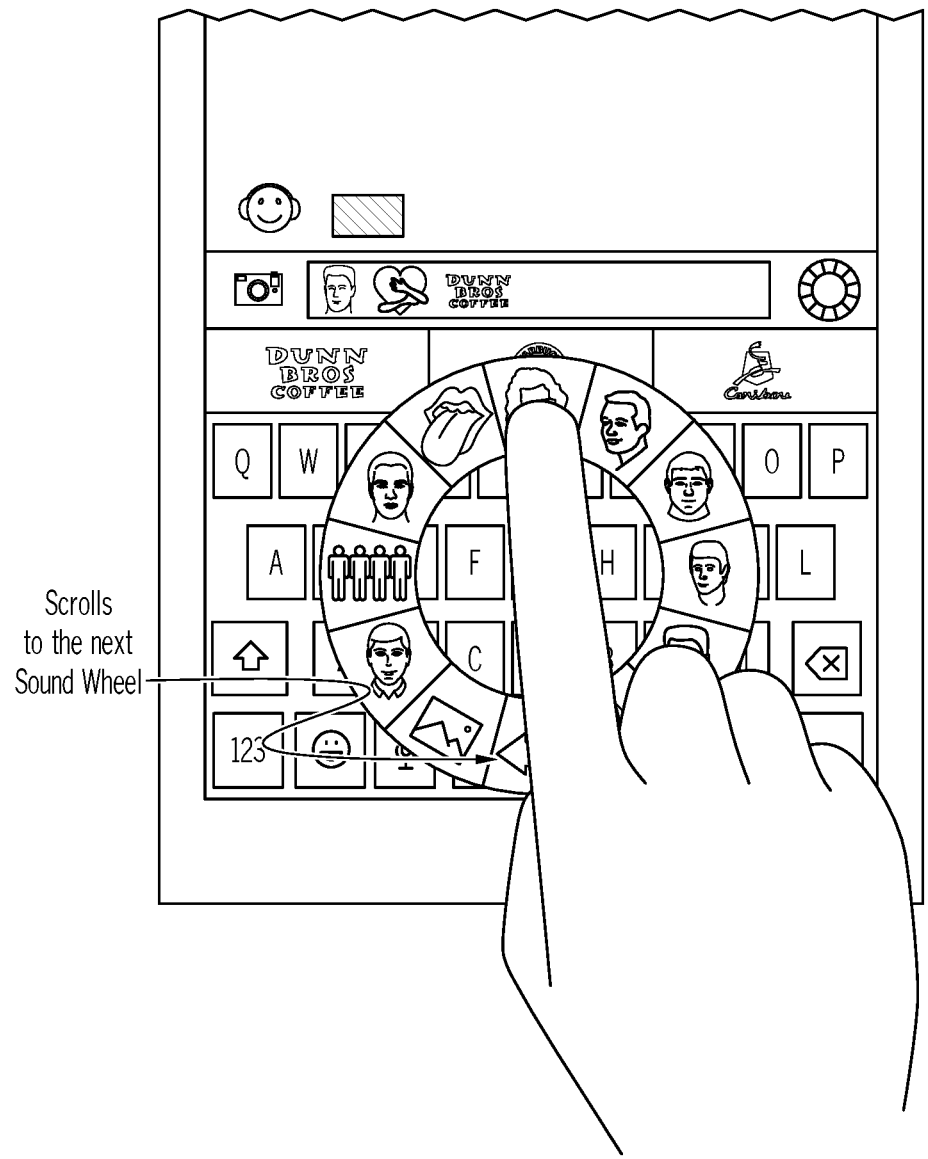
Figure 64:
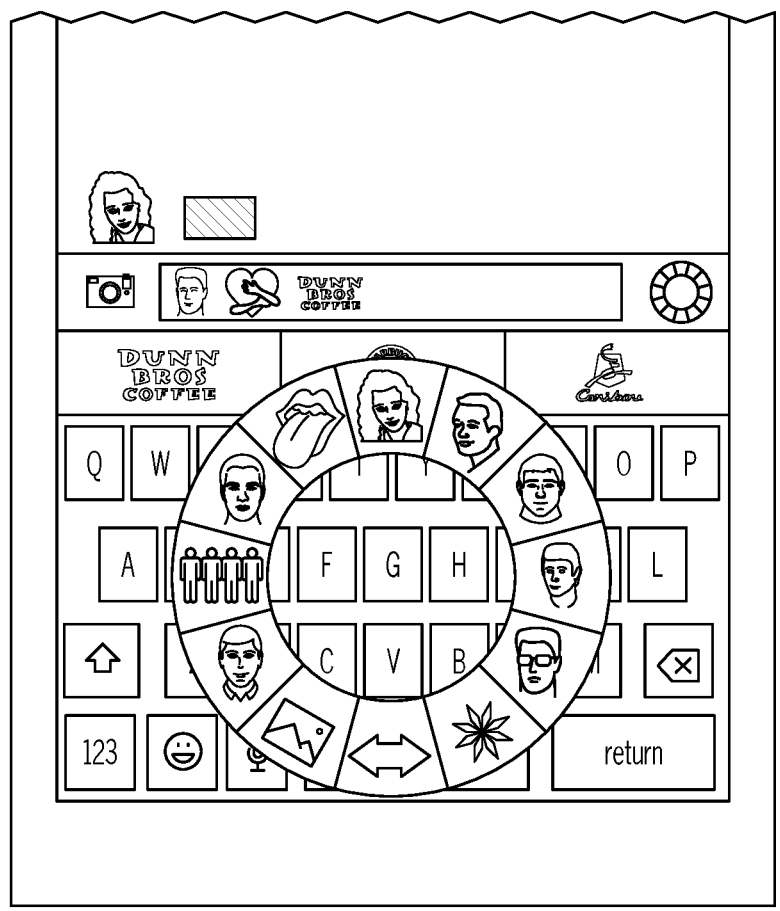
Figure 65:
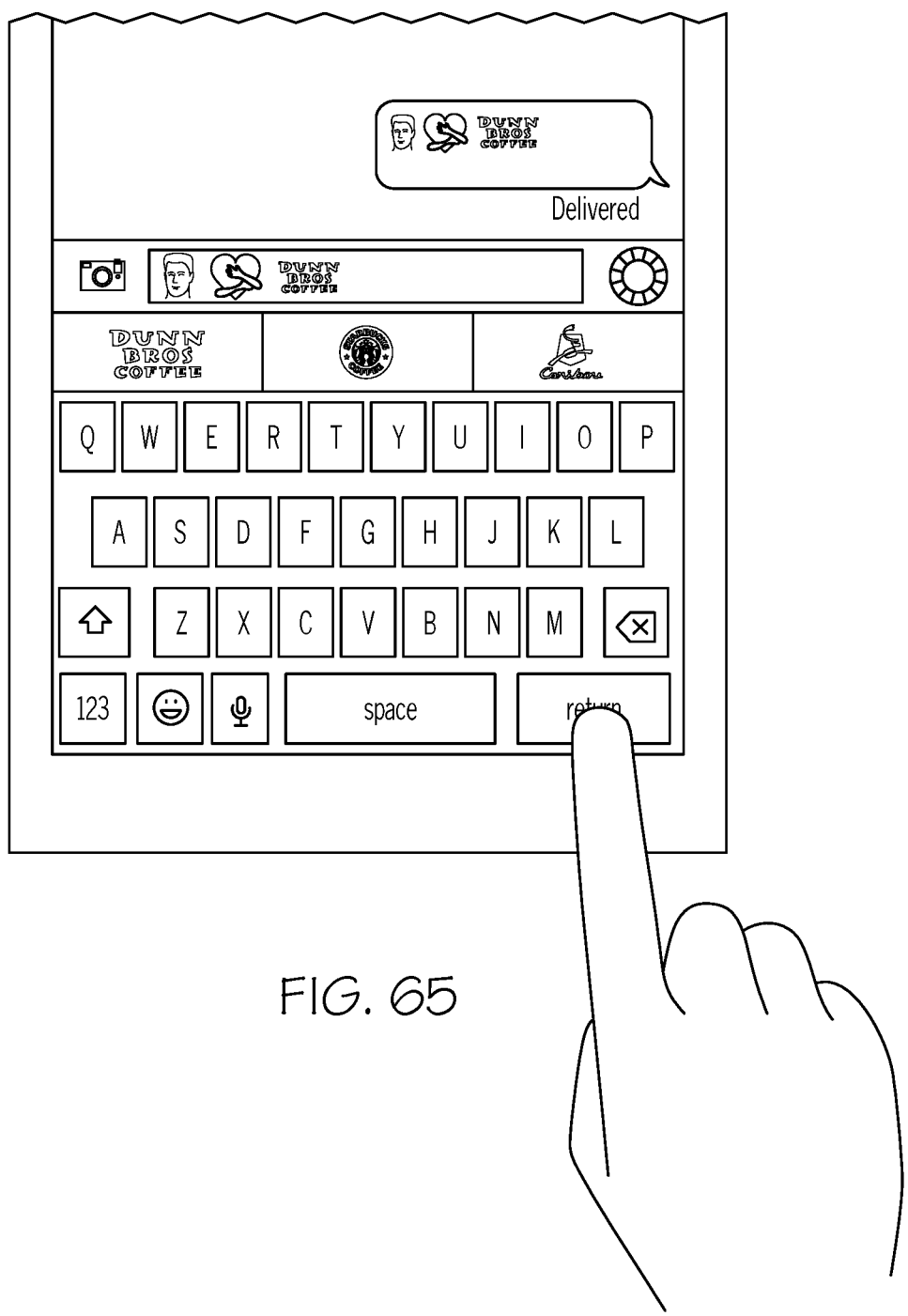

The wheel also allows different senses to be selected—for example in FIG. 54 a sound can be inserted into the JGist message. FIG. 55 shows a variety of sounds available for selection (the most popular symbols as measured by their usage count in all JGist messages). The emotion icon ("feel") is shown in FIG. 58 and a variety of emotions (colours in this embodiment) are available for selection as shown in FIG. 59. FIG. 65 shows the JGist message delivered.

Reference numeral 41 is for a symbol keyboard which provides another way to access symbols, which are stored on the phone and can be directly selected and inserted into the message, rather than selecting using the wheel or the knowledge engine. Whenever a symbol, whether an image or sound or any other form of a human sense is selected, it will be processed in the symbolary selection bank-knowledge engine for consensus popular voting, organization, storage and retrieval.

Figure 67:
Figure 68:
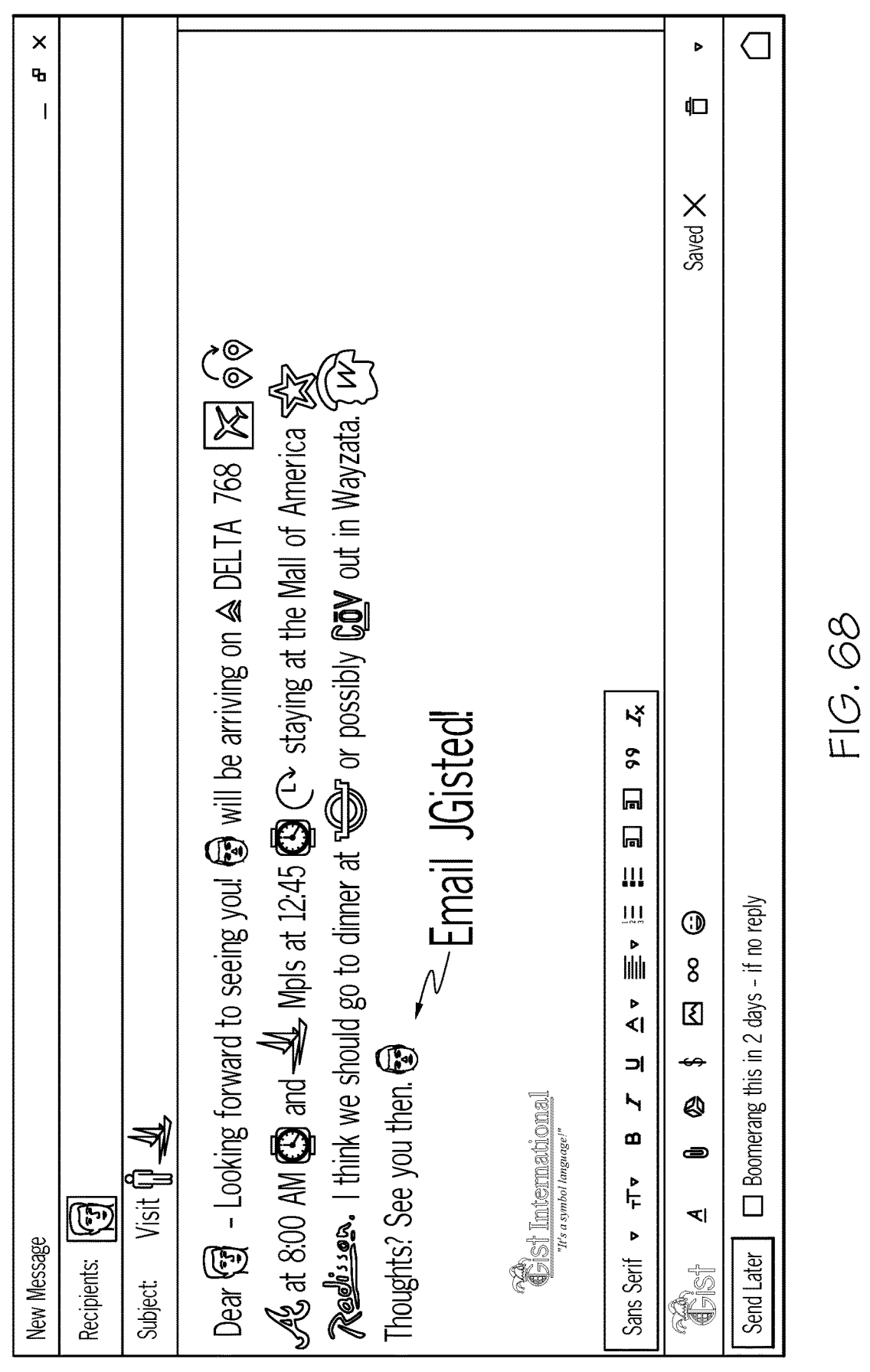
Figure 69:
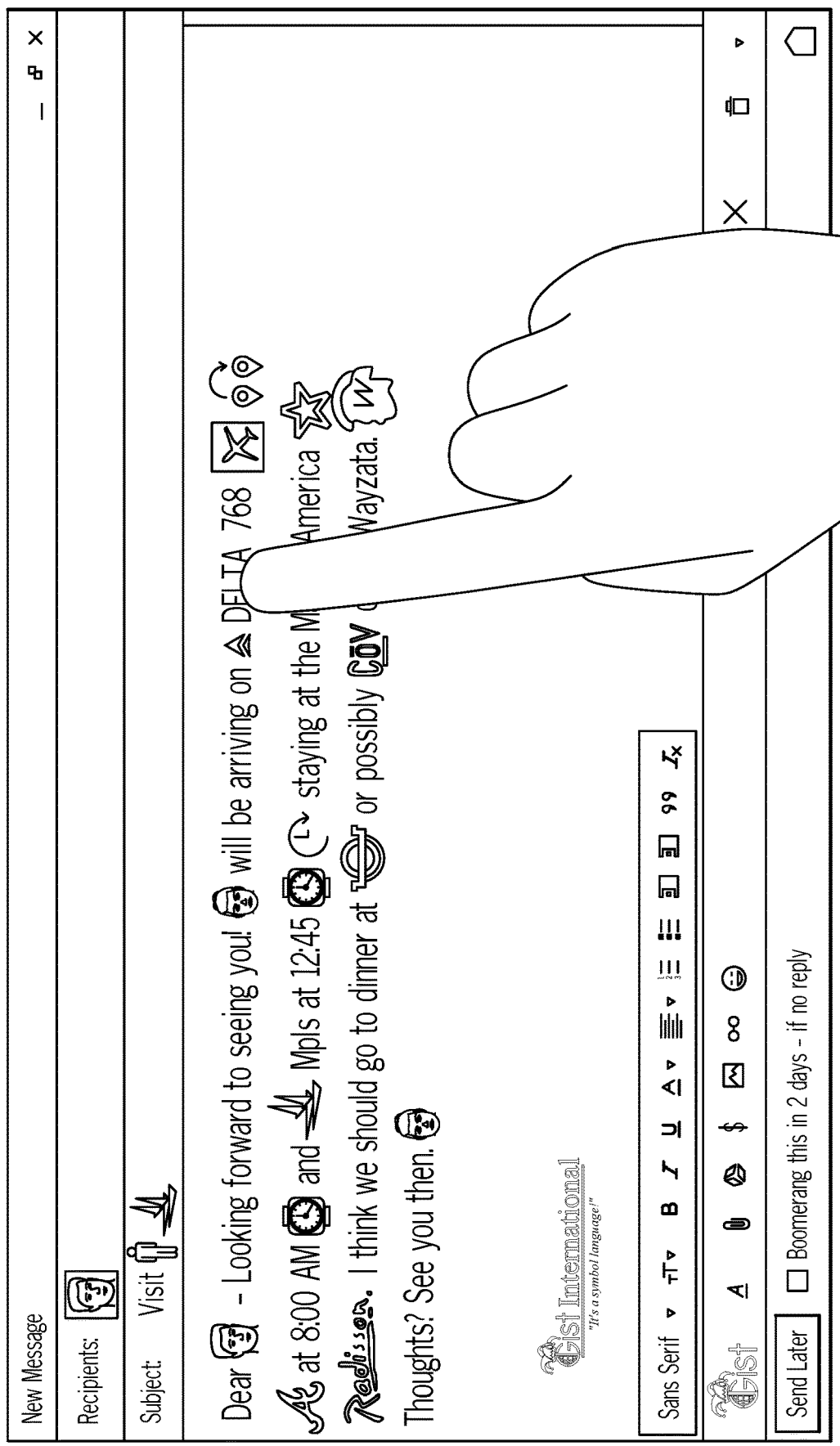
Figure 71:
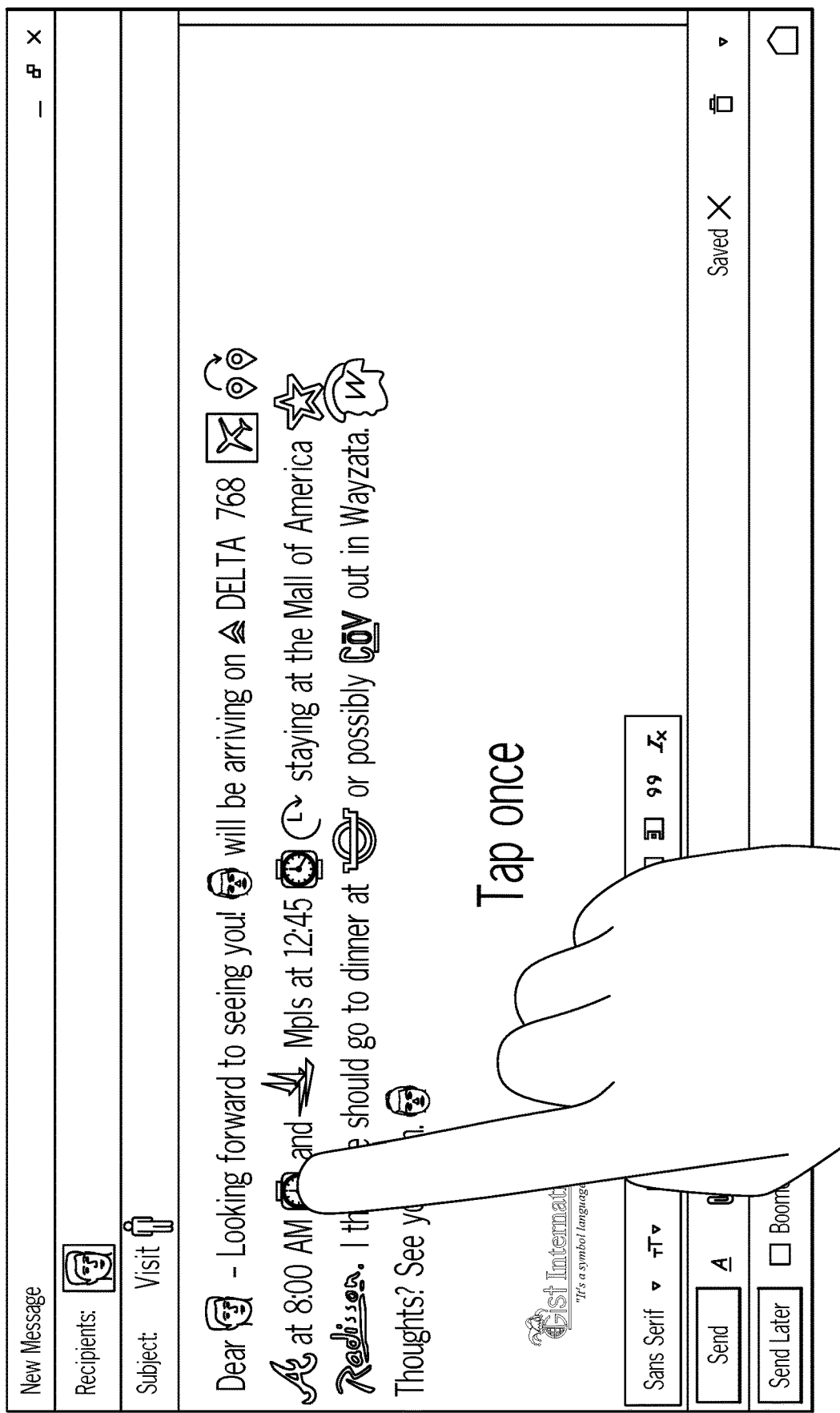
Figure 72:
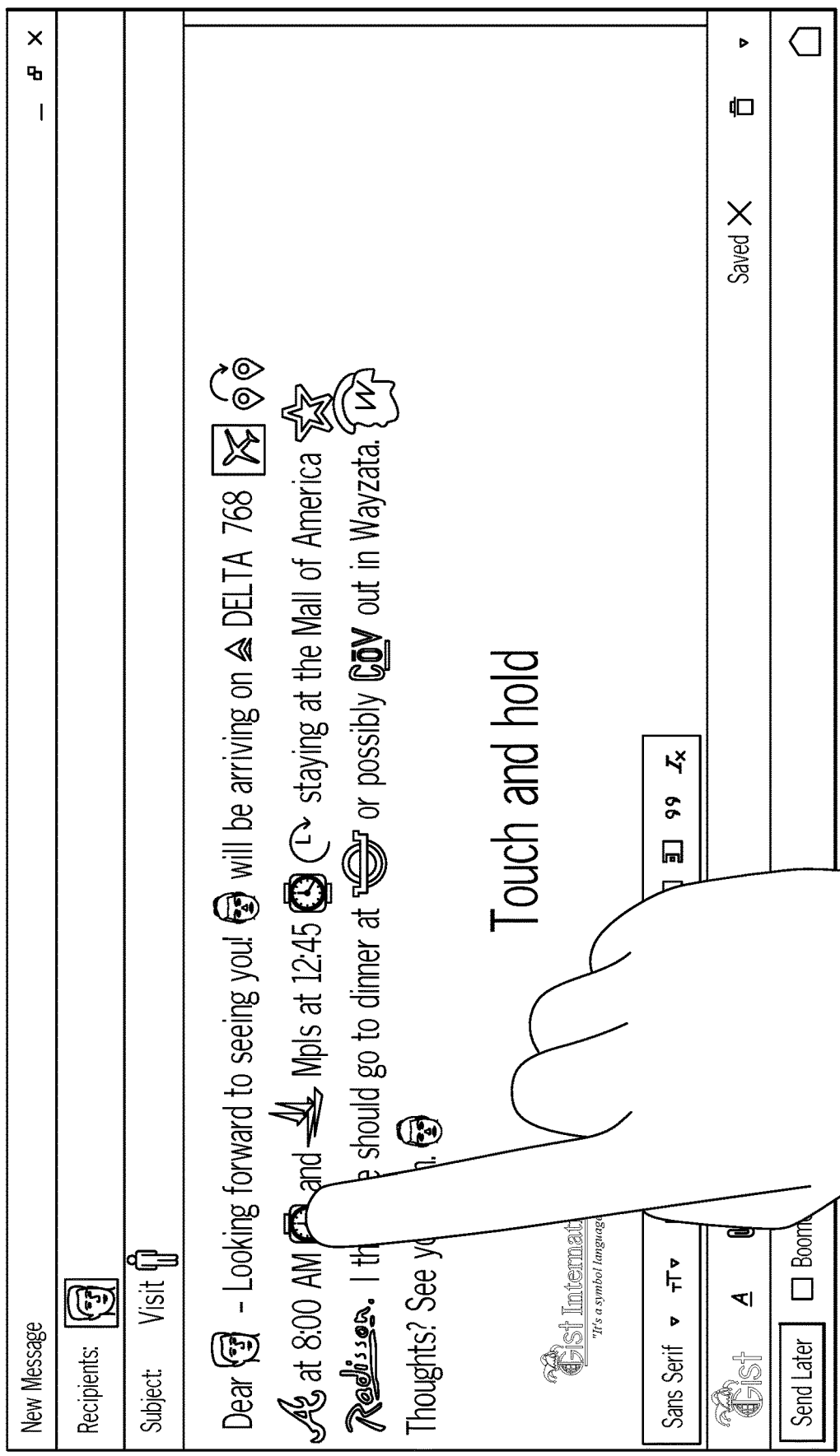
Figure 73:
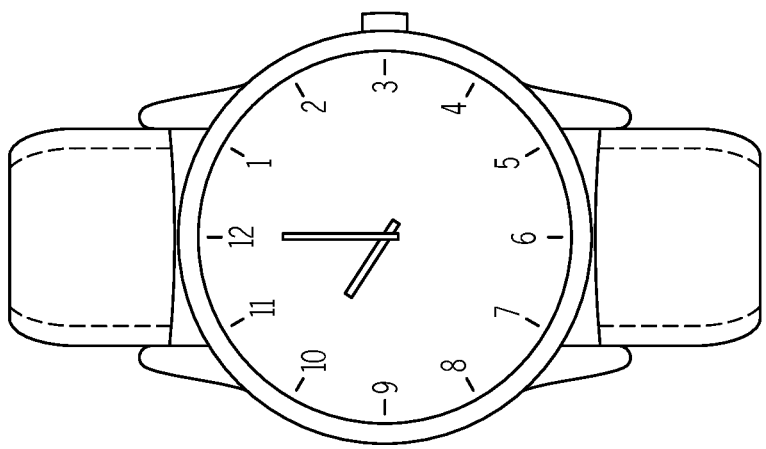
Figure 74:
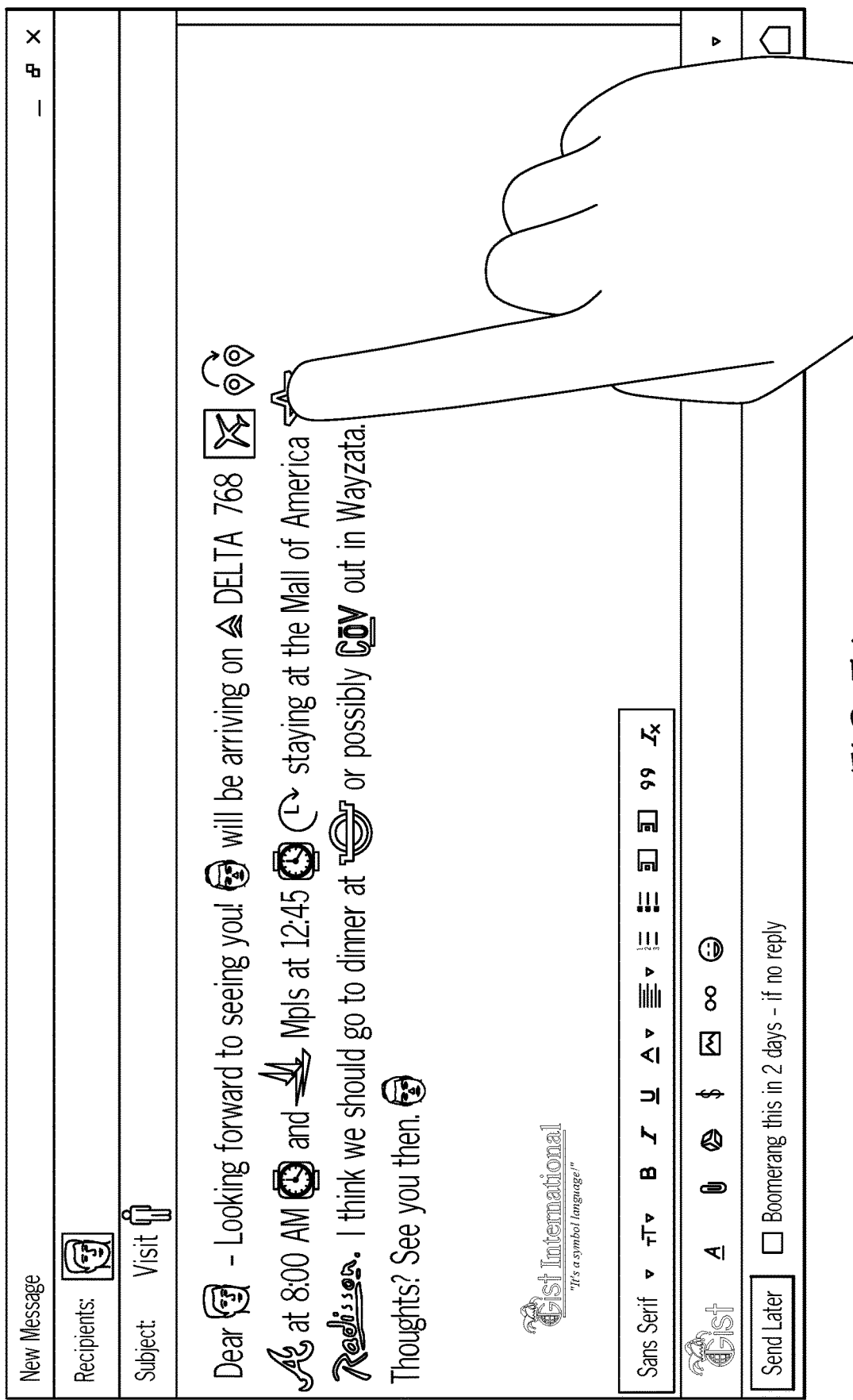
Figure 75:
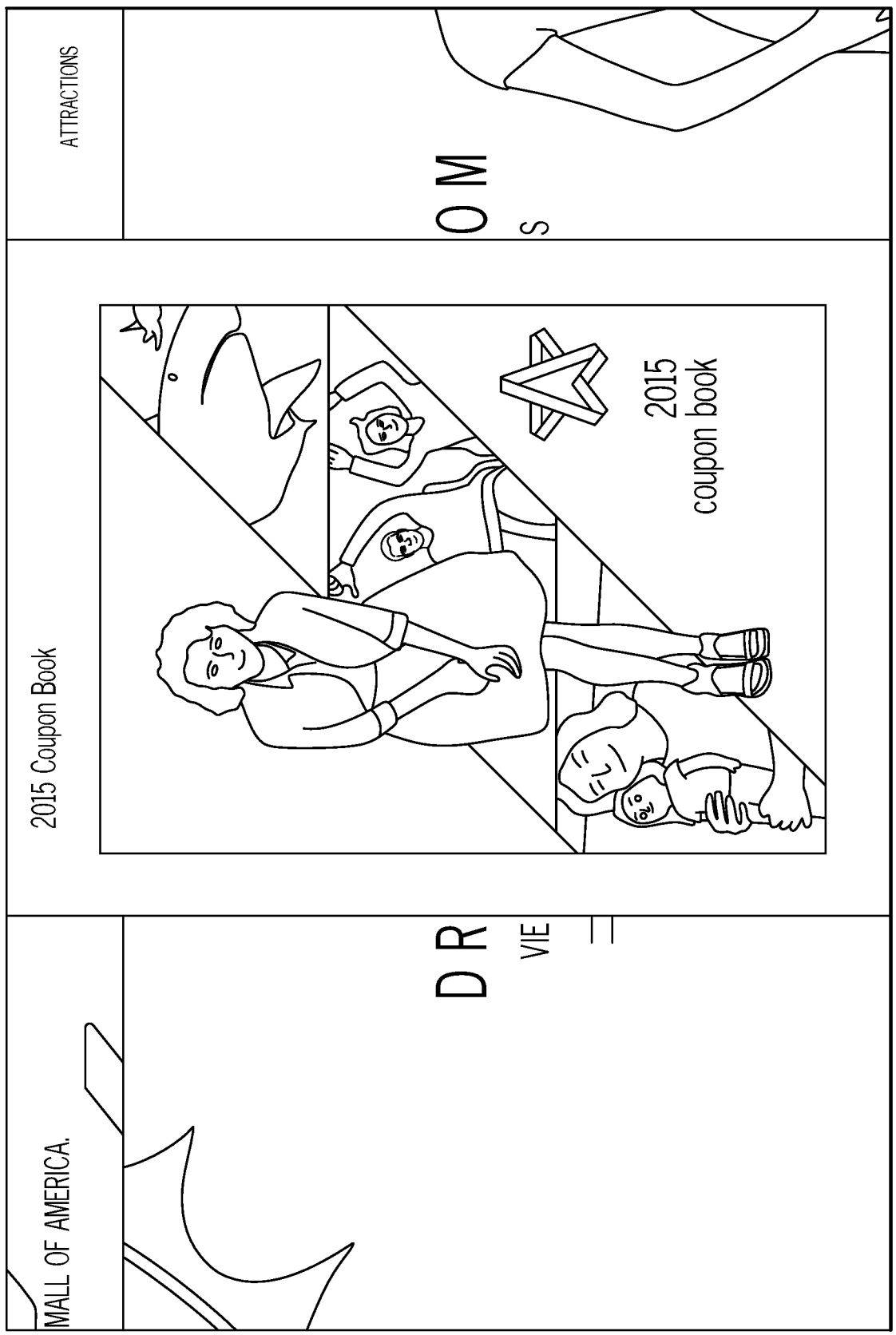
Figure 76:
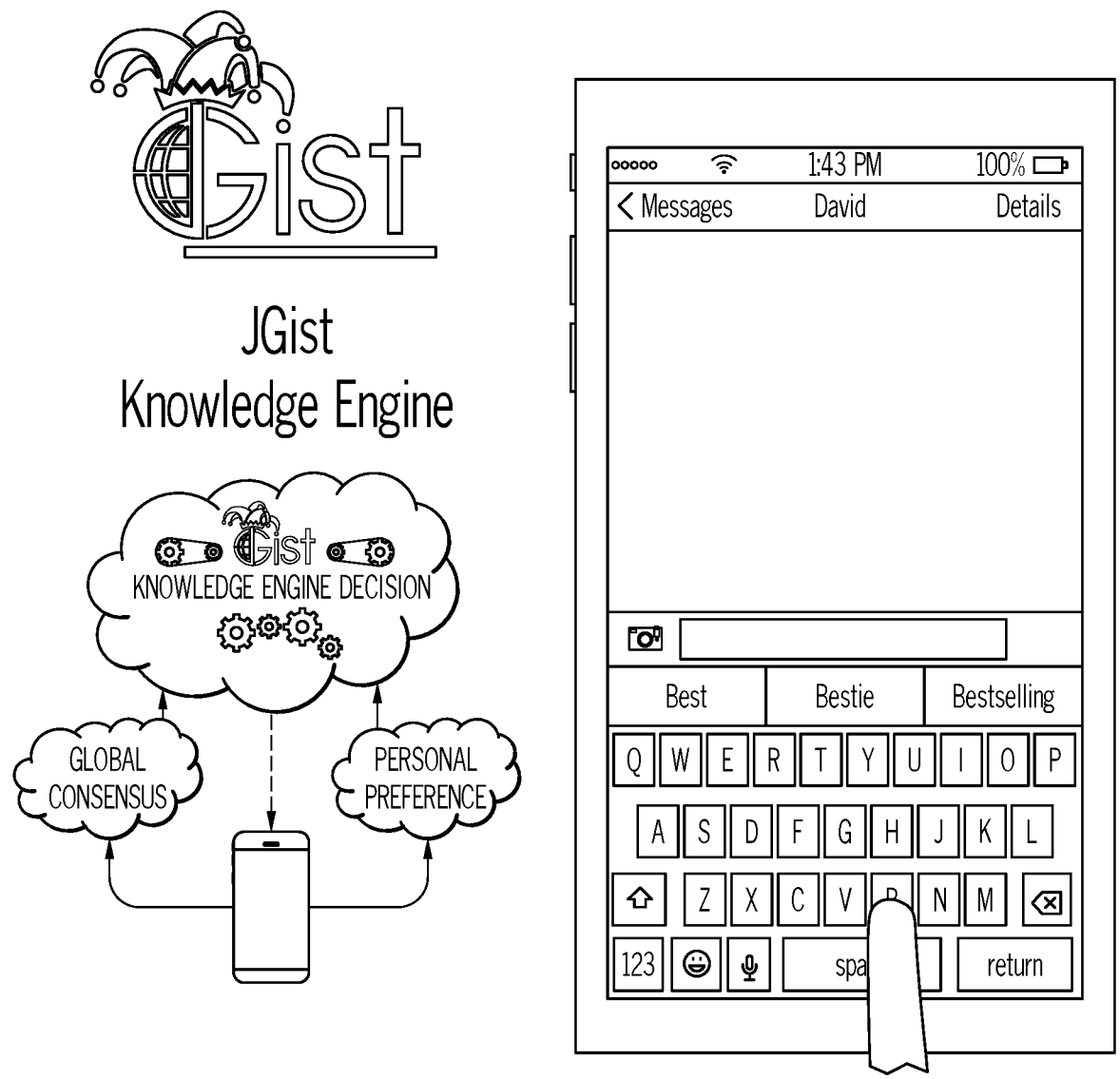
FIGS. 76-93 show more information about the knowledge engine.
Figure 77:
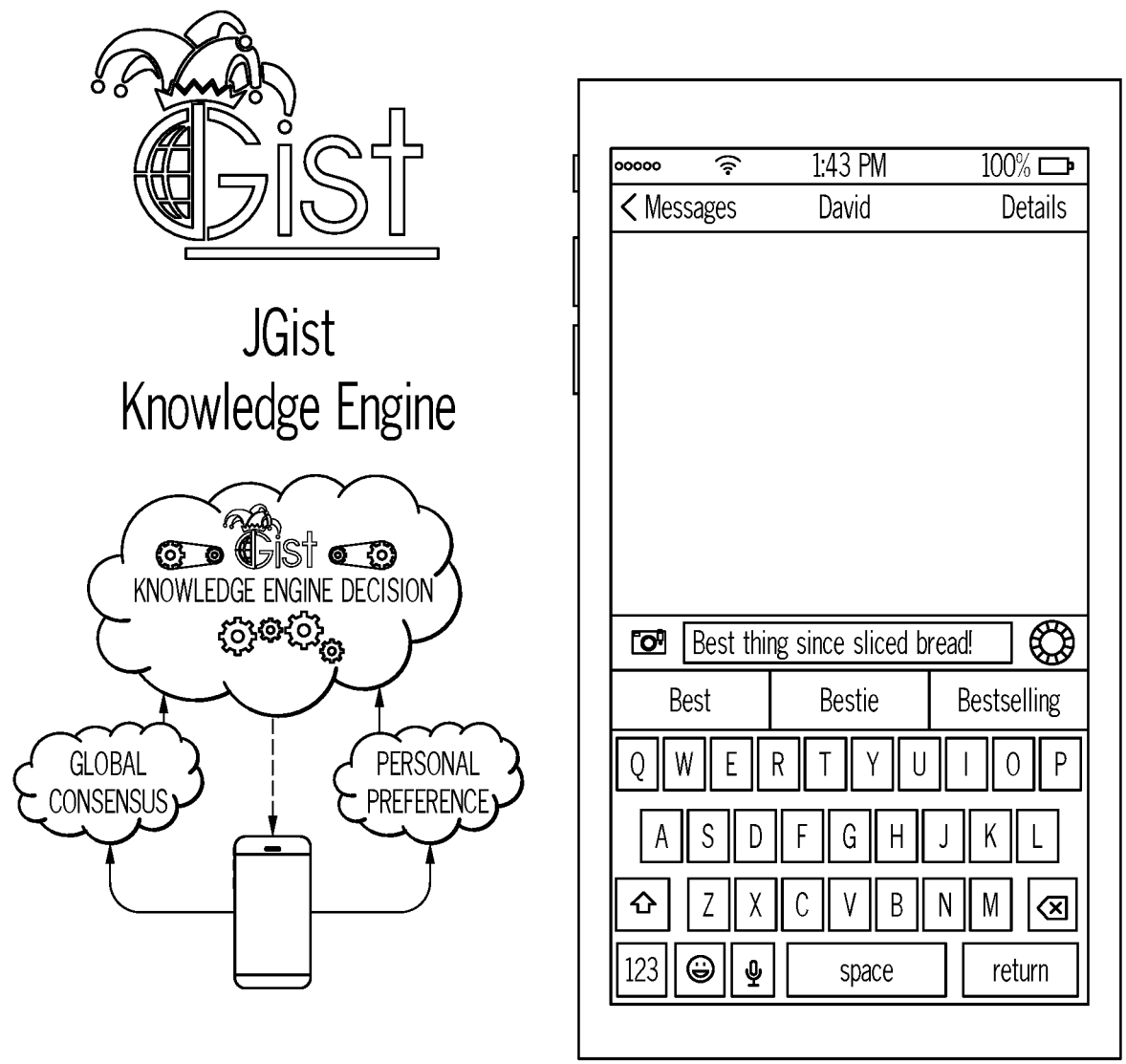
Figure 78:
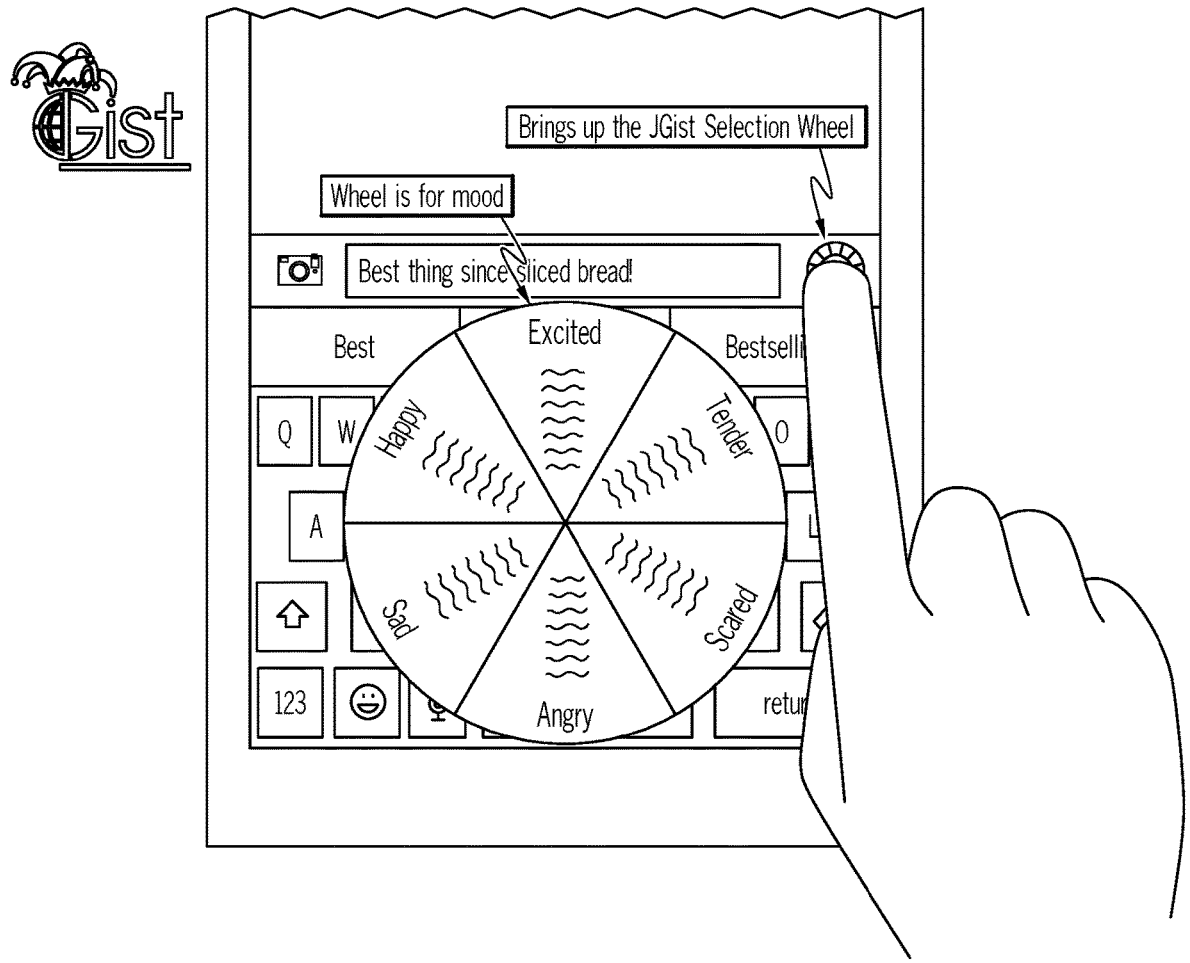

Referring now to FIGS. 66-75, an email version of the JGist application is shown. FIG. 67 shows a standard email message and FIG. 68 shows the message after it has been JGisted. FIGS. 69 and 70 show that if you touch the Delta icon for flight 768, you are taken to a webscreen with the flight status information for Delta flight 768. FIG. 71 (tap once) or FIG. 72 (tap and hold) show how to pull up a Bulova watch ad (FIG. 73). FIG. 74 shows an icon for the Mall of America Radisson, which if selected pulls up a coupon book for the mall of America (FIG. 75).

Figure 79:
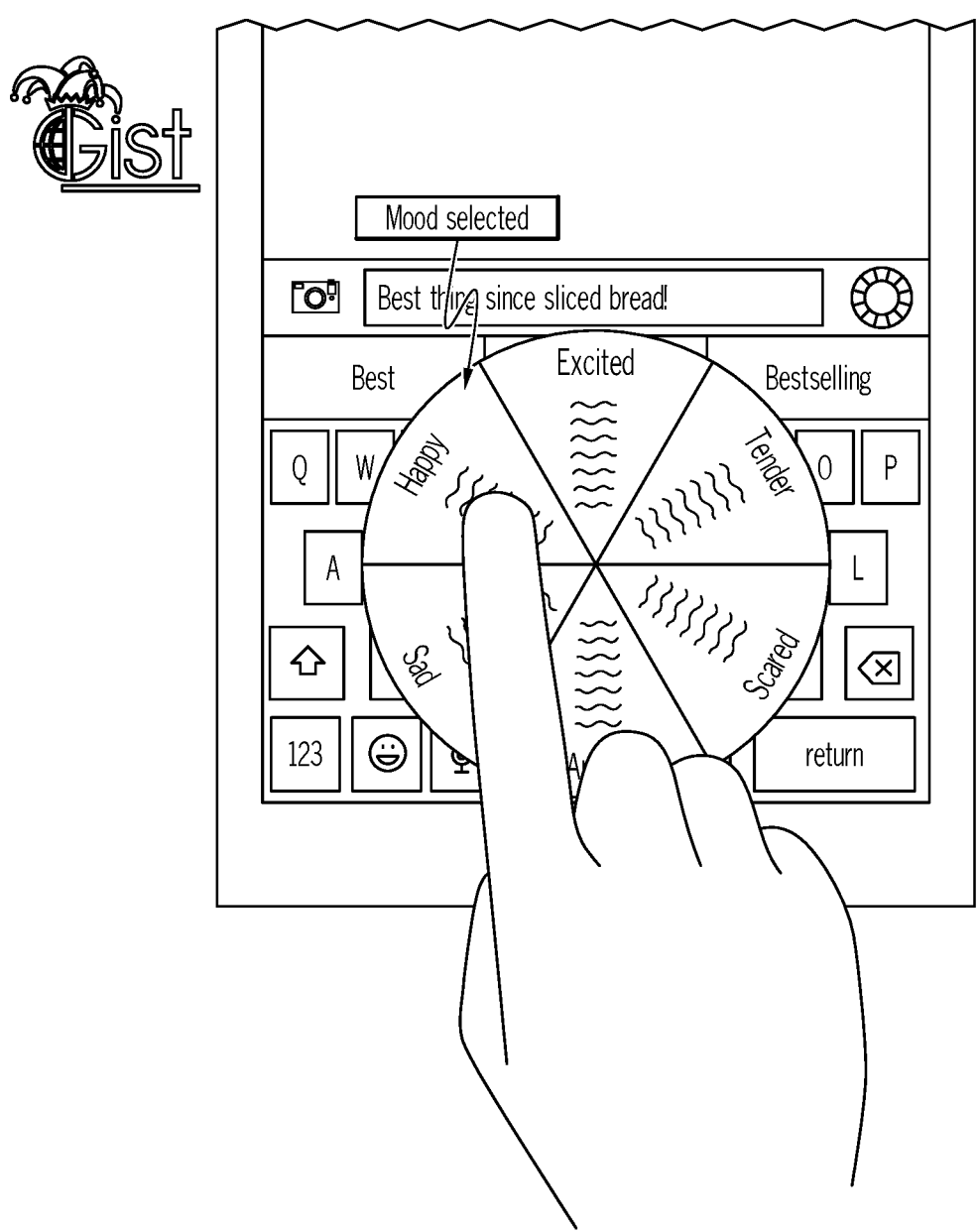
Figure 80:
Figure 81:
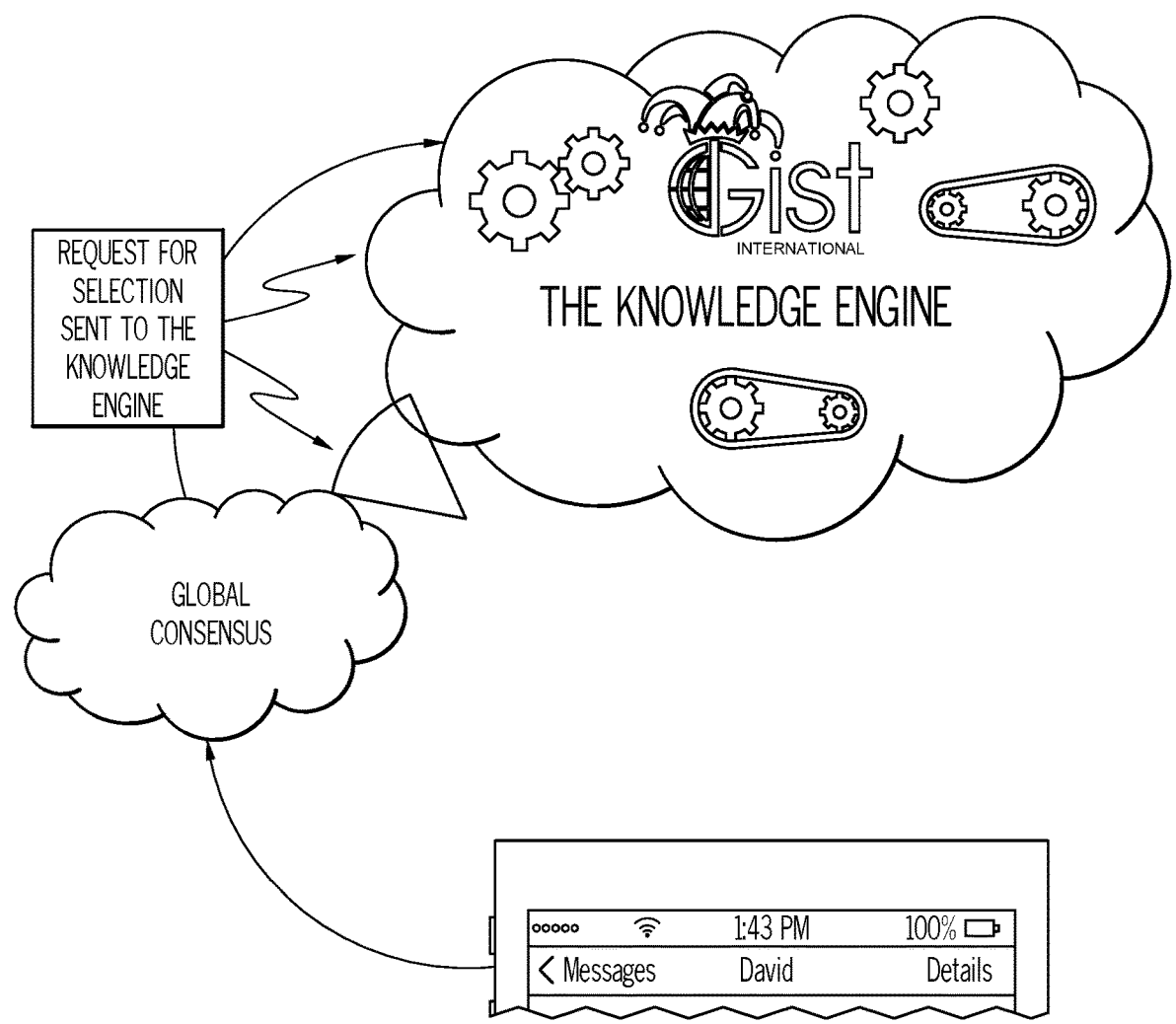
Figure 82:
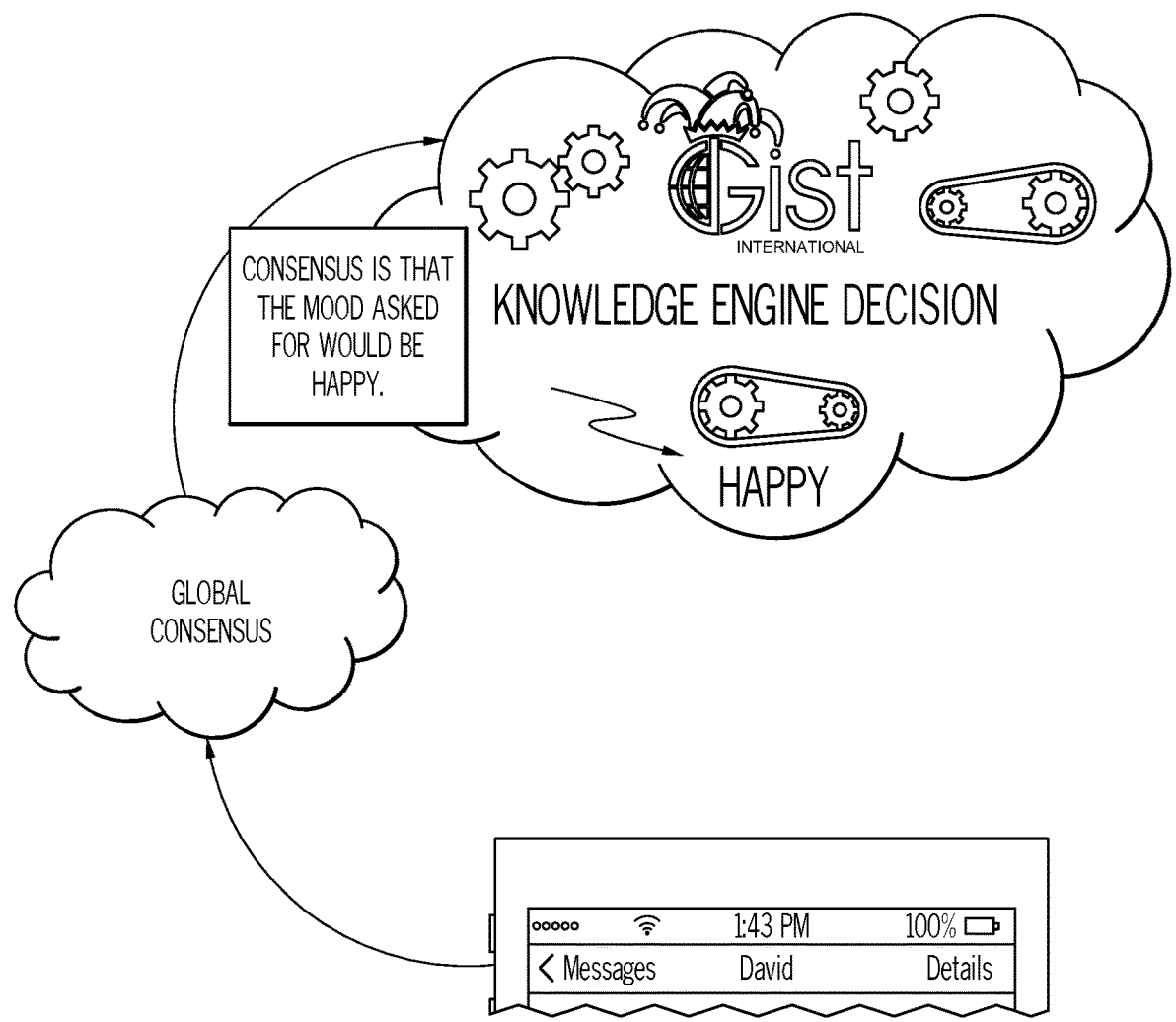
Figure 83:
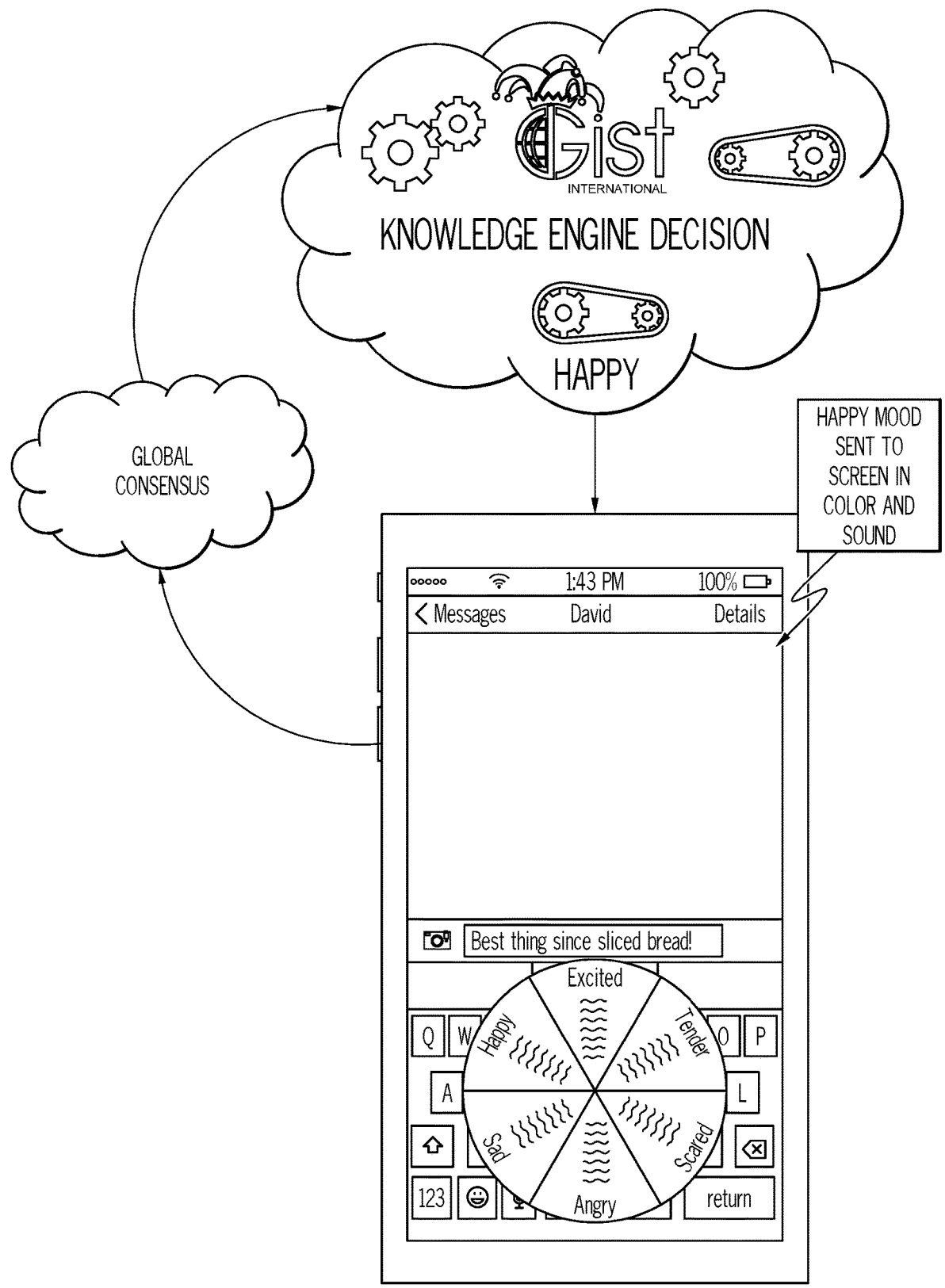
Figure 84:
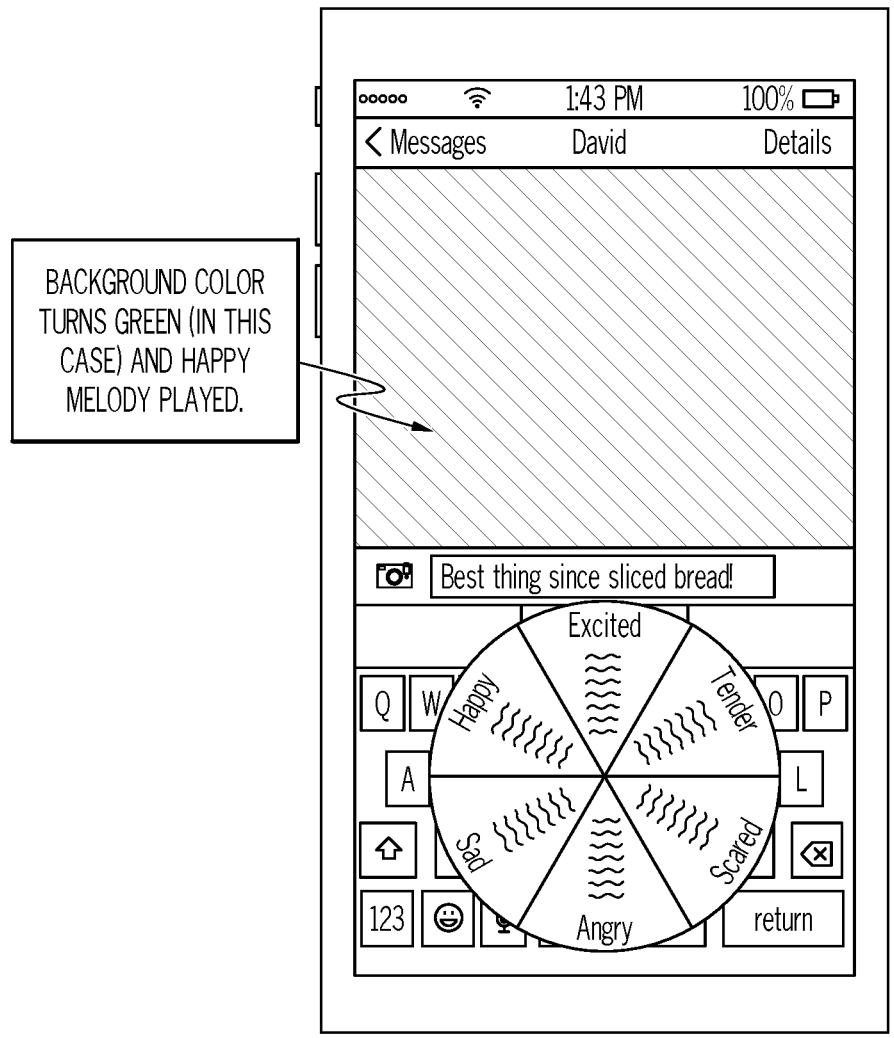
Figure 85:
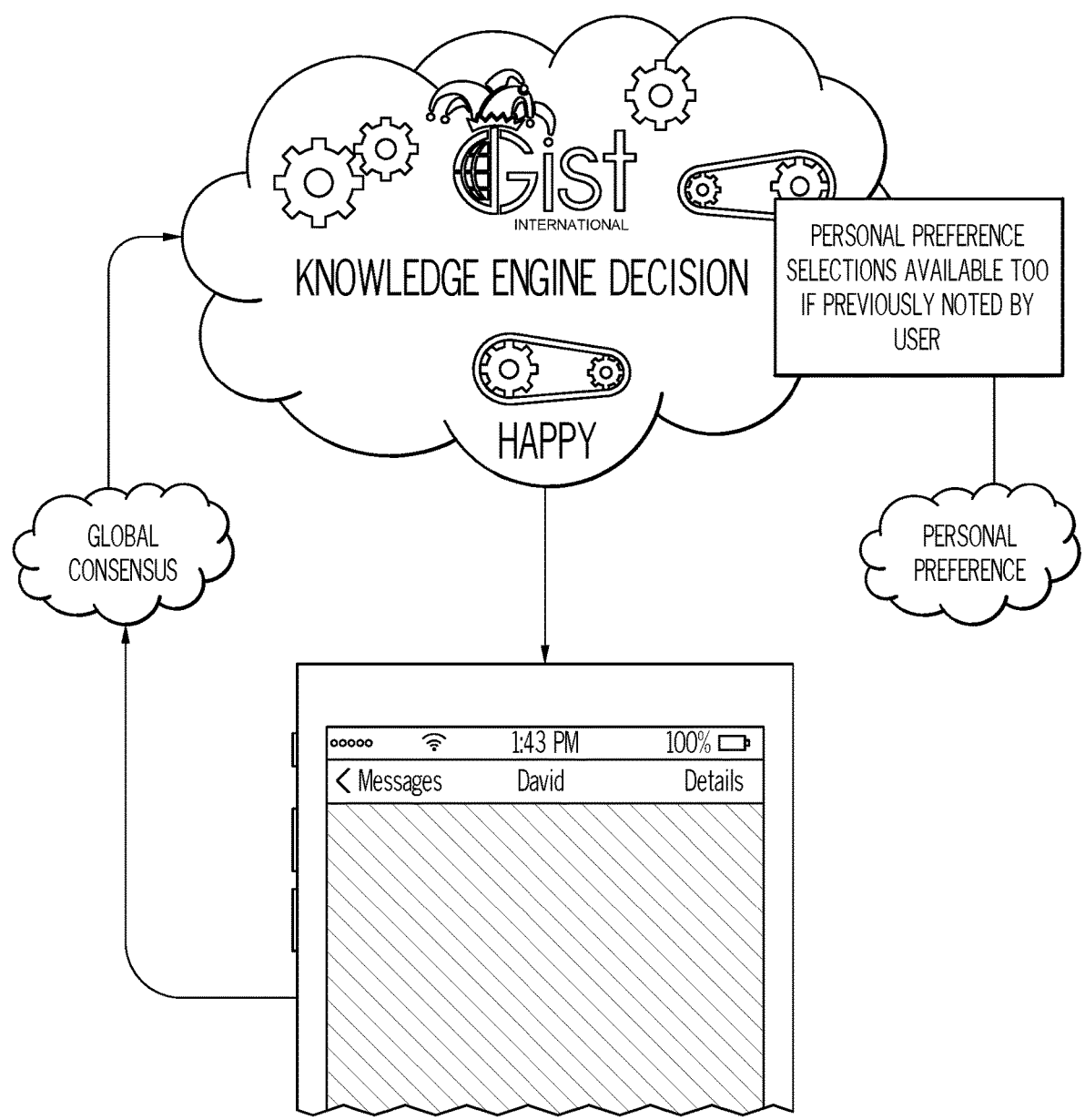
Figure 86:
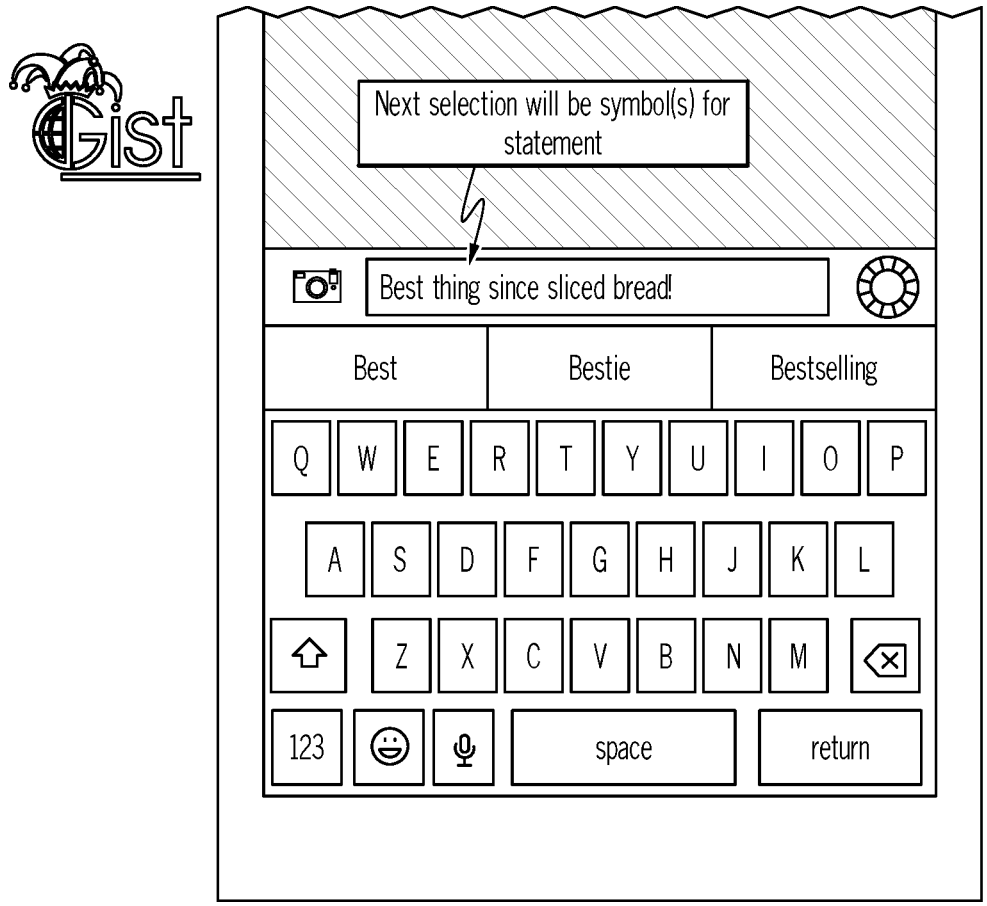
Figure 87:
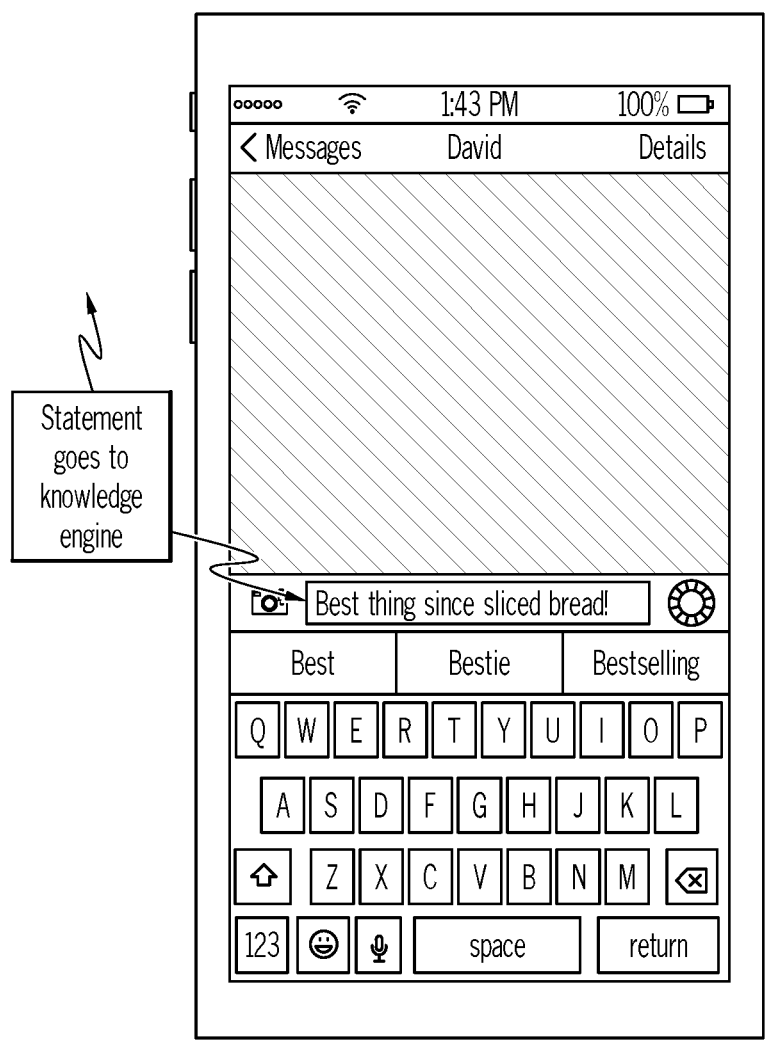
Figure 88:
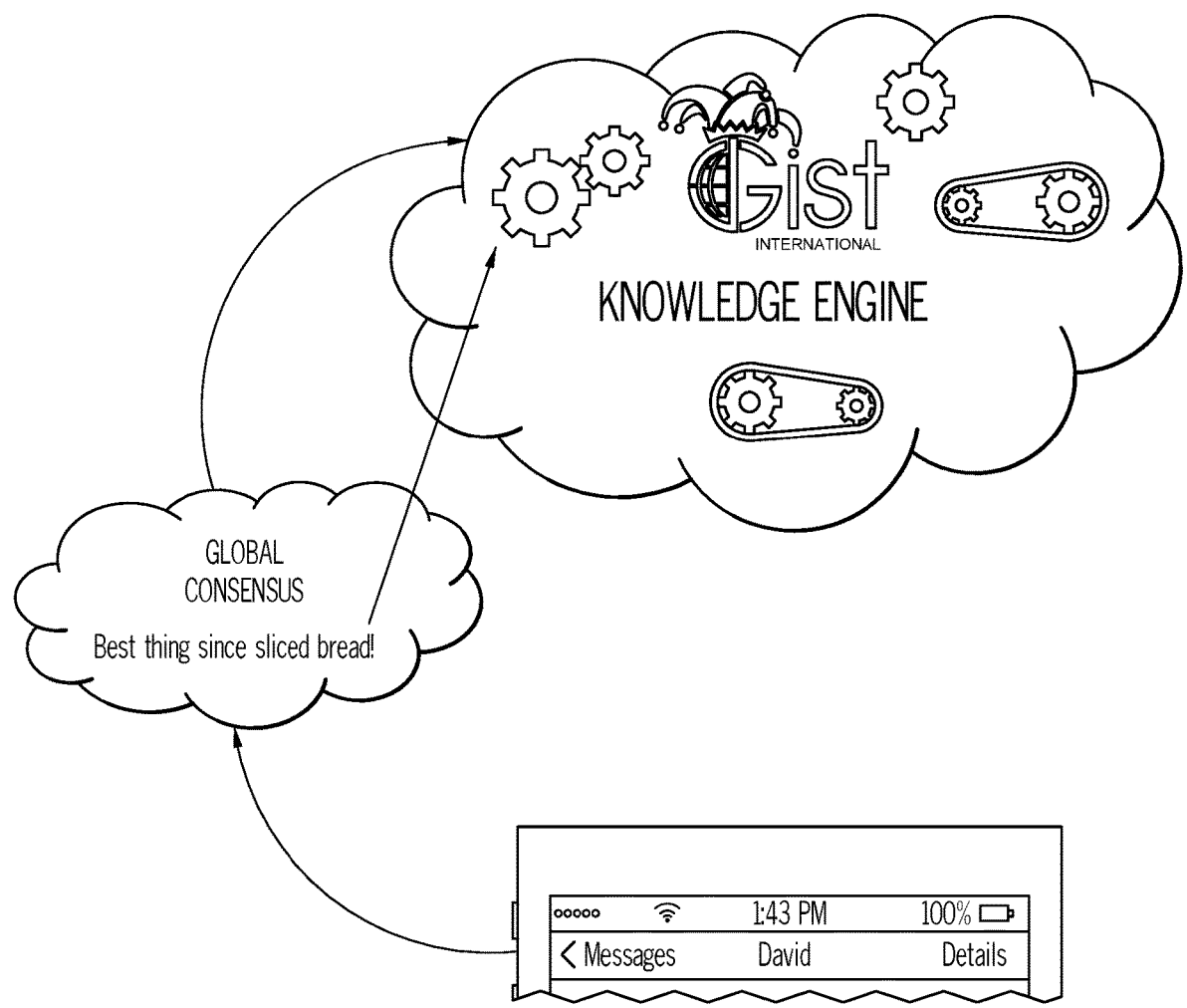
Figure 89:
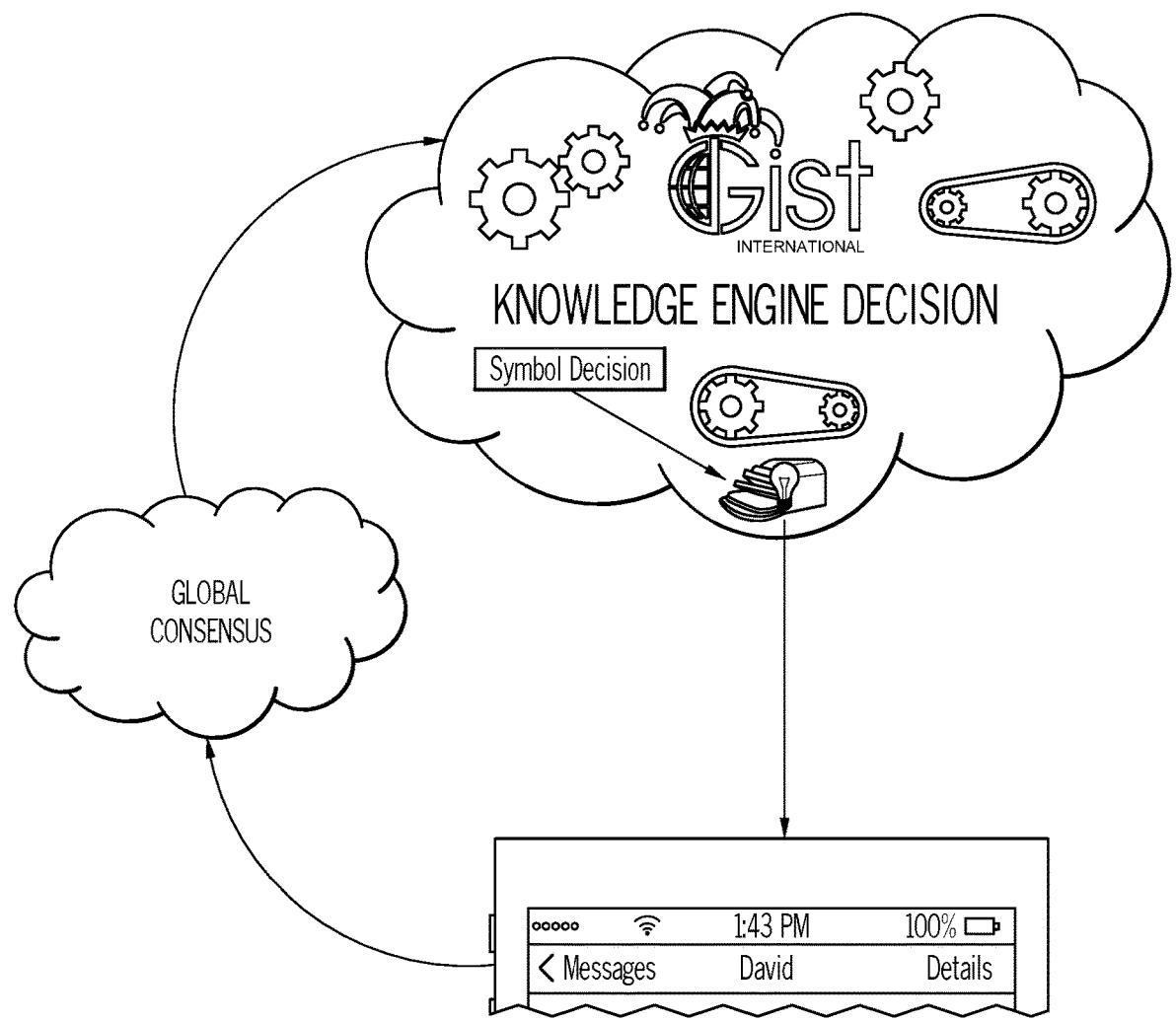
Figure 90:
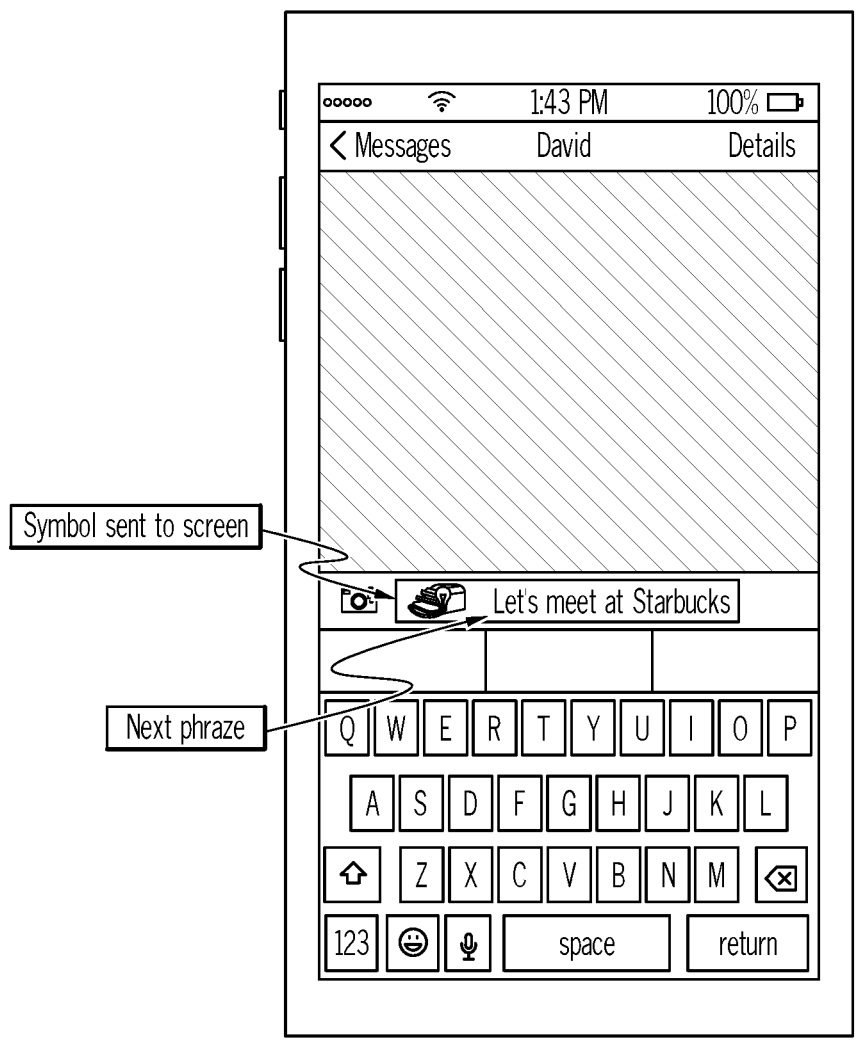
Figure 91:
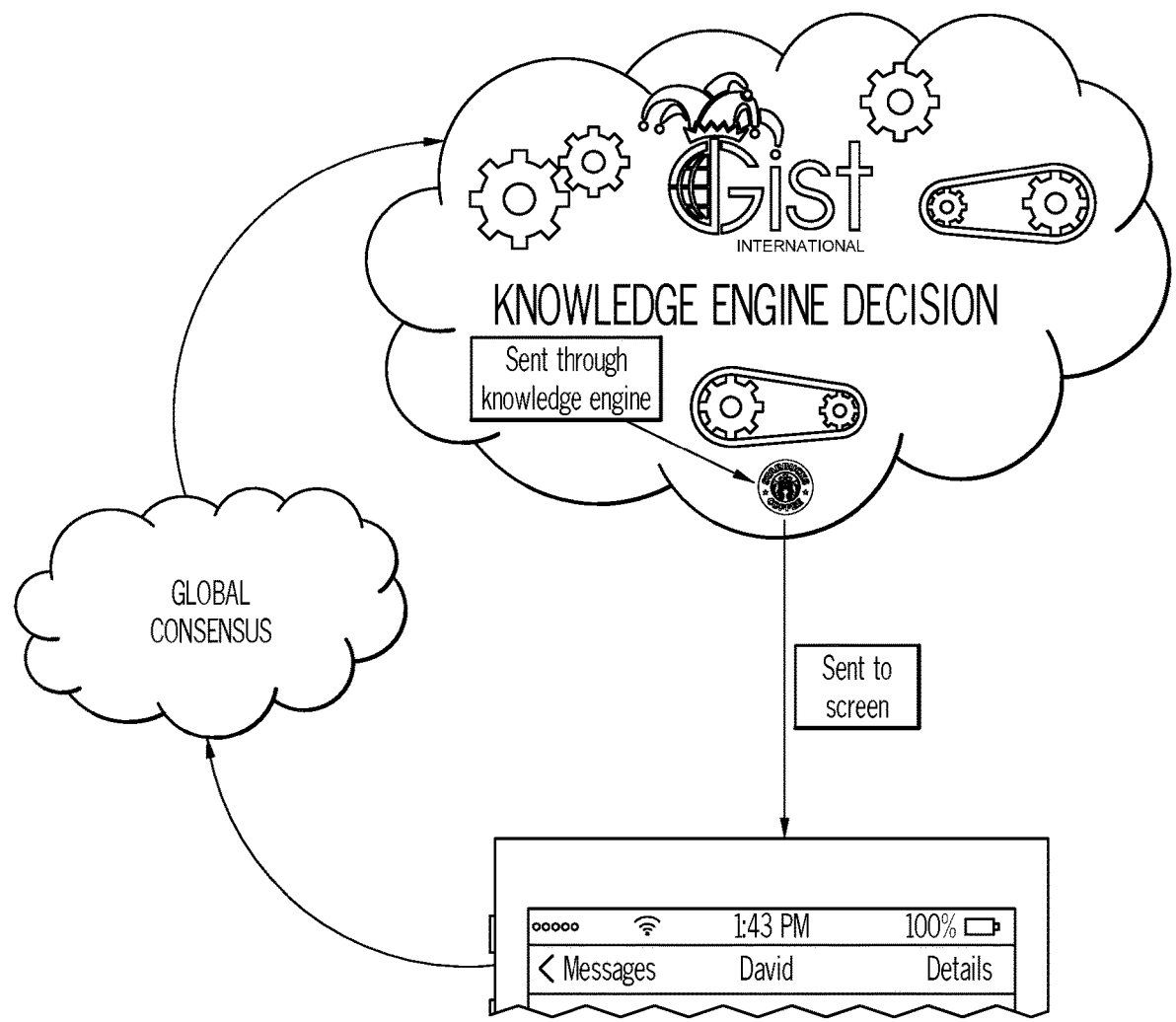
Figure 92:
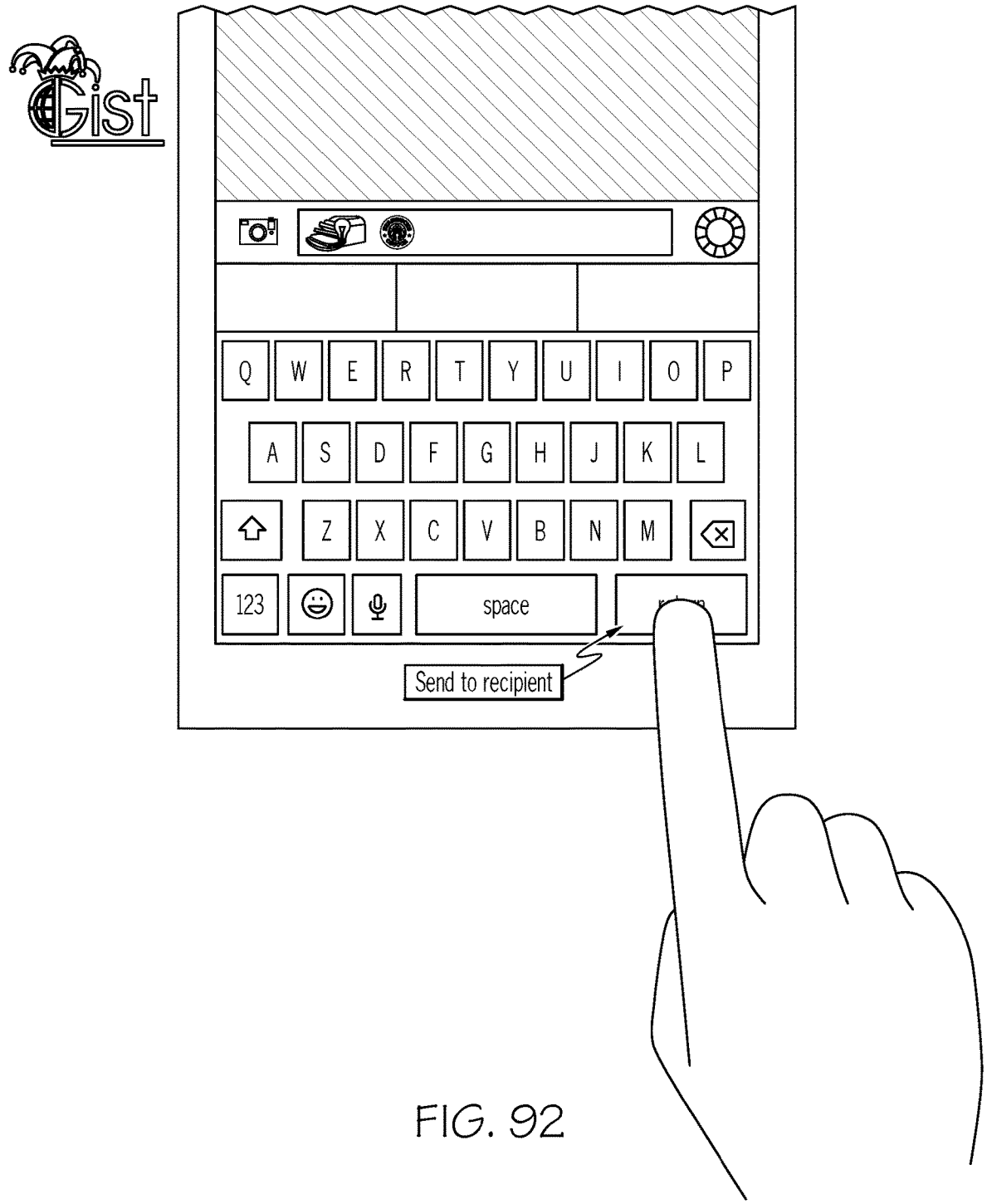
Figure 93:
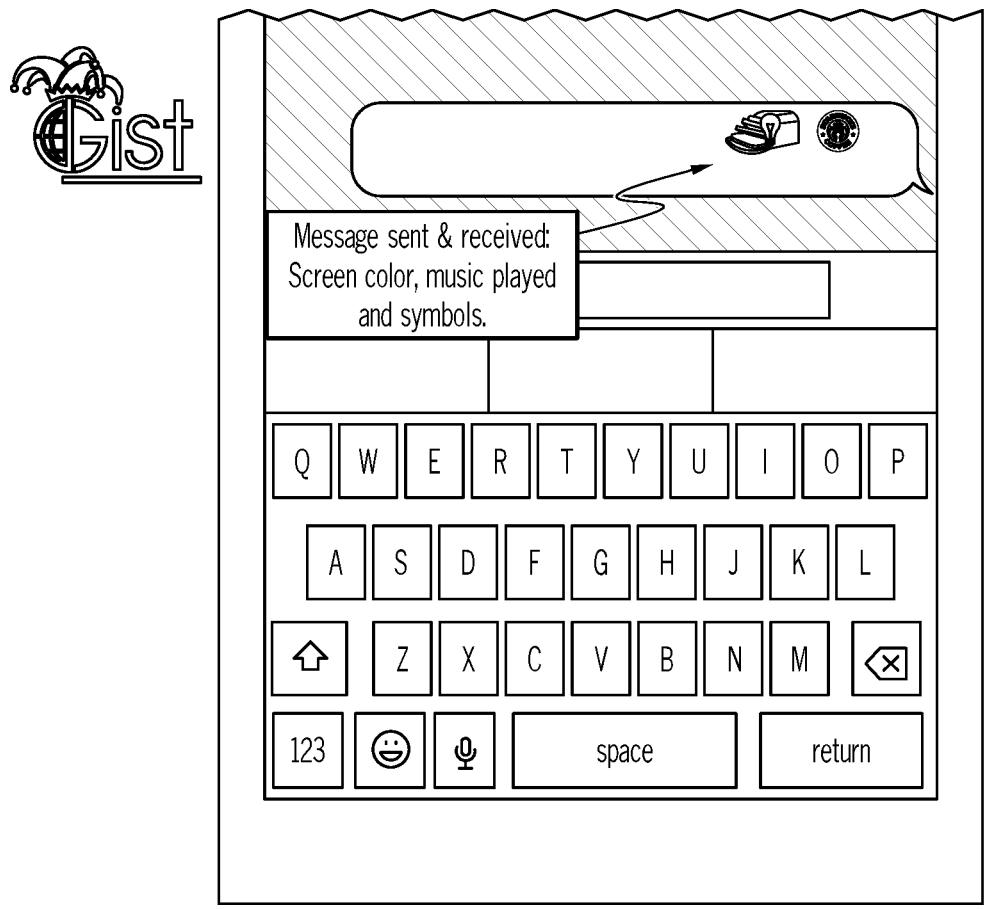

Referring now to FIGS. 76-93, the knowledge engine is discussed in more detail. The knowledge engine is run on the search engine server 16 and acts as a real-time look-up engine to help a user select a symbol or mood. It is important to note that the user will be introduced to the most popular symbols expressed by their ranking of their recognition of meaning, "gist", when using a multi-screen device. This is the most important factor in building the universal symbol system language. The user can either use the wheel to select a mood (such as happy—a green background) or can allow the knowledge engine to suggest a mood based on context of the words of a message (as shown in FIG. 79). In FIG. 86, a symbol is suggested based on the context of the message "Best thing since sliced bread!". Each symbol in the knowledge base database is associated with key words and categories to allow for messages to be parsed and searched for relevant symbols. In this example, a loaf of sliced bread is suggested (see FIGS. 89 and 90). Similarly, the Starbucks symbol is suggested in response to "Let's meet at Starbucks", using key words.

A message can be composed in conjunction with the knowledge base, or a user can select symbols which are pre-loaded into the smartphone and available via the wheel or a symbol keyboard.

Once a message is sent, the search engine server 16 is sent details of symbol usage in the message for incrementing the counter associated with each symbol and for billing purposes.

It should be understood that symbols which are monetized, can each have different rates based on time of day, geography, store location and the rates can be changed from time to time by the vendor. Vendors can be billed daily, weekly, monthly or any other desired period. Vendor ad content, which is associated with a particular symbol, can be divided geographically, down to the store level, and can be changed as often as the vendor wishes.

It should also be understood that coupons or ads can automatically be browsed to by the sender and/or receiver of the message, or alternatively the vendor could send them to the sender and receiver smartphones via text message, if desired.

The above examples and disclosure are intended to be illustrative and not exhaustive. These examples and description will suggest many variations and alternatives to one of ordinary skill in this art. All of these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of written description, any dependent claim which follows should be taken as alternatively written in a multiple dependent form from all claims which possess all antecedents referenced in such dependent claim.

What is claimed:

1. A system for symbolic communication comprising:
a symbol server including a server processor, a server memory and a database of symbols containing billable and non-billable symbols, the billable symbols representing products or services, each billable symbol being associated with a merchant that registers with the system, and having a billing rate associated with its use, the symbol server being configured to:
initiate a population of symbols in the database of symbols using indirect symbol harvesting which allows the symbol server to search and acquire symbols from the internet, wherein each symbol populated using indirect symbol harvesting is associated with alphabetic words or phrases by a system administrator;
register the merchant to contract billable symbols with the system;
populate the billable symbols, submitted by the merchant, in the database using commercial symbol harvesting, wherein the commercial symbol harvesting allow the merchant to contract billing information and submit a plurality of the billable symbols with respective dynamic billing rate for each of the billable symbols populated, wherein the dynamic billing rate for each billable symbol is based on a time of day, geography and store location;
populate additional symbols submitted by a user in the database, using at least one method selected from a group consisting of direct symbol harvesting, blind symbol harvesting, and genius symbol harvesting, wherein each of the additional symbols populated is associated with respective alphabetic words or phrases, wherein the direct symbol harvesting allows users of the system to submit each additional symbol with an association of the respective alphabetic words or phrases, wherein the blind symbol harvesting allows the users of the system to participate in games that validate the association of respective alphabetic words or phrases with the additional symbol, wherein the genius symbol harvesting allows a self-identified expert user to validate the association of respective alphabetic words or phrases with the additional symbol;
parse alphabetic words and phrases used in a message to configure a dynamic series of symbol selection wheels for display on the communication device;
configure, for display on a touch-based the graphical user interface of the communication device, the dynamic series of symbol selection wheels including consensus-popular symbols which sequentially correspond to the relevant alphabetic words and phrases used in the message, wherein the consensus-popular symbols are ranked based on the usage count of each symbol across all messages previously sent by all users in the system, wherein the consensus-popular symbols displayed on each respective wheel include the highest ranked symbols relative to the respective alphabetic word or phrase parsed in the message;
convert the respective alphabetic words and phrases to user selected consensus-popular symbols in the message;
count each symbol used in the message;
store the count in the database, and
bill the merchant for the use of each billable symbol in the message, using the billing rate associated with the billable symbol;

the communication device including a device processor and a device memory and a touch-based graphical user interface display, and including a subset of the billable and non-billable symbols obtained from the symbol server;

a symbolic communication software module stored in the device memory, comprising executable instructions that when executed by the device processor cause the device processor to:

compose the message using the alphabetic words or phrases;

request, via the touch-based graphical user interface, the consensus-popular symbols relevant to the alphabetic words or phrases used in the composition of the message;

display, on the touch-based graphical user interface and overlaying a touch keyboard, a first symbol selection wheel, from the configured dynamic series of symbol selection wheels, which corresponds to a first alphabetic word or phrase associated with a consensus-popular symbol, wherein the additional symbols not presented on the first symbol selection wheel are further selectable by the user through a symbol keyboard on the touch-based graphical user interface;

receive a selection, from the communication device, the consensus-popular symbols from the first symbol selection wheel, wherein additional symbol selection wheels are each displayed in sequential order relative to the remaining unselected consensus-popular symbols based on the configured dynamic series of symbol selection wheels;

send the message from the communication device to a second communication device using either a texting application or an email application.

2. A method for symbolic communication performed by a symbol server including a server processor, a server memory and a database containing billable and non-billable symbols, the billable symbols representing products or services, each billable symbol being associated with a merchant that registers with the system, and having a billing rate associated with its use, and a communication device including a device processor and a device memory and a touch-based graphical user interface display, and including a subset of the billable and non-billable symbols obtained from the symbol server, the symbol server and the communication device configured to:

initiate, by the symbol server, a population of symbols in the database of symbols using indirect symbol harvesting which allows the symbol server to search and acquire symbols from the internet, wherein each symbol populated using indirect symbol harvesting is associated with alphabetic words or phrases by a system administrator of the symbol server;

register, by the symbol server, the merchant to contract billable symbols;

populate, by the symbol server, the billable symbols submitted by the merchant in the database using commercial symbol harvesting, wherein the commercial symbol harvesting allow the merchant to contract billing information and submit a plurality of the billable symbols with respective dynamic billing rate for each of the billable symbols populated, wherein the dynamic billing rate for each billable symbol is based on a time of day, geography and store location;

populate, by the symbol server, additional symbols submitted by a user in the database using at least one method selected from a group consisting of direct symbol harvesting, blind symbol harvesting, and genius symbol harvesting, wherein each of the additional symbols populated is associated with respective alphabetic words or phrases, wherein the direct symbol harvesting allows users to submit each additional symbol with an association of the respective alphabetic words or phrases, wherein the blind symbol harvesting allows the users to participate in games that validate the association of respective alphabetic words or phrases with the additional symbol, wherein the genius symbol harvesting allows a self-identified expert user to validate the association of respective alphabetic words or phrases with the additional symbol;

compose, by a user of the communication device, the message using the alphabetic words or phrases;

request, by the user of the communication device, via the touch-based graphical user interface, consensus-popular symbols relevant to the alphabetic words or phrases used in the composition of the message;

parse, by the symbol server, alphabetic words and phrases used in the message to configure a dynamic series of symbol selection wheels for display on the communication device;

configure, by the symbol server, for display on the touch-based graphical user interface of the communication device, the dynamic series of symbol selection wheels including consensus-popular symbols which sequentially correspond to the relevant alphabetic words and phrases used in the message, wherein the consensus-popular symbols are ranked based on the usage count of each symbol across all messages previously sent by all users, wherein the consensus-popular symbols displayed on each respective wheel include the highest ranked symbols relative to the respective alphabetic word or phrase parsed in the message;

display, via the communication device, on the touch-based graphical user interface and overlaying a touch keyboard, a first symbol selection wheel, from the configured dynamic series of symbol selection wheels, which corresponds to a first alphabetic word or phrase associated with a consensus-popular symbol, wherein the user can further select additional symbols through a symbol keyboard not presented on the touch-based graphical user interface;

select, by the user of the communication device, the consensus popular symbols from the first symbol selection wheel, wherein additional symbol selection wheels are each displayed in sequential order relative to the remaining unselected consensus-popular symbols based on the configured dynamic series of symbol selection wheels;

convert, by the symbol server, the respective alphabetic words and phrases to user selected consensus-popular symbols in the message;

send, by the user of the communication device, the message from the communication device to a second communication device using either a texting application or an email application;

count, by the symbol server, each symbol used in the message, store, by the symbol server, the count in the database, and bill, by the symbol server, the merchant for the use of each billable symbol in a message, using the billing rate associated with the billable symbol.

3. The system of claim 1, wherein the communication device is a mobile smartphone.

4. The system of claim 1, wherein a coupon associated with the billable symbol is sent to the communication, the second communication device or both.

5. The method of claim 2, wherein the communication device is a mobile smartphone.

6. The method of claim 2, wherein a coupon associated with the billable symbol is sent to the communication device, the second communication device or both.

\* \* \* \* \*